US008788270B2

(12) United States Patent
Patel et al.

(10) Patent No.: US 8,788,270 B2

(45) Date of Patent: Jul. 22, 2014

(54) APPARATUS AND METHOD FOR DETERMINING AN EMOTION STATE OF A SPEAKER

(75) Inventors: Sona Patel, Homer, IL (US); Rahul Shrivastav, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 115 days.

(21) Appl. No.: 13/377,801

(22) PCT Filed: Jun. 16, 2010

(86) PCT No.: PCT/US2010/038893

§ 371 (c)(1), (2), (4) Date: Dec. 12, 2011

(87) PCT Pub. No.: WO2010/148141

PCT Pub. Date: Dec. 23, 2010

(65) Prior Publication Data

US 2012/0089396 A1 Apr. 12, 2012

Related U.S. Application Data

(60) Provisional application No. 61/187,450, filed on Jun. 16, 2009.

(51) Int. Cl.
*G10L 17/26* (2013.01)

(52) U.S. Cl.
USPC .......................................... 704/270.1

(58) Field of Classification Search
USPC .................................. 704/274, 270.1
See application file for complete search history.

(56) References Cited

U.S. PATENT DOCUMENTS

| | | | | |
|---|---|---|---|---|
| 7,606,701 | B2 * | 10/2009 | Degani et al. | 704/207 |
| 7,912,720 | B1 * | 3/2011 | Hakkani-Tur et al. | 704/270 |
| 7,940,914 | B2 * | 5/2011 | Petrushin | 379/265.06 |
| 8,204,749 | B2 * | 6/2012 | Hakkani-Tur et al. | 704/270 |
| 8,214,214 | B2 * | 7/2012 | Bennett | 704/254 |

FOREIGN PATENT DOCUMENTS

| | | | |
|---|---|---|---|
| JP | 2007-286377 | A2 | 11/2007 |
| KR | 10-2008-0086791 | A | 9/2008 |
| WO | WO-2007/148493 | A1 | 12/2007 |

OTHER PUBLICATIONS

Banse, R., "Acoustic Profiles in Vocal Emotion Expression," *Journal of Personality and Social Psychology*, Mar. 1996, vol. 70, No. 3, pp. 614-636.

Bonebright, T.L., et al., "Gender Stereotypes in the Expression and Perception of Vocal Affect," *Sex Roles*, 1996, vol. 34, Nos. 5-6, pp. 429-445.

(Continued)

*Primary Examiner* — Susan McFadden

(74) *Attorney, Agent, or Firm* — Saliwanchik, Lloyd & Eisenschenk

(57) ABSTRACT

A method and apparatus for analyzing speech are provided. A method and apparatus for determining an emotion state of a speaker are provided, including providing an acoustic space having one or more dimensions, where each dimension corresponds to at least one baseline acoustic characteristic; receiving an utterance of speech by the speaker; measuring one or more acoustic characteristics of the utterance; comparing each of the measured acoustic characteristics to a corresponding baseline acoustic characteristic; and determining an emotion state of the speaker based on the comparison. An embodiment involves determining the emotion state of the speaker within one day of receiving the subject utterance of speech. An embodiment involves determining the emotion state of the speaker, where the emotion state of the speaker includes at least one magnitude along a corresponding at least one of the one or more dimensions within the acoustic space.

59 Claims, 11 Drawing Sheets

(56) References Cited

OTHER PUBLICATIONS

Camacho, A., "SWIPE: A Sawtooth Waveform Inspired Pitch Estimator for Speech and Music," Doctoral dissertation, University of Florida, 2007.

Davitz, J.R., *The Communication of Emotional Meaning*, McGraw-Hill, New York, 1964, pp. 101-112.

De Jong, N. H., et al., "Praat Script to Detect Syllable Nuclei and Measure Speech Rate Automatically," *Behavior Research Methods*, 2009, vol. 41, No. 2, pp. 385-390.

Dellaert, F., etal., "Recognizing Emotions in Speech," *Proceedings of the 4th International Conference on Spoken Language Processing*, Oct. 3-6, 1996, Philadelphia, PA, pp. 1970-1973.

Gobl, C., et al., "The Role of Voice Quality in Communicating Emotion, Mood and Attitude," *Speech Communication*, Apr. 2003, vol. 40, Nos. 1-2, pp. 189-212.

Heman-Ackah, Y.D., et al., "Cepstral Peak Prominence: A More Reliable Measure of Dysphonia," *Annals of Otology, Rhinology, and Laryngology*, Apr. 2003, vol. 112, No. 4, pp. 324-333.

Hillenbrand, J., et al., "Acoustic Correlates of Breathy Vocal Quality: Dysphonic Voices and Continuous Speech," *Journal of Speech and Hearing Research*, Apr. 1996, vol. 39, No. 2, pp. 311-321.

Juslin, P.N., et al., "Impact of Intended Emotion Intensity on Cue Utilization and Decoding Accuracy in Vocal Expression of Emotion," *Emotion*, Dec. 2001, vol. 1, No. 4, pp. 381-412.

Lee, C.M., et al., "Classifying Emotions in Human-Machine Spoken Dialogs," *Proceedings of the 2002 IEEE International Conference on Multimedia and Expo*, Lausanne, Switzerland, Aug. 26-29, 2002, pp. 737-740.

Liscombe, J., et al., "Classifying Subject Ratings of Emotional Speech Using Acoustic Features," *Proceedings of Eurospeech 2003*, Geneva, Switzerland, Sep. 1-4, 2003, pp. 725-728.

Moore, C.A., et al., "Quantitative Description and Differentiation of Fundamental Frequency Contours," *Computer Speech & Language*, Oct. 1994, vol. 8, No. 4, pp. 385-404.

Patel, S., "Acoustic Correlates of Emotions Perceived from Suprasegmental Cues in Speech," Doctoral dissertation, University of Florida, 2009.

Read, C., et al., "Speech Analysis Systems: An Evaluation," *Journal of Speech and Hearing Research*, Apr. 1992, vol. 35, No. 2, pp. 314-332.

Restrepo, A., et al., "A Smoothing Property of the Median Filter," *IEEE Transactions on Signal Processing*, Jun. 1994, vol. 42, No. 6, pp. 1553-1555.

Scherer, K.R., "Vocal Affect Expression: A Review and a Model for Future Research," *Psychological Bulletin*, Mar. 1986, vol. 99, No. 2, pp. 143-165.

Schröder, M., et al., "Acoustic Correlates of Emotion Dimensions in View of Speech Synthesis," *Proceedings of Eurospeech 2001*, Aalborg, Denmark, Sep. 3-7, 2001, pp. 87-90.

Schröder, M., "Experimental Study of Affect Bursts," *Speech Communication*, Apr. 2003, vol. 40, Nos. 1-2, pp. 99-116.

Tato, R., et al., "Emotional Space Improves Emotion Recognition," *Proceedings of the 7th International Conference on Spoken Language Processing*, Denver, CO, Sep. 16-20, 2002, pp. 2029-2032.

Toivanen, J., et al., "Emotions in [a]: A Perceptual and Acoustic Study," *Logopedics Phoniatrics Vocology*, 2006, vol. 31, No. 1, pp. 43-48.

Uldall, E., "Attitudinal Meanings Conveyed by Intonation Contours," *Language and Speech*, 1960, vol. 3, No. 4, pp. 223-234.

Yildirim, S., et al., "An Acoustic Study of Emotions Expressed in Speech," *Proceedings of the 8th International Conference on Spoken Language Processing*, Jeju Island, Korea, Oct. 4-8, 2004.

Yu, D.-M., et al., "Research on a Methodology to Model Speech Emotion," *Proceedings of the 2007 International Conference on Wavelet Analysis and Pattern Recognition*, Beijing, China, Nov. 2-4, 2007, pp. 825-830.

* cited by examiner

250

APPARATUS AND METHOD FOR DETERMINING AN EMOTION STATE OF A SPEAKER

CROSS-REFERENCE TO RELATED APPLICATIONS

The present application is the U.S. National Stage Application of International Patent No. PCT/US2010/038893, filed Jun. 16, 2010, which claims the benefit of U.S. Provisional Application Ser. No. 61/187,450, filed Jun. 16, 2009, both of which are hereby incorporated by reference herein in their entirety, including any figures, tables, or drawings.

BACKGROUND OF INVENTION

Voice recognition and analysis is expanding in popularity and use. Current analysis techniques can parse language and identify it, such as through the use of libraries and natural language methodology. However, these techniques often suffer from the drawback of failing to consider other parameters associated with the speech, such as emotion. Emotion is an integral component of human speech.

BRIEF SUMMARY

In one embodiment of the present disclosure, a storage medium for analyzing speech can include computer instructions for: receiving an utterance of speech; converting the utterance into a speech signal; dividing the speech signal into segments based on time and/or frequency; and comparing the segments to a baseline to discriminate emotions in the utterance based upon its segmental and/or suprasegmental properties, wherein the baseline is determined from acoustic characteristics of a plurality of emotion categories.

In another embodiment of the present disclosure, a speech analysis system can include an interface for receiving an utterance of speech and converting the utterance into a speech signal; and a processor for dividing the speech signal into segments based on time and/or frequency and comparing the segments to a baseline to discriminate emotions in the utterance based upon its segmental and/or suprasegmental properties, wherein the baseline is determined from acoustic characteristics of a plurality of emotion categories.

In another embodiment of the present disclosure, a method for analyzing speech can include dividing a speech signal into segments based on time and/or frequency; and comparing the segments to a baseline to discriminate emotions in a suprasegmental, wherein the baseline is determined from acoustic characteristics of a plurality of emotion categories.

The exemplary embodiments contemplate the use of segmental information in performing the modeling described herein.

BRIEF DESCRIPTION OF THE DRAWINGS

FIGS. 11A-11B depict standardized predicted and perceived values according to individual speaker models in accordance with an embodiment of the subject invention, wherein FIG. 11A depicts the values according to the Speaker 1 perceptual model and FIG. 11B depicts the values according to the Speaker 2 perceptual model.

FIGS. 12A-12B depict standardized predicted and perceived values according to the Overall test1 model in accordance with an embodiment of the subject invention, wherein FIG. 12A depicts the values for Speaker 1 and FIG. 12B depicts the values for Speaker 2.

FIGS. 13A-13B depict Standardized predicted values according to the test1 set and perceived values according to the Overall training set model in accordance with an embodiment of the subject invention, wherein FIG. 13A depicts the values for Speaker 1 and FIG. 13B depicts the values for Speaker 2.

FIGS. 14A-14C depict standardized acoustic values as a function of the perceived D1 values based on the Overall training set model in accordance with an embodiment of the subject invention, wherein FIG. 14A depicts values for alpha ratio, FIG. 14B depicts values for speaking rate, and FIG. 14C depicts values for normalized pitch minimum.

FIGS. 15A-15B depict standardized acoustic values as a function of the perceived Dimension 2 values based on the Overall training set model in accordance with an embodiment of the subject invention, wherein FIG. 15A depicts values for normalized attack time of intensity contour and FIG. 15B depicts values for normalized pitch minimum by speaking rate.

DETAILED DESCRIPTION

Figure 1:
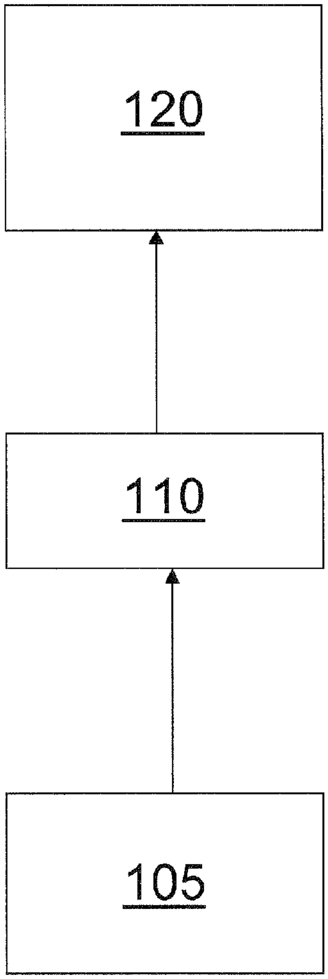
FIG. 1 depicts an exemplary embodiment of a system for analyzing emotion in speech.

Embodiments of the subject invention relate to a method and apparatus for analyzing speech. In an embodiment, a method for determining an emotion state of a speaker is provided including receiving an utterance of speech by the speaker; measuring one or more acoustic characteristics of the utterance; comparing the utterance to a corresponding one or more baseline acoustic characteristics; and determining an emotion state of the speaker based on the comparison. The one or more baseline acoustic characteristics can correspond to one or more dimensions of an acoustic space having one of more dimensions, an emotion state of the speaker can then be determined based on the comparison. In a specific embodiment, determining the emotion state of the speaker based on the comparison occurs within one day of receiving the subject utterance of speech by the speaker.

Another embodiment of the invention relates to a method and apparatus for determining an emotion state of a speaker, providing an acoustic space having one or more dimensions, where each dimension of the one or more dimensions of the acoustic space corresponds to at least one baseline acoustic characteristic; receiving a subject utterance of speech by a speaker; measuring one or more acoustic characteristic of the subject utterance of speech; comparing each acoustic characteristic of the one or more acoustic characteristic of the subject utterance of speech to a corresponding one or more baseline acoustic characteristic; and determining an emotion state of the speaker based on the comparison, wherein the emotion state of the speaker comprises at least one magnitude along a corresponding at least one of the one or more dimensions within the acoustic space.

Yet another embodiment of the invention pertains to a method and apparatus for determining an emotion state of a speaker, involving providing an acoustic space having one or more dimensions, wherein each dimension of the one or more dimensions of the acoustic space corresponds to at least one baseline acoustic characteristic; receiving a training utterance of speech by the speaker; analyzing the training utterance of speech; modifying the acoustic space based on the analysis of the training reference of speech to produce a modified acoustic space having one or more modified dimensions, wherein each modified dimension of the one or more modified dimensions of the modified acoustic space corresponds to at least one modified baseline acoustic characteristic; receiving a subject utterance of speech by a speaker; measuring one or more one acoustic characteristic of the subject utterance of speech; comparing each acoustic characteristic of the one or more acoustic characteristics of the subject utterance of speech to a corresponding one or more one baseline acoustic characteristic; and determining an emotion state of the speaker based on the comparison.

Additional embodiments are directed to a method and apparatus creating a perceptual space. Creating the perceptual space can involve obtaining listener judgments of differences in perception in at least two emotions from one or more speech utterances; measuring d' values between each of the at least two creations, and each of the remain at least two emotions, wherein the d' values represent perceptual distances between emotions; applying a multidimensional scaling analysis to the measured d' values; and creating a n−1 dimensional perceptual space.

The n−1 dimensions of the perceptual space can be reduced to a p dimensional perceptual space, where p<n−. An acoustic space can then be created.

In specific embodiments, determining the emotion state of the speaker based on the comparison occurs within one day within 5 minutes, within 1 minute, within 30 seconds, within 15 seconds, within 10 seconds, or within 5 seconds.

An acoustic space having one or more dimensions, where each dimension of the one or more dimensions of the acoustic space corresponds to at least one baseline acoustic characteristic can be created and provided for providing baseline acoustic characteristics. The acoustic space can be created, or modified, by analyzing training data to determine, or modify, repetitively, the at least one baseline acoustic characteristic for each of the one or more dimensions of the acoustic space.

The emotion state of speaker can include emotions, categories of emotions, and/or intensities of emotions. In a particular embodiment, the emotion state of the speaker includes at least one magnitude along a corresponding at least one of the one or more dimensions within the acoustic space. The baseline acoustic characteristic for each dimension of the one or more dimensions can affect perception of the emotion state. The training data can incorporate one or more training utterances of speech. The training utterance of speech can be spoken by the speaker, or by persons other than the speaker. The utterance of speech from the speaker can include one or more of utterances of speech. For example, a segment of speech from the subject utterance of speech can be selected as a training utterance.

The acoustic characteristic of the subject utterance of speech can include a suprasegmental property of the subject utterance of speech, and a corresponding baseline acoustic characteristic can include a corresponding suprasegmental property. The acoustic characteristic of the subject utterance of speech can be one or more of the following: fundamental frequency, pitch, intensity, loudness, speaking rate, number of peaks in the pitch, intensity contour, loudness contour, pitch contour, fundamental frequency contour, attack of the intensity contour, attack of the loudness contour, attack of the pitch contour, attack of the fundamental frequency contour, fall the intensity contour, fall of the loudness contour, fall of the pitch contour, fall of the fundamental frequency contour, duty cycle of the peaks in the pitch, normalized minimum pitch, normalized maximum of pitch, cepstral peak prominence (CPP), and spectral slope.

One method of obtaining the baseline acoustic measures is via a database of third party speakers (also referred to as a “training” set). The speech samples of this database can be used as a comparison group for predicting or classifying the emotion of any new speech sample. For example, the training set can be used to train a machine-learning algorithm. These algorithms may then be used for classification of novel stimuli. Alternatively, the training set may be used to derive classification parameters such as using a linear or non-linear regression. These regression functions may then be used to classify novel stimuli.

A second method of computing a baseline is by using a small segment (or an average of values across a few small segments) of the target speaker as the baseline. All samples are then compared to this baseline. This can allow monitoring of how emotion may change across a conversation (relative to the baseline).

The number of emotion categories can depend varying on the information used for decision-making. Using suprasegmental information alone can lead to categorization of, for example, up to six emotion categories (happy, content, sad, angry, anxious, and bored). Inclusion of segmental information (words/phonemes or other semantic information) or nonverbal information (e.g. laughter) can provides new information that may be used to further refine the number of categories. The emotions that can be classified when word/speech and laughter recognition is used can include disgust, surprise, funny, love, panic fear, and confused.

For a given speech input, two kinds of information may be determined: (1) The “category” or type of emotion and, (2) the “magnitude” or amount of emotion present.

Table 5-1 from the Appendix (the cited Appendix, which is incorporated by reference in its entirety) of U.S. Provisional Patent Application No. 61/187,450, filed Jun. 16, 2009, includes parameters that may be used to derive each emotion and/or emotion magnitude. Importantly, parameters such as alpha ratio, speaking rate, minimum pitch, and attack time are used in direct form or after normalization. Please note that this list is not exclusive and only reflects the variables that were found to have the greatest contribution to emotion detection in our study.

Emotion categorization and estimates of emotion magnitude may be derived using several techniques (or combinations of various techniques). These include, but are not limited to, (1) Linear and non-linear regressions, (2) Discriminant analyses and (3) a variety of Machine learning algorithms such as HMM, Support Vector Machines, Artificial Neural Networks, etc.

The Appendix cited describes the use of regression equations. Other techniques can also be implemented.

Emotion classifications or predictions can be made using different lengths of speech segments. In the preferred embodiment, these decisions are to be made from segments 4-6 seconds in duration. Classification accuracy will likely be lower for very short segments. Longer segments will provide greater stability for certain measurements and make overall decisions making more stable.

The effects of segment sizes can also be dependent upon specific emotion category. For example, certain emotions such as anger may be recognized accurately using segments shorter than 2 seconds. However, other emotions, particularly those that are cued by changes in specific acoustic patterns over longer periods of time (e.g. happy) may need greater duration segments for higher accuracy.

Suprasegmental information can lead to categorization of, for example, six categories (happy, content, sad, angry, anxious, and bored) categories. Inclusion of segmental or contextual information via, for instance, word/speech/laughter recognition provides new information that can be used to further refine the number of categories. The emotions that can be classified when word/speech and laughter recognition is used include disgust, surprise, funny, love, panic fear, and confused.

The exemplary embodiments described herein are directed towards analyzing speech, including emotion associated with speech. The exemplary embodiments can determine perceptual characteristics used by listeners in discriminating emotions from the suprasegmental information in speech (SS). SS is a vocal effect that extends over more than one sound segment in an utterance, such as pitch, stress, or juncture pattern.

One or more of the embodiments can utilize a multidimensional scaling (MDS) system and/or methodology. For example, MDS can be used to determine the number of dimensions needed to accurately represent the perceptual distances between emotions. The dimensional approach can describe emotions according to the magnitude of their properties on each dimension. MDS can provide insight into the perceptual and acoustic factors that influence listeners' perception of emotions in SS.

In one embodiment, emotion categories can be described by the magnitude of its properties on three perceptual dimensions where each dimension can be described by a set of acoustic cues. In another embodiment, the cues can be determined independently of the use of global measures such as the mean and standard deviation of f0 and intensity and overall duration. Stepwise regressions can be used to identify the set of acoustic cues that correspond to each dimension. In another embodiment, the acoustic cues that describe a dimension may be modeled using a combination of continuous and discrete variables.

Referring to FIG. 1, a system 100 for analyzing emotion in speech is shown and generally referred to by reference numeral 100. System 100 can include a transducer 105, an analog-to-digital (A/D) converter 110, and a processor 120. The transducer 105 can be any of a variety of transducive elements capable of detecting an acoustic sound source and converting the sound wave to an analog signal. The A/D converter 110 can convert the received analog signal to a digital representation of the signal.

In one embodiment, the processor 120 can utilize four groups of acoustic features: fundamental frequency, vocal intensity, duration, and voice quality. These acoustic cues may be normalized or combined in the computation of the final cue. The acoustic measures are shown in Table 1 as follows:

TABLE 1

List of acoustic features.

| Feature Set | Acoustic Cues | Abbreviation |
|---|---|---|
| Fundamental frequency (*f*0) | *f*0 or pitch contour | F0contour GtrendSw |
| Or pitch | Gross trend | GtrendSw |
| | Number of contour peaks | NumPeaks |
| | Peak rise time | PeakRT |
| | Peak fall time | PeakFT |
| | Incidence of *f*0 change or number of contour peaks using autocorrelation | PeaksAuto |
| Intensity or Loudness | Normalized Minimum | IntM |
| | Normalized Maximum | IntSD |
| | Pitch Strength | |
| | Attack time of syllables in contour | IntMAX |
| | Duty cycle of syllables in contour | IntMIN |
| | Contour | Icontour |
| Voice quality | *f*0 perturbations or jitter | Jitter |
| | Amplitude perturbations or shimmer | Shimmer |
| | Nasality | Nasality |
| | Breathiness-Noise loudness/partial loudness | NL/PL |
| | Breathiness-cepstral peak prominence | CPP |
| | Pitch strength trend | PStrend |
| | Spectral tilt-(such as alpha ratio, regression through the long-term averaged spectrum, and others) | Tilt |
| Duration | Speech rate | speech rate |
| | Vowel to consonant ratio | VCR |
| | Attack time of voice onsets | ATT |
| | Proportion of hesitation pauses to total number of pauses | HPauses |

To obtain estimates of many of these cues, the speech signal can be divided by processor 120 into small time segments or windows. The computation of acoustic features for these small windows can capture the dynamic nature of these parameters in the form of contours.

Processor 120 can calculate the fundamental frequency contour. Global measures can be made and compared to a specially designed baseline instead of a neutral emotion. The fundamental frequency of the baseline can differ for males and females or persons of different ages. The remaining characteristics of this baseline can be determined through further analyses of all samples.

The baseline can essentially resemble the general acoustic characteristics across all emotions. The global parameters can also be calculated for pitch strength. Prior to global measurements, the respective contours can be generated. Global measurements can be made based on these contours. The f0 contour can be computed using multiple algorithms, such as autocorrelation and SWIPE'.

In one embodiment, the autocorrelation can be calculated for 10-50 ms (preferably at least 25 ms) windows with 50% overlap for all utterances. A window size of 25 ms can be used to include at least two vibratory cycles or time periods in an analysis window, assuming that the male speaker's f0 will reach as low as 80 Hz. The frequency selected by the autocorrelation method as the f0 can be the inverse of the time shift at which the autocorrelation function is maximized.

However, this calculation of f0 can include error due to the influence of energy at the resonant frequencies of the vocal tract or formants. When a formant falls near a harmonic, the energy at this frequency is given a boost. This can cause the autocorrelation function to be maximized at time periods other than the "pitch period" or the actual period of the f0, which results in an incorrect selection by the autocorrelation method.

The processor 120 can calculate f0 using other algorithms such as the SWIPE' algorithm. SWIPE' estimates the f0 by computing a pitch strength measure for each candidate pitch within a desired range and selecting the one with highest strength. Pitch strength can be determined as the similarity between the input and the spectrum of a signal with maximum pitch strength, where similarity is defined as the cosine of the angle between the square roots of their magnitudes. A signal with maximum pitch strength can be a harmonic signal with a prime number of harmonics, whose components have amplitudes that decay according to 1/frequency. Unlike other algorithms that use a fixed window size, SWIPE' can use a window size that makes the square root of the spectrum of a harmonic signal resemble a half-wave rectified cosine. The strength of the pitch can be approximated by computing the cosine of the angle between the square root of the spectrum and a harmonically decaying cosine. Unlike FFT based algorithms that use linearly spaced frequency bins, SWIPE' can use frequency bins uniformly distributed in the ERB scale.

The f0 mean, maxima, minima, range, and standard deviation of an utterance can be computed from the smoothed and corrected f0 contour. A number of dynamic measurements can also be made using the contours. In some occasions, dynamic information can be more informative than static information. For example, the standard deviation can be used as a measure of the range of f0 values in the sentence, however, it may not provide information on how the variability changes over time. Multiple f0 contours could have different global maxima and minima, while having the same means and standard deviations. Listeners may be attending to these temporal changes in f0 rather than the gross variability. Therefore, the gross trend (increasing, decreasing, or flat) can be estimated from the utterance. An algorithm can be developed to estimate the gross trends across an utterance (approximately 4 sec window) using linear regressions. Three points can be selected from each voiced segment (25%, 50%, and 75% of the segment duration). Linear regression can be fit to an utterance using these points from all voiced segments to classify the gross trend as positive, negative, or flat. The slope of this line can be obtained as a measure of the gross trend.

In addition, contour shape can play a role in emotion perception. This can be quantified by the processor 120 as the number of peaks in the f0 contour and the rate of change in the f0 contour. The number of peaks in the f0 contour are counted by picking the number of peaks and valleys in the f0 contour. The rate of change in the f0 contour can be quantified in terms of the rise and fall times of the f0 contour peaks. One method of computing the rise time of the peak is to compute the change in f0 from the valley to the following peak and dividing it by the change in time from a valley to the following peak. Similarly, fall time of the peak is calculated as the change in f0 from the peak to the following valley, divided by the change in time from the peak to the following valley.

The rate of f0 change can also be quantified using the derivative of the f0 contour and be used as a measure of the steepness of the peaks. The derivative contours can be computed from the best fit polynomial equations for the f0 contours. Steeper peaks are described by a faster rate of change, which would be indicated by higher derivative maxima. Therefore, the global maxima can be extracted from these contours and used as a measure of the steepness of peaks. This can measure the peakiness of the peaks as opposed to the peakiness of the utterance.

Intensity is essentially a measure of the energy in the speech signal. Intensity can be computed for 10-50 ms (preferably at least 25 ms) windows with a 50% overlap. In each window, the root mean squared (RMS) amplitude can be determined. In some cases, it may be more useful to convert the intensity contour to decibels (dB) using the following formula:

$$10*\log_{10}[\Sigma(\text{amp})^2/(fs*\text{window size})]^{1/2}$$

The parameter "amp" refers to the amplitude of each sample, and fs refers to the sampling rate. The intensity contour of the signal can be calculated using this formula. The five global parameters can be computed from the smoothed RMS energy or intensity contour and can be normalized for each speaker using the respective averages of each parameter across all emotions. In addition, the attack time and duty cycle of syllables can be measured from the intensity contour peaks, since each peak may represent a syllable.

Similar measures are made using loudness and the loudness contour instead of intensity and the intensity contour.

The speaking rate (i.e. rate of articulation or tempo) can be used as a measure of duration. It can be calculated as the number of syllables per second. Due to limitations in syllable-boundary detection algorithms, a crude estimation of syllables can be made using the intensity contour. This is possible because all English syllables contain a vowel, and voiced sounds like vowels have more energy in the low to mid-frequencies (50-2000 Hz). Therefore, a syllable can be measured as a peak in the intensity contour. To remove the contribution of high frequency energy from unvoiced sounds to the intensity contour, the signal can be low-pass filtered. Then the intensity contour can be computed. A peak-picking algorithm such as detection of direction change can be used. The number of peaks in a certain window can be calculated across the signal. The number of peaks in the entire utterance, or across a large temporal window is used to compute the speaking rate. The number of peaks in a series of smaller temporal windows, for example windows of 1.5 second duration, can be used to compute a "speaking rate contour" or an estimate of how the speaking rate changes over time.

The window size and shift size can be selected based on mean voiced segment duration and the mean number of voiced segments in an utterance. The window size can be greater than the mean voiced segment, but small enough to allow six to eight measurements in an utterance. The shift size can be approximately one-third to one half of the window size. The overall speaking rate can be measured as the inverse of the average length of the voiced segments in an utterance.

In addition, the vowel-to-consonant ratio (VCR) can be measured. The hesitation pause proportion (the proportion of pauses within a clause relative to the total number of pauses).

Anger can be described by a tense voice. Therefore, parameters used to quantify high vocal tension or low vocal tension (also related to breathiness) can be useful in describing specific dimensions related to emotion perception. One of these parameters is the spectral slope. Spectral slope can be useful as an approximation of strain or tension. The spectral slope of tense voices is less steep than that for relaxed voices. However, spectral slope is typically a context dependent measure in that it varies depending on the sound produced. To quantify tension or strain, spectral tilt can be measured as the relative amplitude of the first harmonic minus the third formant (H1-A3). This can be computed using a correction procedure to compare spectral tilt across vowels and speakers. Spectral slope can also be measured using the alpha ratio or the slope of the long term averaged spectrum. Spectral tilt can be computed for one or more vowels and reported as an averaged score across the segments. Alternatively, spectral slope may be computed at various points in an utterance to determine how the voice quality changes across the utterance.

Nasality can be a useful cue for quantifying negativity in the voice. Vowels that are nasalized are typically characterized by a broader first formant bandwidth or BF1. The BF1 can be computed by the processor 120 as the relative amplitude of the first harmonic (H1) to the first formant (A1) or H1-A 1. A correction procedure for computing BF1 independent of the vowel can be used. Nasality can be computed for each voiced segment and reported as an averaged score across the segments. Alternatively. BF1 may be computed at various points in an utterance to determine how nasality changes across the utterance. The global trend in the pitch strength contour can also be computed as an additional measure of nasality.

Breathy voice quality can be measured by processor 120 using a number of parameters. Firstly, the cepstral peak prominence can be calculated. Second, the ratio of noise to partial loudness ratio or NL/PL may be computed. NL/PL can be a predictor of breathiness. The NL/PL measure can account for breathiness changes in synthetic speech samples increasing in aspiration noise and open quotient for samples of /a/ vowels. For running speech, NL/PL can be calculated for the voiced regions of the emotional speech samples, but its predictive ability of breathiness in running speech is uncertain pending further research.

In addition, other measurements of voice quality such as signal-to-noise ratio (SNR), jitter and shimmer can be obtained by the processor 120.

Before features are extracted from the f0 and intensity (or pitch and loudness) contours, a few preprocessing steps can be performed. Fundamental frequency extraction algorithms can have a certain degree of error resulting from an estimation of these values for unvoiced sounds. This can cause frequent discontinuities in the contour. As a result, correction or smoothing can be required to improve the accuracy of measurements from the f0 contour. The intensity contour can be smoothed as well to enable easier peak-picking from the contour. A median filter or average filter can be used for smoothing both the intensity and f0 contours.

Before the f0 contour can be filtered, a few steps can be taken to attempt to remove any discontinuities in the contour. Discontinuities can occur at the beginning or end of a period of voicing and are typically preceded or followed by a short section of incorrect values. Processor 120 can force to zero any value encountered in the window that is below 60 Hz. Although the male fundamental frequencies can reach 40 Hz, often times, values below 80 Hz are errors. Therefore, a compromise of 60 Hz or some other average value can be selected for initial computation. Processor 120 can then "mark" two successive samples in a window that differ by 50 Hz or more, since this would indicate a discontinuity. One sample before and after the two marked samples can be compared to the mean f0 of the sentence. If the sample before the marked samples is greater than or less than the mean by 50 Hz, then all samples of the voiced segment prior to the marked samples can be forced to zero.

In another embodiment, if the sample after the marked samples is greater than or less than the mean by 50 Hz, then all samples of the voiced segment after the marked samples can be forced to zero. If another pair of marked samples appears within the same segment, the samples following the first marked segment can be forced to zero until the second pair of marked samples. Then the contour can be filtered using the median filter. The length of each voiced segment (i.e., areas of non-zero f0 values) can be determined in samples and ms.

To determine the features that correspond to each dimension, the processor 120 can reduce the feature set to smaller sets that include the likely candidates that correspond to each dimension. The process of systematically selecting the best features (e.g., the features that explain the most variance in the data) while dropping the redundant ones is described herein as feature selection. In one embodiment, the feature selection approach can involve a regression analysis. Stepwise linear regressions may be used to select the set of acoustic measures (independent variables) that best explains the emotion properties for each dimension (dependent variable). These can be performed for one or more dimensions. The final regression equations can specify the set of acoustic features that are needed to explain the perceptual changes relevant for each dimension. The coefficients to each of the significant predictors can be used in generating a model for each dimension. Using these equations, each speech sample can be represented in a multidimensional space. These equations can constitute a preliminary acoustic model of emotion perception in SS.

In another embodiment, more complex methods of feature selection can be used such as neural networks, support vector machines, etc.

One method of classifying speech samples involves calculating the prototypical point for each emotion category based on a training set of samples. These points can be the optimal acoustic representation of each emotion category as determined through the training set. The prototypical points can serve as a comparison for all other emotional expressions during classification of novel stimuli. These points can be computed as the average acoustic coordinates across all relevant samples within the training set for each emotion.

An embodiment can identify the relationship among emotions based on their perceived similarity when listeners were provided only the suprasegmental information in American-English speech (SS). Clustering analysis can be to obtain the hierarchical structure of discrete emotion categories.

In one embodiment perceptual properties can be viewed as varying along a number of dimensions. The emotions can be arranged in a multidimensional space according to their locations on each of these dimensions. This process can be applied to perceptual distances based upon perceived emotion similarity as well. A method for reducing the number of dimensions that are used to describe the emotions that can be perceived in SS can be implemented.

Reference is made to Chapter 3 of the cited Appendix for teaching an example for determining the perceptual characteristics used by listeners in discriminating emotions in SS. This was achieved using a multidimensional scaling (MDS) procedure. MDS can be used to determine the number of dimensions needed to accurately represent the perceptual distances between emotions. The dimensional approach provides a way of describing emotions according to the magnitude of their properties on each underlying dimension. MDS analysis can represent the emotion clusters in a multidimensional space. MDS analysis can be combined with hierarchical clustering analyses (HCS) analysis to provide a comprehensive description of the perceptual relations among emotion categories. In addition, MDS can determine the perceptual and acoustic factors that influence listeners' perception of emotions in SS.

Example 2

Development of an Acoustic Model of Emotion Recognition

The example included in Chapter 3 of the cited Appendix shows that emotion categories can be described by their magnitude on three or more dimensions. Chapter 5 of the cited Appendix describes an experiment that determines the acoustic cues that each dimension of the perceptual MDS model corresponds to.

Fundamental Frequency

Williams and Stevens (1972) stated that the f0 contour may provide the "clearest indication of the emotional state of a talker." A number of static and dynamic parameters based on the fundamental frequency were calculated. To obtain these measurements, the f0 contour was computed using the SWIPE' algorithm (Camacho, 2007). SWIPE' estimates the f0 by computing a pitch strength measure for each candidate pitch within a desired range and selecting the one with highest strength. Pitch strength is determined as the similarity between the input and the spectrum of a signal with maximum pitch strength, where similarity is defined as the cosine of the angle between the square roots of their magnitudes. It is assumed that a signal with maximum pitch strength is a harmonic signal with a prime number of harmonics, whose components have amplitudes that decay according to 1/frequency. Unlike other algorithms that use a fixed window size, SWIPE' uses a window size that makes the square root of the spectrum of a harmonic signal resemble a half-wave rectified cosine. Therefore, the strength of the pitch can be approximated by computing the cosine of the angle between the square root of the spectrum and a harmonically decaying cosine. An extra feature of SWIPE' is the frequency scale used to compute the spectrum. Unlike FFT based algorithms that use linearly spaced frequency bins, SWIPE' uses frequency bins uniformly distributed in the ERB scale. The SWIPE' algorithm was selected, since it was shown to perform significantly better than other algorithms for normal speech (Camacho, 2007).

Figure 2:
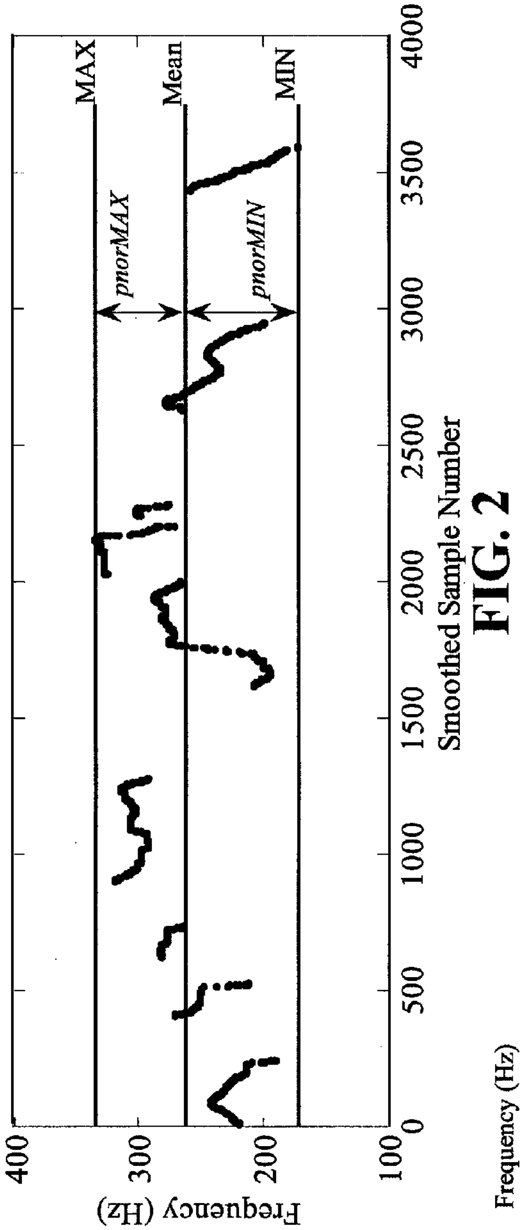
FIG. 2 depicts acoustic measurements of pnorMIN and pnorMAX from the f0 contour in accordance with an embodiment of the subject invention.
Figure 3:
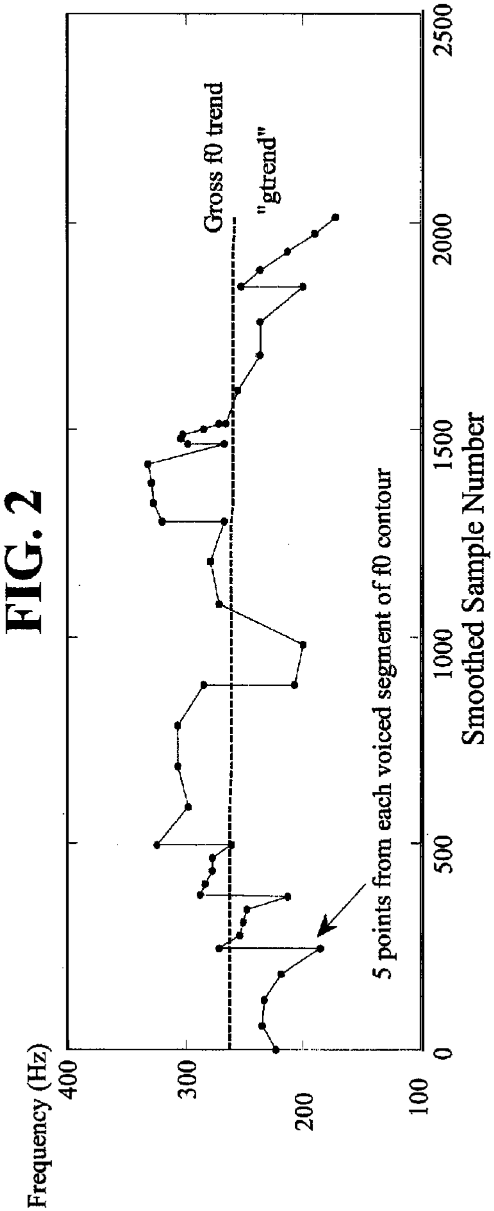
FIG. 3 depicts acoustic measurements of gtrend from the f0 contour in accordance with an embodiment of the subject invention.

Once the f0 contours were computed using SWIPE', they were smoothed and corrected prior to making any measurements. The pitch minimum and maximum were then computed from final pitch contours. To normalize the maxima and minima, these measures were computed as the absolute maximum minus the mean (referred to as "pnorMAX" for normalized pitch maximum) and the mean minus the absolute minimum (referred to as "pnorMIN" for normalized pitch minimum). This is shown in FIG. 2.

A number of dynamic measurements were also made using the contours. Dynamic information may be more informative than static information in some occasions. For example, to measure the changes in f0 variability over time, a single measure of the standard deviation of f0 may not be appropriate. Samples with the same mean and standard deviation of f0 may have different global maxima and minima or f0 contour shapes. As a result, listeners may be attending to these temporal changes in f0 rather than the gross f0 variability. Therefore, the gross trend ("gtrend") was estimated from the utterance. An algorithm was developed to estimate the gross pitch contour trend across an utterance (approximately 4 sec window) using linear regressions. Five points were selected from the f0 contour of each voiced segment (first and last samples, 25%, 50%, and 75% of the segment duration). A linear regression was performed using these points from all voiced segments. The slope of this line was obtained as a measure of the gross f0 trend.

Figure 4:
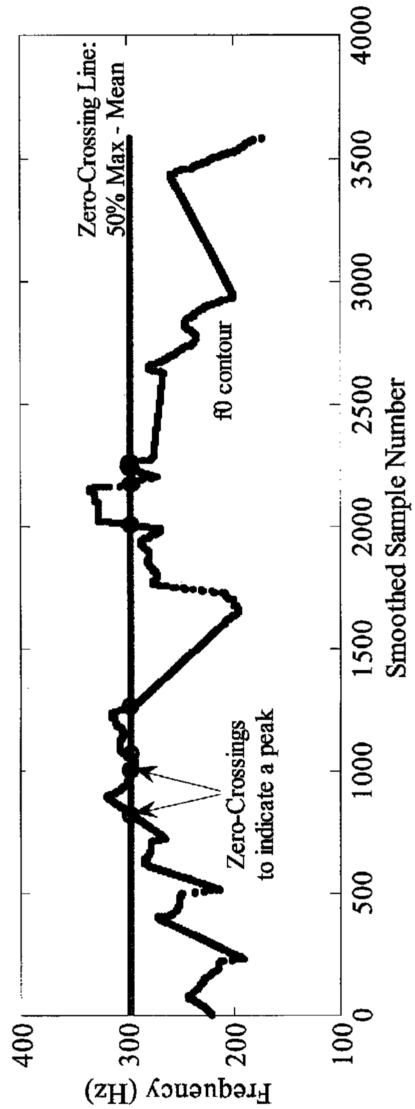
FIG. 4 depicts acoustic measurements of normnpks from the f0 contour in accordance with an embodiment of the subject invention.

In addition, f0 contour shape may play a role in emotion perception. The contour shape may be quantified by the number of peaks in the f0 contour. For example, emotions at opposite ends of Dimension 1 such as surprised and lonely may differ in terms of the number of increases followed by decreases in the f0 contours (i.e., peaks). In order to determine the number of f0 peaks, the f0 contour was first smoothed considerably. Then, a cutoff frequency was determined. The number of "zero-crossings" at the cutoff frequency was used to identify peaks. Pairs of crossings that were increasing and decreasing were classified as peaks. This procedure is shown in FIG. 4. The number of peaks in the f0 contour within the sentence was then computed. The normalized number of f0 peaks ("normnpks") parameter was computed as the number of peaks in the f0 contour divided by the number of syllables within the sentence, since longer sentences may result in more peaks (the method of computing the number of syllables is described in the Duration section below).

Figure 5:
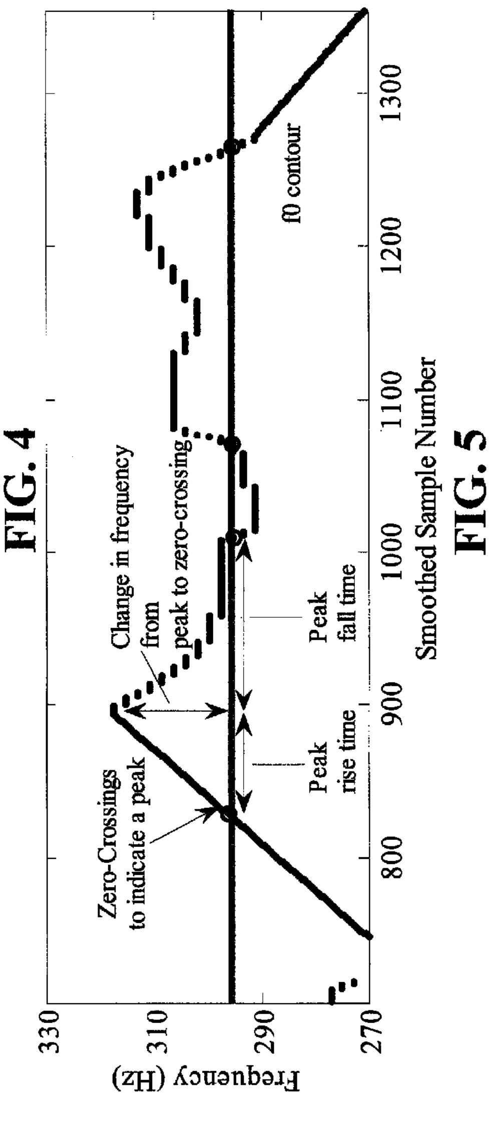
FIG. 5 depicts acoustic measurements of mpkrise and mpkfall from the f0 contour in accordance with an embodiment of the subject invention.

Another method used to assess the f0 contour shape was to measure the steepness of f0 peaks. This was calculated as the mean rising slope and mean falling slope of the peak. The rising slope ("mpkrise") was computed as the difference between the maximum peak frequency and the zero crossing frequency, divided by the difference between the zero-crossing time prior to the peak and the peak time at which the peak occurred (i.e. the time period of the peak frequency or the "peak time"). Similarly, the falling slope ("mpkfall") was computed as the difference between the maximum peak frequency and the zero crossing frequency, divided by the difference between the peak time and the zero-crossing time following the peak. The computation of these two cues are shown in FIG. 5. These parameters were normalized by the speaking rate, since fast speech rates can result in steeper peaks. The formulas for these parameters are as follows:

$$\text{peak}_{rise}=[(f_{peak\ max}-t_{zero\text{-}crossing})/(t_{peak\ max}-t_{zero\text{-}crossing})]/\text{speaking rate} \quad (11)$$

$$\text{peak}_{fall}=[(f_{peak\ max}-t_{zero\text{-}crossing}))/(t_{zero\text{-}crossing}-t_{peak\ max})]/\text{speaking rate} \quad (12)$$

The $\text{peak}_{rise}$ and $\text{peak}_{fall}$ were computed for all peaks and averaged to form the final parameters mpkrise and mpkfall.

The novel cues investigated in the present experiment include fundamental frequency as measured using SWIPE', the normnpks, and the two measures of steepness of the f0 contour peaks (mpkrise and mpkfall). These cues may provide better classification of emotions in SS, since they attempt to capture the temporal changes in f0 from an improved estimation of f0. Although some emotions may be described by global measures or gross trends in the/0 contour, others may be dependent on within sentence variations.

Intensity

Intensity is essentially a measure of the energy in the speech signal. The intensity of each speech sample was computed for 20 ms windows with a 50% overlap. In each window, the root mean squared (RMS) amplitude was determined and then converted to decibels (dB) using the following formula:

$$\text{Intensity(dB)}=20*\log_{10}[\text{mean}(\text{amp}^2)]^{1/2} \quad (13)$$

Figure 6:
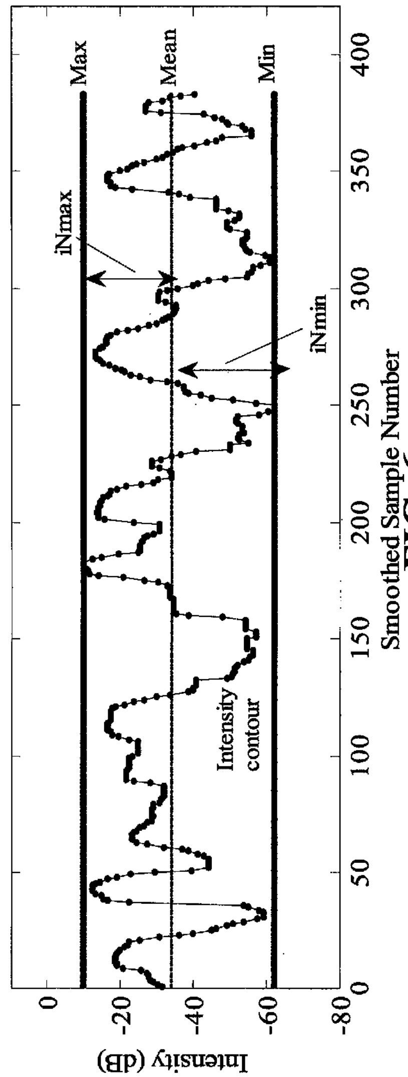
FIG. 6 depicts acoustic measurements of iNmin and iNmax from the f0 contour in accordance with an embodiment of the subject invention.

The parameter amp refers to the amplitude of each sample within a window. This formula was used to compute the intensity contour of each signal. The global minimum and maximum were extracted from the smoothed RMS energy contour (smoothing procedures described in the following Preprocessing section). The intensity minimum and maximum were normalized for each sentence by computing the absolute maximum minus the mean (referred to as "iNmax"

for normalized intensity maximum) and the mean minus the absolute minimum (referred to as "iNmin" for normalized intensity minimum). This is shown in FIG. 6.

Figure 7:
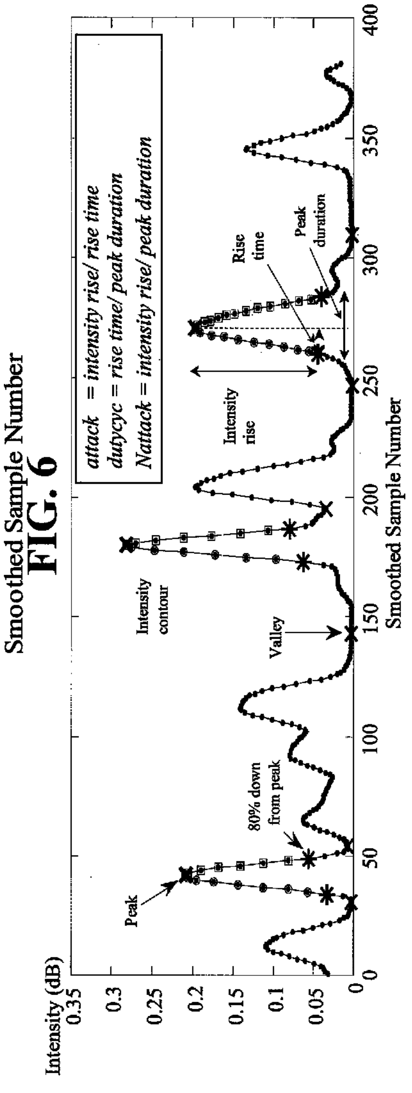
FIG. 7 depicts acoustic measurements of attack and dutycyc from the f0 contour in accordance with an embodiment of the subject invention.

In addition, the duty cycle and attack of the intensity contour were computed as an average across measurements from the three highest peaks. The duty cycle ("dutycyc") was computed by dividing the rise time of the peak by the total duration of the peak. The attack ("attack) was computed as the intensity difference for the rise time of the peak divided by the rise time of the peak. The normalized attack ("Nattack) was computed by dividing the attack by the total duration of the peak, since peaks of shorter duration would have faster rise times. Another normalization was performed by dividing the attack by the duty cycle ("normattack"). This was performed to normalize the attack to the rise time as affected by the speaking rate and peak duration. These cues have not been frequently examined in the literature. The computations of attack and dutycyc are shown in FIG. 7.

Duration

Speaking rate (i.e. rate of articulation or tempo) was used as a measure of duration. It was calculated as the number of syllables per second. Due to limitations in syllable-boundary detection algorithms, a crude estimation of syllables was made using the intensity contour. This was possible because all English syllables form peaks in the intensity contour. The peaks are areas of higher energy, which typically result from vowels. Since all syllables contain vowels, they can be represented by peaks in the intensity contour. The rate of speech can then be calculated as the number of peaks in the intensity contour. This algorithm is similar to the one proposed by de Jong and Wempe (2009), who attempted to count syllables using intensity on the decibel scale and voiced/unvoiced sound detection. However, the algorithm used in this study computed the intensity contour on the linear scale in order to preserve the large range of values between peaks and valleys. The intensity contour was first smoothed using a 7-point median filter, followed by a 7-point moving average filter. This successive filtering was observed to smooth the signal significantly, but still preserve the peaks and valleys. Then, a peak-picking algorithm was applied. The peak-picking algorithm selected peaks based on the number of reversals in the intensity contour, provided that the peaks were greater than a threshold value. Therefore, the speaking rate ("srate") was the number of peaks in the intensity contour divided by the total speech sample duration.

Figure 8:
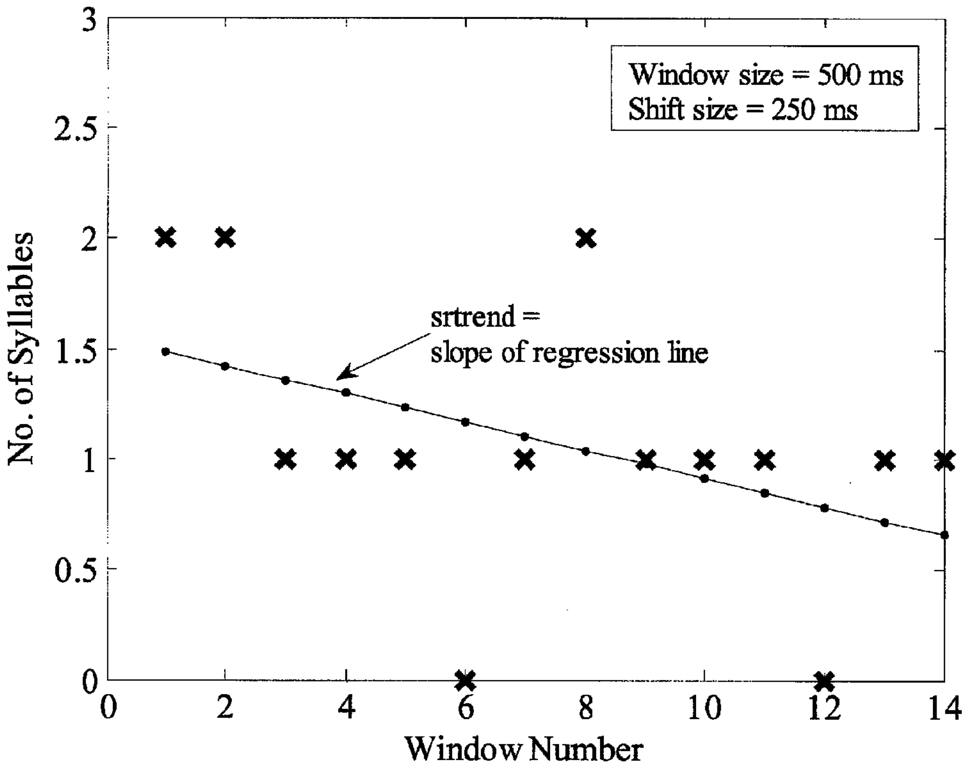
FIG. 8 depicts acoustic measurements of srtrend from the f0 contour in accordance with an embodiment of the subject invention.

In addition, the number of peaks in a certain window was calculated across the signal to form a "speaking rate contour" or an estimate of the change in speaking rate over time. The window size and shift size were selected based on the average number of syllables per second. Evidence suggests that young adults typically express between three to five syllables per second (Layer, 1994). The window size, 0.50 seconds, was selected to include approximately two syllables. The shift size chosen was one half of the window size or 0.25 seconds. These measurements were used to form a contour of the number of syllables per window. The slope of the best fit linear regression equation through these points was used as an estimate of the change in speaking rate over time or the speaking rate trend ("srtrend"). This calculation is shown in FIG. 8.

In addition, the vowel-to-consonant ratio ("VCR") was computed as the ratio of total vowel duration to the total consonant duration within each sample. The vowel and consonant durations were measured manually by segmenting the vowels and consonants within each sample using Audition software (Adobe, Inc.). Then, Matlab (v.7.1, Mathworks, Inc.) was used to compute the VCR for each sample. The pause proportion (the total pause duration within a sentence relative to the total sentence duration or "PP") was also measured manually using Audition. A pause was defined as non-speech silences longer than 50 ms. Since silences prior to stops were considered speech-related silences, these were not considered pauses unless the silence segment was extremely long (i.e., greater than 100 ms). Audible breaths or sighs occurring in otherwise silent segments were included as silent regions as these were non-speech segments used in prolonging the sentence. A subset of the hand measurements were obtained a second time by another individual in order to perform a reliability analysis. The method of calculating speaking rate and the parameter srtrend have not been previously examined in the literature.

Voice Quality

Figure 9:
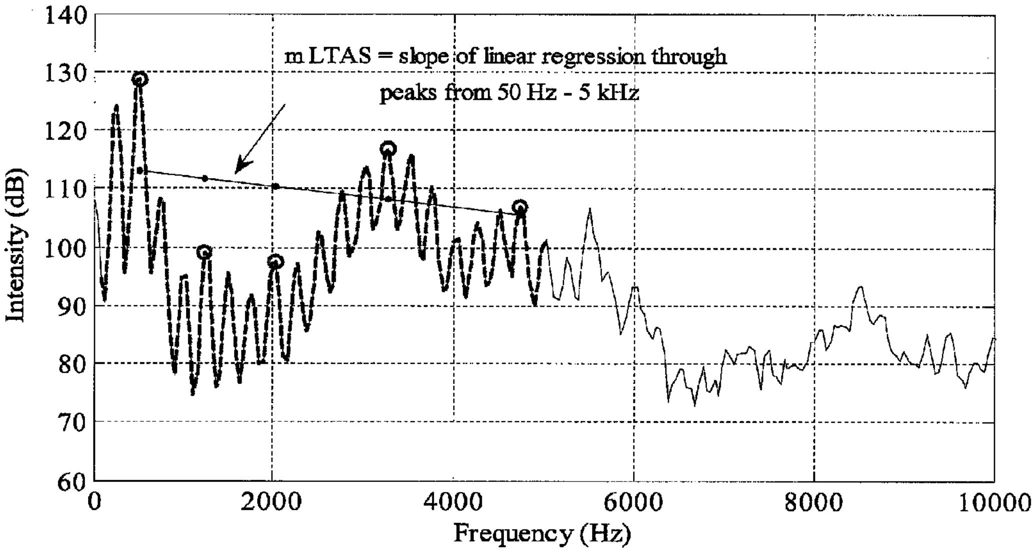
FIG. 9 depicts acoustic measurements of m_LTAS from the f0 contour in accordance with an embodiment of the subject invention.

Many experiments suggest that anger can be described by a tense or harsh voice (Scherer, 1986; Burkhardt & Sendlmeier, 2000; Gobl and Chasaide, 2003). Therefore, parameters used to quantify high vocal tension or low vocal tension (related to breathiness) may be useful in describing Dimension 2. One such parameter is the spectral slope. Spectral slope may be useful as an approximation of strain or tension (Schroder, 2003, p. 109), since the spectral slope of tense voices is shallower than that for relaxed voices. Spectral slope was computed on two vowels common to all sentences. These include /aI/ within a stressed syllable and /i/ within an unstressed syllable. The spectral slope was measured using two methods. In the first method, the alpha ratio was computed ("aratio" and "aratio2"). This is a measure of the relative amount of low frequency energy to high frequency energy within a vowel. To calculate the alpha ratio of a vowel, the long term averaged spectrum (LTAS) of the vowel was first computed. The LTAS was computed by averaging 1024-point Hanning windows of the entire vowel. Then, the total RMS power within the 1 kHz to 5 kHz band was subtracted from the total RMS power in the 50 Hz to 1 kHz band. An alternate method for computing alpha ratio was to compute the mean RMS power within the 1 kHz to 5 kHz band and subtract it from the mean RMS power in the 50 Hz to 1 kHz band ("maratio" and "maratio2"). The second method for measuring spectral slope was by finding the slope of the line that fit the spectral peaks in the LTAS of the vowels ("m_LTAS" and "m_LTAS2"). A peak-picking algorithm was used to determine the peaks in the LTAS. Linear regression was then performed using these peak points from 50 Hz to 5 kHz. The slope of the linear regression line was used as the second measure of the spectral slope. This calculation is shown in FIG. 9. The cepstral peak prominence (CPP) was computed as a measure of breathiness using the executable developed by Hillenbrand and Houde (1996). CPP determines the periodicity of harmonics in the spectral domain. Higher values would suggest greater periodicity and less noise, and therefore less breathiness (Heman-Ackah et al., 2003).

Preprocessing

Before features were extracted from the f0 and intensity contours, a few preprocessing steps were performed. Fundamental frequency extraction algorithms have a certain degree of error resulting from an estimation of these values for unvoiced sounds. This can result in discontinuities in the contour (Moore, Cohn, & Katz, 1994; Reed, Buder, & Kent, 1992). As a result, manual correction or smoothing is often required to improve the accuracy of measurements from the f0 contour. The intensity contour was smoothed as well to enable easier peak-picking from the contour. A median filter was used for smoothing both the intensity and f0 contours. The output of the filter was computed by selecting a window containing an odd number of samples, sorting the samples, and then computing the median value of the window (Restrepo & Chacon, 1994). The median value was the output of the filter. The window was then shifted forward by a single sample and the procedure was repeated. Both the f0 contour and the intensity contour were filtered using a five-point median filter with a forward shift of one sample.

Before the f0 contour was filtered, a few steps were taken to attempt to remove any discontinuities in the contour. First, any value below 50 Hz was forced to zero. Although the male fundamental frequencies can reach 40 Hz, often times, values below 50 Hz were frequently in error. Comparisons of segments below 50 Hz were made with the waveform to verify that these values were errors in f0 calculation and not in fact, the actual f). Second, some discontinuities occurred at the beginning or end of a period of voicing and were typically preceded or followed by a short section of incorrect values. To remove these errors, two successive samples in a window that differed by 50 Hz or more were "marked," since this typically indicated a discontinuity. These samples were compared to the mean f0 of the sentence. If the first marked sample was greater than or less than the mean by 50 Hz, then all samples of the voiced segment prior to and including this sample was forced to zero. Alternately, if the second marked sample was greater than or less than the mean by 50 Hz, then this sample was forced to zero. The first marked sample was then compared with each following sample until the difference no longer exceeded 50 Hz.

Feature Selection

A feature selection process was used to determine the acoustic features that corresponded to each dimension. Feature selection is the process of systematically selecting the best acoustic features along a dimension, i.e., the features that explain the most variance in the data. The feature selection approach used in this experiment involved a linear regression analysis. SPSS was used to compute stepwise linear regressions to select the set of acoustic measures (dependent variables) that best explained the emotion properties for each dimension (independent variable). Stepwise regressions were used to find the acoustic cues that accounted for a significant amount of the variance among stimuli on each dimension. A mixture of the forward and backward selection models was used, in which the independent variable that explained the most variance in the dependent variable was selected first, followed by the independent variable that explained the most of the residual variance. At each step, the independent variables that were significant at the 0.05 level were included in the model (entry criteria $p \leq 0.28$) and predictors that were no longer significant were removed (removal criteria $p \geq 0.29$). The optimal feature set included the minimum set of acoustic features that are needed to explain the perceptual changes relevant for each dimension. The relation between the acoustic features and the dimension models were summarized in regression equations.

Since this analysis assumed that only a linear relationship exists between the acoustic parameters and the emotion dimensions, scatterplots were used to confirm the linearity of the relevant acoustic measures with the emotion dimensions. Parameters that were nonlinearly related to the dimensions were transformed as necessary to obtain a linear relation. The final regression equations are referred to as the acoustic dimension models and formed the preliminary acoustic model of emotion perception in SS.

To determine whether an acoustic model based on a single sentence or speaker was better able to represent perception, the feature selection process was performed multiple times using different perceptual models. For the training set, separate perceptual MDS models were developed for each speaker (Speaker 1, Speaker 2) in addition to the overall model based on all samples. For the $test_1$ set, separate perceptual MDS models were developed for each speaker (Speaker 1, Speaker 2), each sentence (Sentence 1, Sentence 2), and each sentence by each speaker (Speaker 1 Sentence 1, Speaker 1 Sentence 2, Speaker 2 Sentence 1, Speaker 2 Sentence 2), in addition to the overall model based on all samples from both speakers.

Model Classification Procedures

The acoustic dimension models were then used to classify the samples within the trclass and $test_1$ sets. The acoustic location of each sample was computed based on its acoustic parameters and the dimension models. The speech samples were classified into one of four emotion categories using the k-means algorithm. The emotions that comprised each of the four emotion categories were previously determined in the hierarchical clustering analysis. These included Clusters or Categories 1 through 4 or happy, content-confident, angry, and sad. The labels for these categories were selected as the terms most frequently chosen as the modal emotion term by participants in Chapter 2. The label "sad" was the only exception. The term "sad" was used instead of "love," since this term is more commonly used in most studies and may be easier to conceptualize than "love."

The k-means algorithm classified each test sample as the emotion category closest to that sample. To compute the distance between the test sample and each emotion category, it was necessary to determine the center point of each category. These points acted as the optimal acoustic representation of each emotion category and were based on the training set samples. Each of the four center points were computed by averaging the acoustic coordinates across all training set samples within each emotion category. For example, the center point for Category 2 (angry) was calculated as an average of the coordinates of the two angry samples. On the other hand, the coordinates for the center of Category 1 (sad) were computed as an average of the two samples for bored, embarrassed, lonely, exhausted, love, and sad. Similarly, the center point for happy or Category 3 was computed using the samples from happy, surprised, funny, and anxious, and Category 4 (content/confident) was computed using the samples from annoyed, confused, jealous, confident, respectful, suspicious, content, and interested.

The distances between the test set sample (from either the trclass or $test_1$ set) and each of the four center points were calculated using the Euclidian distance formula as follows. First, the 3D coordinates of the test sample and the center point of an emotion category were subtracted to determine distances on each dimension. Then, these distances were squared and summed together. Finally, the square root of this number was calculated as the emotion distance (ED). This is summarized in Equation 5-4 below.

$$ED=[(\Delta\text{ Dimension }1)^2+(\Delta\text{ Dimension }2)^2+(\Delta\text{ Dimension }3)^2]^{1/2} \quad (14)$$

For each sample, the ED between the test point and each of the four center emotion category locations was computed. The test sample was classified as the emotion category that was closest to the test sample (the category for which the ED was minimal).

The model's accuracy in emotion predictions was calculated as percent correct scores and d' scores. Percent correct scores (i.e., the hit rate) were calculated as the number of times that all emotions within an emotion category were correctly classified as that category. For example, the percent correct for Category 1 (sad) included the "bored," "embarrassed," "exhausted," and "sad" samples that were correctly classified as Category 1 (sad). However, it was previously suggested that the percent correct score may not be a suitable measure of accuracy, since this measure does not account for the false alarm rate. In this case, the false alarm rate was the number of times that all emotions not belonging to a particular emotion category were classified as that category. For example, the false alarm rate for Category 1 (sad) was the number of times that "angry," "annoyed," "anxious," "confident," "confused," "content," and "happy" were incorrectly classified as Category 1 (sad). Therefore, the parameter d' was used in addition to percent correct scores as a measure of model performance, since this measure accounts for the false alarm rate in addition to the hit rate.

Two-Dimensional Perceptual Model

Preliminary results suggested that the outcomes of the feature selection process might have been biased by noise since many of the 19 emotions were not easy for listeners to perceive. Therefore, the entire analysis reported was completed using 11 emotions—the emotions formed at a clustering level of 2.0. To obtain the overall model representing the new training set, a MDS analysis using the ALSCAL model was performed on the 11 emotions (the d' matrix for these emotions are shown in Table 5-5). Since the new training set was equivalent to the trclass set, these will henceforth be referred to as the training set.

TABLE 5-5

Matrix of d' values for 11 emotions (AG = angry; AO = annoyed; AX = anxious; BO = bored; CI = confident; CU = confused; CE = content; EM = embarrassed; EX = exhausted; HA = happy; SA = sad) submitted for multidimensional scaling analysis.

| | AG | A0 | AX | BO | CI | CU | CE | EM | EX | HA | SA |
|---|---|---|---|---|---|---|---|---|---|---|---|
| AG | 0.00 | 2.99 | 4.49 | 4.14 | 2.41 | 4.01 | 4.38 | 4.67 | 3.86 | 5.15 | 5.58 |
| A0 | 2.99 | 0.00 | 3.45 | 3.16 | 1.75 | 2.20 | 2.49 | 3.26 | 3.08 | 3.86 | 3.44 |
| AX | 4.49 | 3.45 | 0.00 | 5.34 | 3.02 | 3.31 | 2.11 | 4.96 | 4.63 | 2.69 | 3.53 |
| BO | 4.14 | 3.16 | 5.34 | 0.00 | 3.62 | 3.31 | 2.90 | 2.70 | 2.68 | 4.73 | 3.31 |
| CI | 2.41 | 1.75 | 3.02 | 3.62 | 0.00 | 1.83 | 2.09 | 3.59 | 3.48 | 2.30 | 3.41 |
| CU | 4.01 | 2.20 | 3.31 | 3.31 | 1.83 | 0.00 | 1.97 | 3.05 | 2.85 | 2.71 | 2.83 |
| CE | 4.38 | 2.49 | 2.11 | 2.90 | 2.09 | 1.97 | 0.00 | 2.93 | 2.47 | 2.32 | 3.09 |
| EM | 4.67 | 3.26 | 4.96 | 2.70 | 3.59 | 3.05 | 2.93 | 0.00 | 2.01 | 5.37 | 1.60 |
| EX | 3.86 | 3.08 | 4.63 | 2.68 | 3.48 | 2.85 | 2.47 | 2.01 | 0.00 | 3.63 | 2.22 |
| HA | 5.15 | 3.86 | 2.69 | 4.73 | 2.30 | 2.71 | 2.32 | 5.37 | 3.63 | 0.00 | 3.81 |
| SA | 5.58 | 3.44 | 3.53 | 3.31 | 3.41 | 2.83 | 3.09 | 1.60 | 2.22 | 3.81 | 0.00 |

Analysis of the R-squared and stress measures as a function of the dimensionality of the stimulus space revealed that a 2D solution was optimal instead of a 3D solution as previously determined (R-squared and stress are shown in the cited Appendix). The 2D solution was adapted for model development and testing. The locations of the emotions in the 2D stimulus space is shown in the cited Appendix, and the actual MDS coordinates for each emotion are shown in Table 5-6. These dimensions were very similar to the original MDS dimensions. Since both dimensions of the new perceptual model closely resembled the original dimensions, the original acoustic predictions were still expected to apply. Dimension 1 separated the happy and sad clusters, particularly "anxious" from "embarrassed." As previously predicted in Chapter 3, this dimension may separate emotions according to the gross f0 trend, rise and/or fall time of the f0 contour peaks, and speaking rate. Dimension 2 separated angry from sad potentially due to voice quality (e.g. mean CPP and spectral slope), emphasis (attack time), and the vowel-to-consonant ratio.

The two classification procedures were modified accordingly to include the reduced training set. The four emotion categories forming the training set now consisted of the same emotions as the test sets. Category 1 (sad) included bored, embarrassed, exhausted, and sad. Category 2 (angry) was still based on only the emotion angry. Category 3 (happy) consisted of happy and anxious, and Category 4 (content/confident) included annoyed, confused, confident, and content,

TABLE 5-6

Stimulus coordinates of all listener judgments of the 19 emotions arranged in ascending order for each dimension

| Dimension 1 | | Dimension 2 | |
|---|---|---|---|
| AX | −1.75 | AG | −2.16 |
| HA | −1.65 | AO | −0.90 |
| CI | −0.91 | CI | −0.57 |
| AG | −0.36 | BO | −0.29 |
| CE | −0.20 | EX | 0.18 |
| CU | −0.16 | CE | 0.37 |
| AO | 0.22 | AX | 0.38 |
| SA | 0.77 | CU | 0.39 |
| EX | 1.06 | EM | 0.52 |
| BO | 1.49 | HA | 0.79 |
| EM | 1.50 | SA | 1.30 |

(AG = angry; AO = annoyed; AX = anxious; BO = bored; CI = confident; CU = confused; CE = content; EM = embarrassed; EX = exhausted; HA = happy; SA = sad).

Perceptual Experiment

Perceptual judgments of one sentence expressed in 19 emotional contexts by two speakers were obtained using a discrimination task. Although two sentences were expressed by both speakers, only one sentence from each speaker was used for model development in order the speakers' best expression. This permitted an assessment of a large number of emotions at the cost of a limited number of speakers. However, an analysis by sentence was necessary to ensure that both sentences were perceived equally well in SS. This required an extra perceptual test in which both sentences expressed by both speakers were evaluated by listeners. Thus, the $test_1$ set sentences were evaluated along with additional speakers in an 11-item identification task described in Experiment 2. Perceptual estimates of the speech samples within only the training and $test_1$ sets are summarized here to compare the classification results of the model to listener perception.

Perceptual Data Analysis

Although an 11-item identification task was used, responses for emotions within each of the four emotion categories were aggregated and reported in terms of accuracy per emotion category. This procedure was performed to parallel the automatic classification procedure. In addition, this method enables assessment of perception for a larger set of emotion categories (e.g. 6, 11, or 19). Identification accuracy of the emotions was assessed in terms of percent correct and d'. These computations were equivalent to those made for calculating model performance using the k-means classifier. Percent correct scores were calculated as the number of times that an emotion was correctly identified as any emotion within a category. For example, correct judgments for Category 1 (happy) included "happy" judged as happy and anxious, and "anxious" judged as anxious and happy. Similarly, "bored" samples judged as "bored," embarrassed, exhausted, or sad (i.e., the emotions comprising Category 1) were among the judgments accepted as correct for Category 2. In addition, the d' scores were computed as a measure of listener performance that normalizes the percent correct scores by the false alarm rates (i.e., the number of times that any emotion from three emotion categories were incorrectly identified as the fourth emotion category).

The validity of the model was tested by comparing the perceptual and acoustic spaces of the training set samples. Similar acoustic spaces would suggest that the acoustic cues selected to describe the emotions are representative of listener perception. This analysis was completed for each speaker to determine whether a particular speaker better described listener perception than an averaged model. An additional test of validity was performed by classifying the emotions of the training set samples into four emotion categories. Two basic classification algorithms were implemented, since the goal of this experiment was to develop an appropriate model of emotion perception instead of the optimal emotion classification algorithm. The classification results were then compared to listener accuracy to estimate model performance relative to listener perception.

The ability of the model to generalize to novel sentences by the same speakers was analyzed by comparing and the perceptual space of the training set samples with the acoustic space of the $test_1$ set samples. In addition, the $test_1$ set samples were also classified into four emotion categories. To confirm that the classification results were not influenced by the speaker model or the linguistic prosody of the sentence, these samples were classified according to multiple speaker and sentence models. Specifically, five models were developed and tested (two speaker models, two sentence models, and one averaged model). The results are reported in this section.

Perceptual Test Results

Perceptual judgments of the training and $test_1$ sets were obtained from an 11-item identification task. Accuracy for the training set was calculated after including within-category confusions for each speaker and across both speakers. Since some samples were not perceived above chance level (1/11 or 0.09), two methods were employed for dropping samples from the analysis. In the first procedure, samples identified at or below chance level were dropped. For the training set, only the "content" sample by Speaker 1 was dropped, since listeners correctly judged this sample as content only nine percent of the time. However, this analysis did not account for within-cluster confusions. In certain circumstances, such as when the sample was confused with other emotions within the same emotion cluster, the low accuracy could be overlooked. Similarly some sentences may have been recognized with above chance accuracy, but were more frequently categorized as an incorrect emotion category. Therefore, a second analysis was performed based on the emotion cluster containing the highest frequency of judgments. Samples that were not correctly judged as the correct emotion cluster after the appropriate confusions were aggregated, were excluded. The basis for this exclusion is that these samples were not valid representations of the intended emotion. Accordingly, the "bored" and "content" samples were dropped from Speaker 1 and the "confident" and "exhausted" samples were dropped from Speaker 2. Results are shown in Table 5-7. When all sentences were included in the analysis, accuracy was at d' of 2.06 (83%) for Category 1 (happy), 1.26 (63%) for Category 2 (content-confident), 3.20 (92%) for Category 3 (angry), and 2.17 (68%) for Category 4 (sad). After dropping the sentence perceived at chance level, Category 2 improved to 1.43 (70%). After the second exclusion criterion was implemented, Category 2 improved to 1.84 (74%) and Category 4 improved to 2.17 (77%). It is clear that the expressions from Categories 1 and 3 were substantially easier to recognize from the samples from Speaker 1 (2.84 and 3.95, respectively, as opposed to 1.74 and 3.11). Speaker 1 samples from Category 4 were also better recognized than Speaker 2. This pattern was apparent through analyses using exclusion criteria as well. On the other hand, Speaker 2 samples for Category 2 were identified with equal accuracy as the Speaker 1 samples.

To perform an analysis by sentence, accuracy for the $test_1$ set was computed for each speaker, each sentence, and across both speakers and sentences. Reanalysis using the same two exclusionary criteria were also implemented. Results are shown in Table 5-8. In the analysis of all sentences, differences in the accuracy perceived for the two sentences were small (difference in d' of less than 0.18) for all categories. The reanalysis using only the "Above Chance Sentences" did not change this difference. However, the reanalysis using the "Correct Category Sentences" resulted in an increase in these sentence differences, in favor of Sentence 2. However, since a small sample was used and the difference in d' scores was small (less than 0.42), it is not clear whether a true sentence effect is present.

Continuing with the experiment described in Chapter 5 of the cited Appendix, the acoustic features were computed for the training and $test_1$ set samples using the procedures described above. Most features were computed automatically in Matlab (v.7.0), although a number of features were automatically computed using hand measured vowels, consonants, and pauses. The raw acoustic measures are shown in Table 5-9.

To develop an acoustic model of emotion perception in SS, a feature selection process can be performed to determine the acoustic features that correspond to each dimension of each perceptual model. In an embodiment, twelve two-dimensional perceptual models were developed. These included an overall model and two speaker models using the training set and an overall model, two speaker models, two sentence models, and four sentence-by-speaker models using the $test_1$ set samples. Stepwise regressions were used to determine the acoustic features that were significantly related to the dimensions for each perceptual model. The significant predictors and their coefficients are summarized in regression equations shown in Table 5-11. These equations formed the acoustic model and were used to describe each speech sample in a 2D acoustic space. The acoustic model that described the "Overall" training set model included the parameters aratio2, srate, and pnorMIN for Dimension 1 (parameter abbreviations are outlined in Table 5-1). These cues were predicted to correspond to Dimension 1 because this dimension separated emotions according to energy or "activation." Dimension 2 was described by normattack (normalized attack time of the intensity contour) and normpnorMIN (normalized minimum pitch, normalized by speaking rate) since Dimension 2 seemed to perceptually separate angry from the rest of emotions by a staccato-like prosody. Interestingly, these cues were not the same as those used to describe the overall model of the $test_1$ set. Instead of pnorMIN and aratio2 for Dimension 1, iNmax (normalized intensity maximum), pnorMAX (normalized pitch maximum), and dutycyc (duty cycle of the intensity contour) were included in the model. Dimension 2 included srate, mpkrise (mean f0 peak rise time) and srtrend (speaking rate trend).

Figure 10:
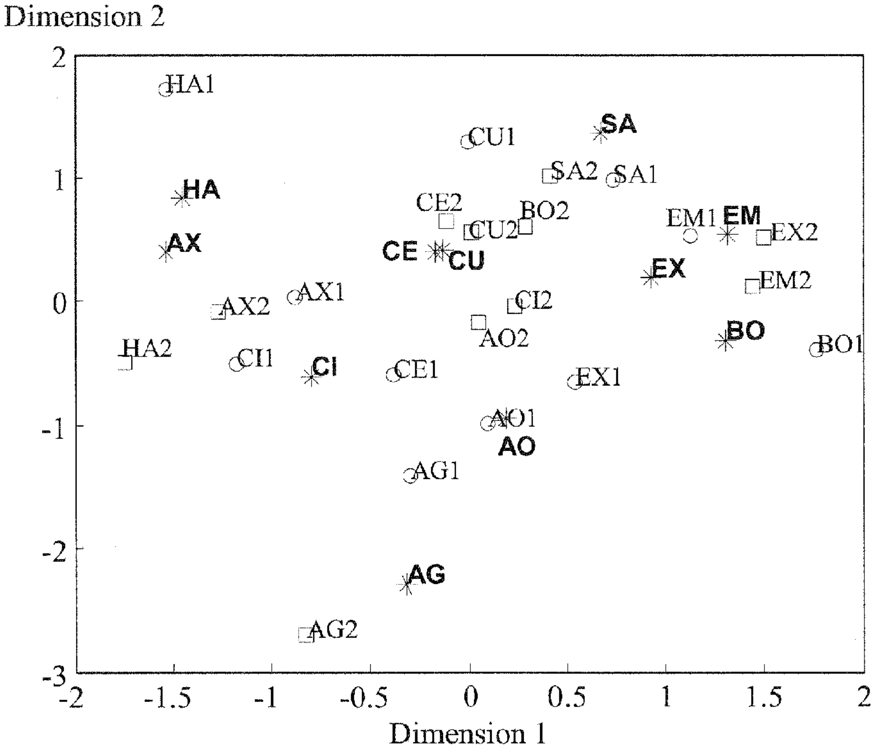
FIG. 10 depicts standardized predicted acoustic values for Speaker 1 (open circles and numbered "1") and Speaker 2 (open squares and numbered "2") and perceived MDS values (stars) for the training set according to the Overall perceptual model in accordance with an embodiment of the subject invention.
Figure 11A:
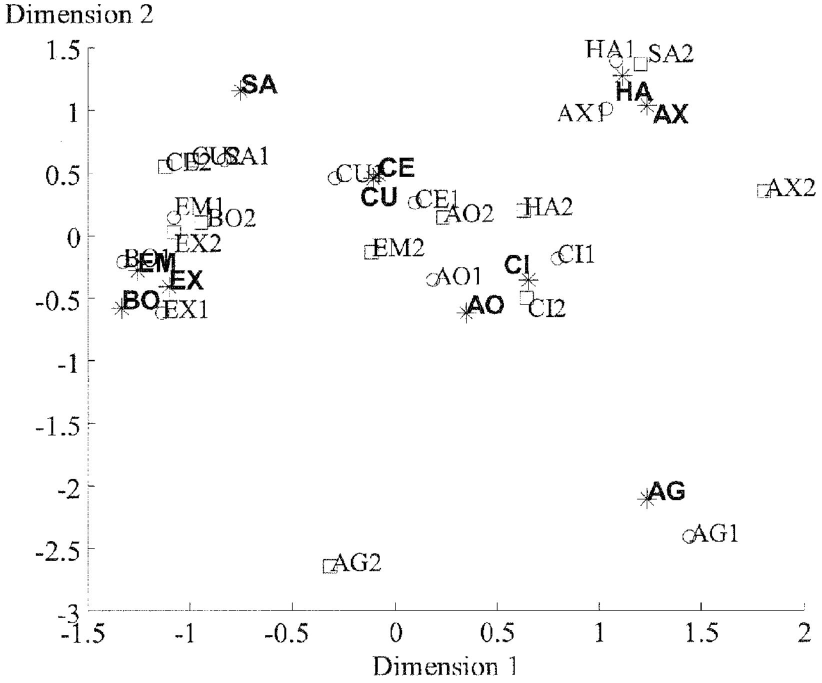
Figure 11B:
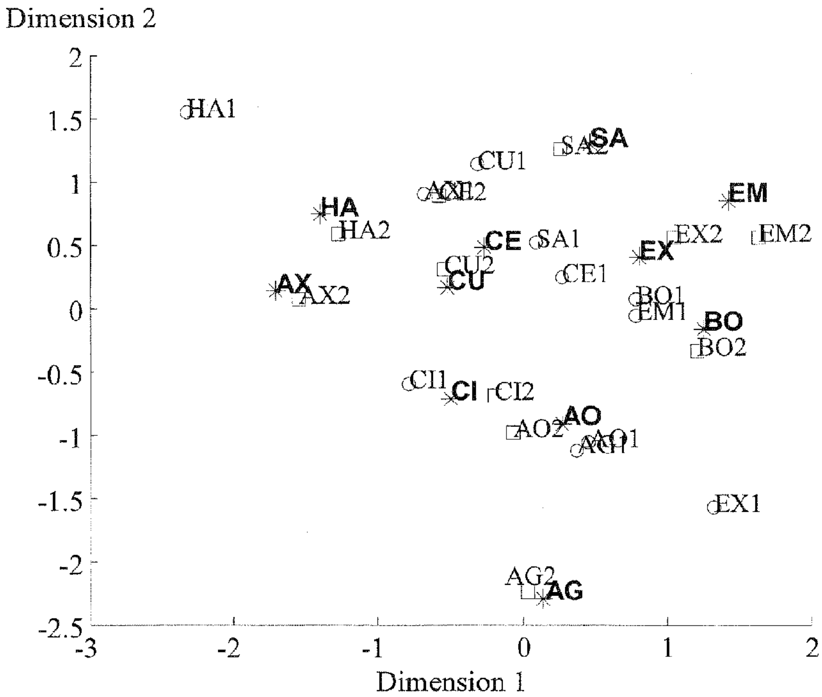

To determine how closely the acoustic space represented the perceptual space, the "predicted" acoustic values and the "perceived" MDS values were plotted in the 2D space. However, the MDS coordinates for the perceptual space are somewhat arbitrary. As a result, a normalization procedure was required. The perceived MDS values and each speaker's predicted acoustic values for all 11 emotions of the training set were converted into standard scores (z-scores) and then graphed using the Overall model (shown in FIG. 10) and the two speaker models (shown in FIG. 11A-11B). From these figures, it is clear that the individual speaker models better represented their corresponding perceptual models than the Overall model. Nevertheless, the Speaker 2 acoustic model did not perform as well at representing the Speaker 1 samples for emotions such as happy, anxious, angry, exhausted, sad, and confused. The Speaker 1 model was able to separate Category 3 (angry) very well from the remaining emotions based on Dimension 2. Most of the samples for Category 4 (sad) matched the perceptual model based on Dimension 1, except the sad sample from Speaker 2. In addition, the Speaker 2 samples for happy, anxious, embarrassed, content, confused, and angry were far from the perceptual model values. In other words, the individual speaker models resulted in a better acoustic representation of the samples from the respective speaker, however, these models were not able to generalize as well to the remaining speaker. Therefore, the Overall model may be a more generalizable representation of perception, as this model was able to place most samples from both speakers in the correct ballpark of the perceptual model.

Figure 12A:
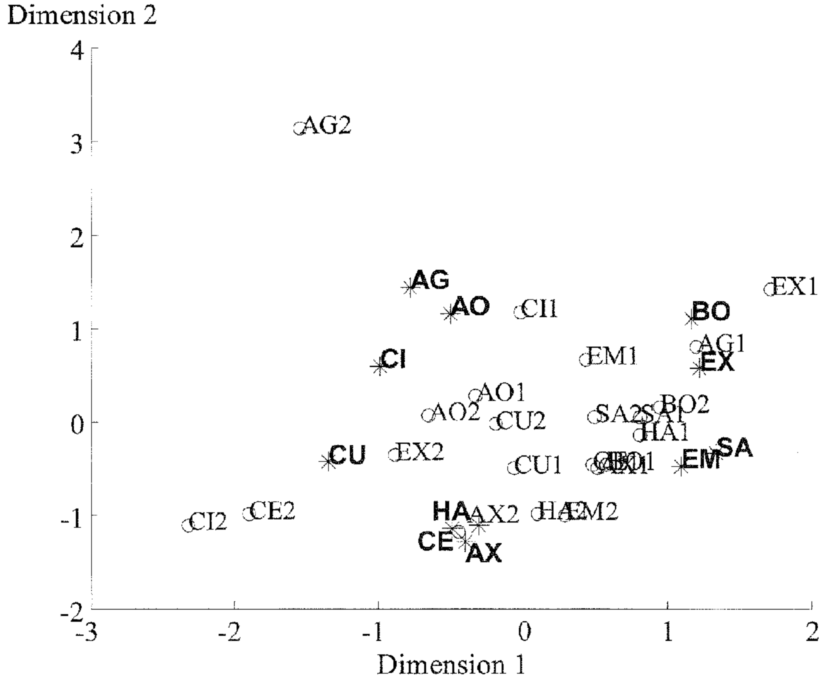
Figure 12B:
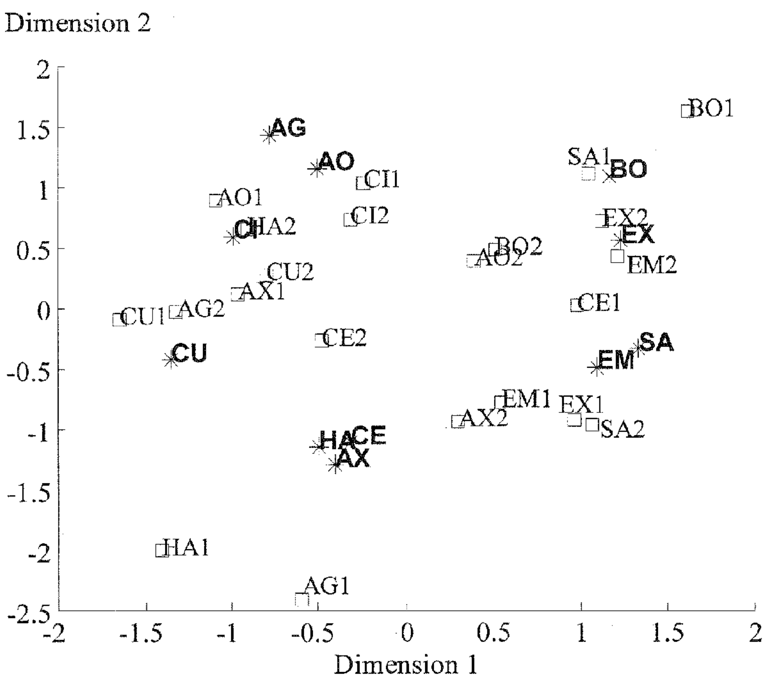
Figure 13A:
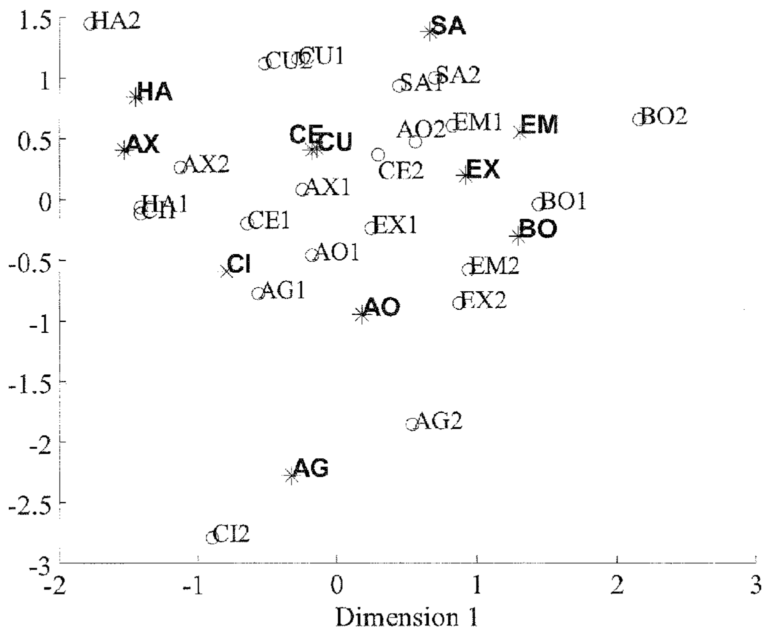
Figure 13B:
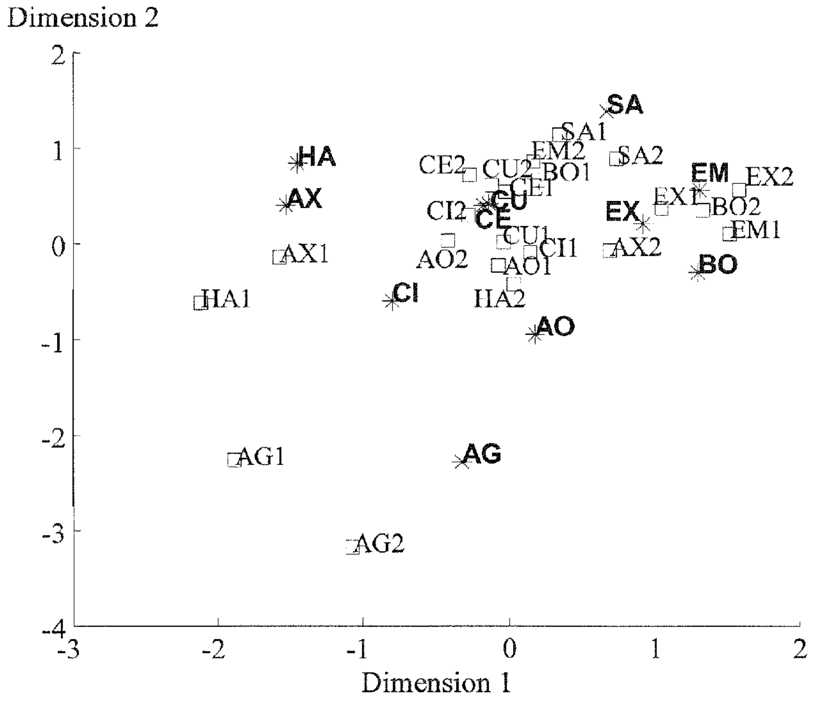

The predicted and perceived values were also computed for the $test_1$ set using the Overall perceptual model formed from the $test_1$ set. Since this set contained two samples from each speaker, the acoustic predictions for each speaker using the Overall model are shown separately in FIG. 12A-12B. These results were then compared to the predicted values for the $test_1$ set obtained for the Overall perceptual model formed from the training set (shown in FIG. 13A-13B). The predicted values obtained using the training set model seemed to better match the perceived values, particularly for Speaker 2. Specifically, Categories 3 and 4 (angry and sad) were closer to the perceptual MDS locations of the Overall training set model; however, the better model was not evident through visual analysis. In order to evaluate the better model, these samples were classified into separate emotion categories. Results are reported in the "Model Predictions" below.

Figure 14A:
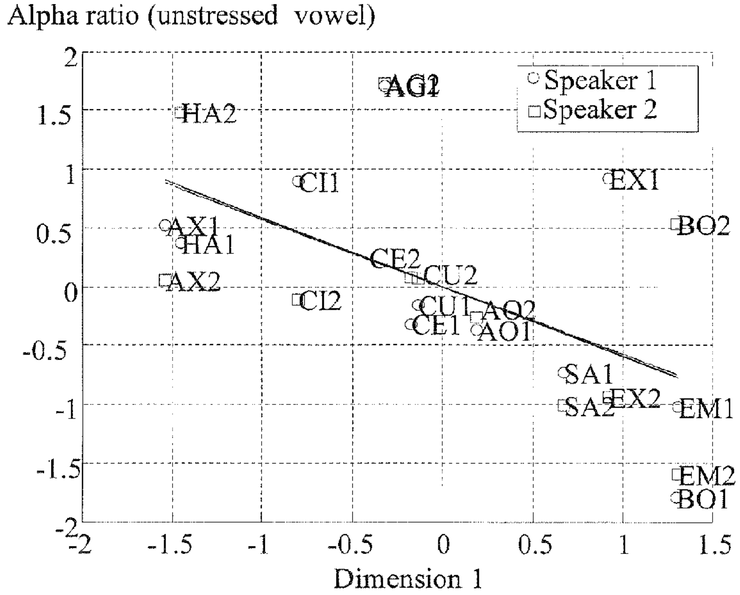
Figure 14B:
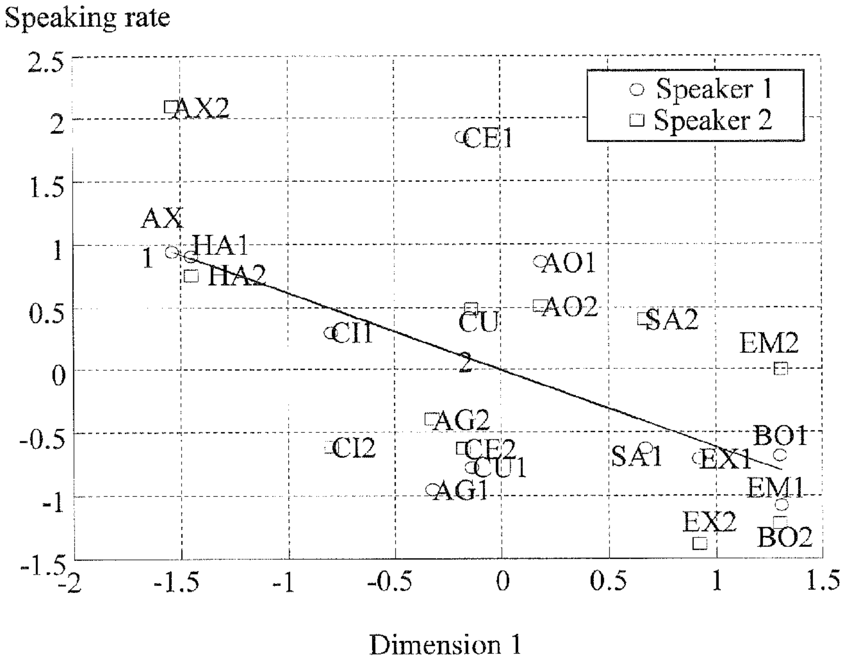
Figure 14C:
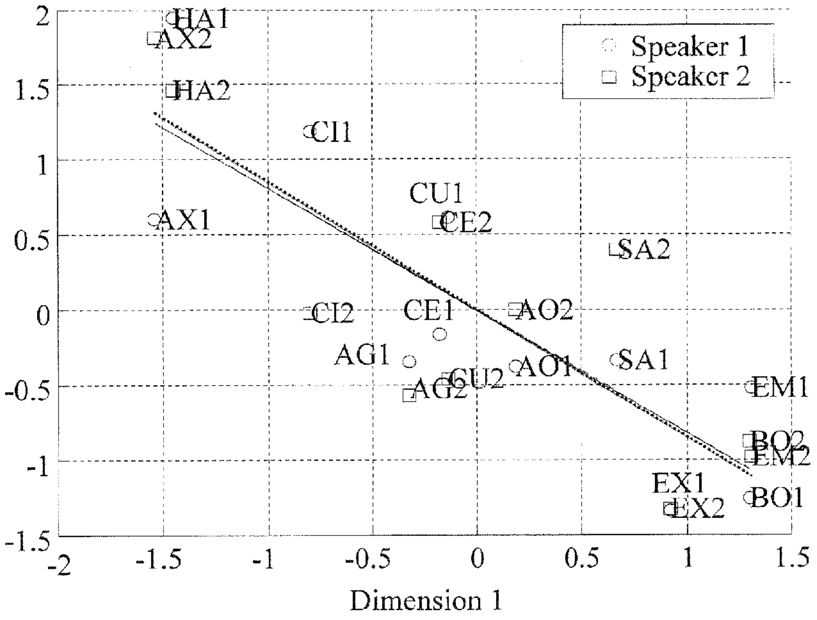
Figure 15A:
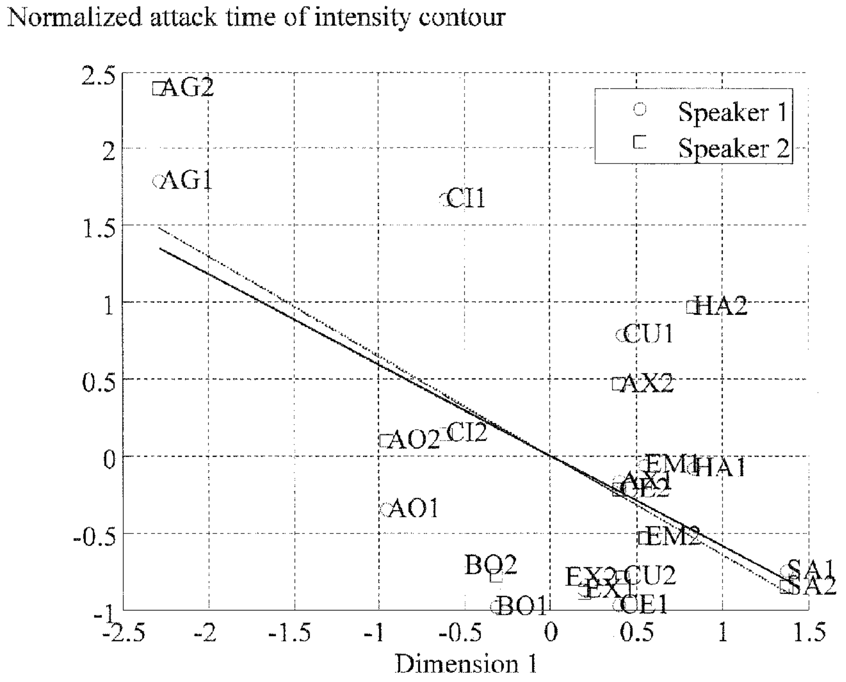
Figure 15B:
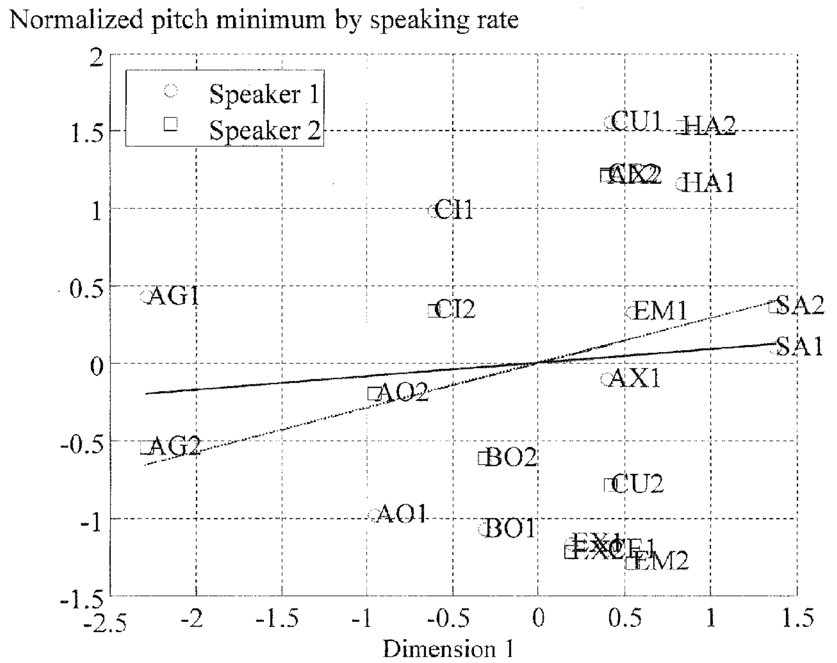

In order to validate the assumption of a linear relation between the acoustic cues included in the model and the perceptual model, scatterplots were formed using the perceived values obtained from the Overall perceptual model based on the training set and the corresponding predicted acoustic values. These are shown in FIG. 14A-14C for Dimension 1 and FIG. 15A-15B for Dimension 2. Although these graphs depict a high amount of variability (R-squares ranging from 0.347 to 0.722 for Dimension 1 and 0.007 to 0.417 for Dimension 2), these relationships were best represented as a linear one. Therefore, the use of stepwise regressions as a feature selection procedure using the non-transformed, relevant acoustic parameters was validated.

The acoustic model was first evaluated by visually comparing how closely the predicted acoustic values matched the perceived MDS values in a 2D space. Another method that was used to assess model accuracy was to classify the samples into the four emotion categories (happy, content-confident, angry, and sad). Classification was performed using the three acoustic models for the training set and the nine acoustic models for the $test_1$ set. The k-means algorithm was used as an estimate of model performance. Accuracy was calculated for each of the four emotion categories in terms of percent correct and d'. Results for the training set are reported in Table 5-12. Classification was performed for all samples, samples by Speaker 1 only, and samples by Speaker 2 only using three acoustic models (the Overall, Speaker 1, and Speaker 2 models). On the whole, the Overall model resulted in the best compromise in classification performance for both speakers. This model performed best at classifying all samples and better than the Speaker 2 model at classifying the samples from Speaker 2. Performance for Category 2 (content-confident) and Category 4 (sad) for the samples from Speaker 1 was not as good as the Speaker 1 model (75% correct for both as opposed to 100% correct). However, the Speaker 1 model was not as accurate on the whole as the Overall model. The Speaker 2 model was almost as good as the Overall model for classification of all samples with the exception of Category 4 (75% for Speaker 2 model, 88% for Overall model). These results suggest that the Overall model is the best of the three models. This model was equally good at classifying Category 1 (happy) and Category 3 (angry) for both speakers, but slightly poorer at classifying Categories 2 and 4 (content-confident and sad) for Speaker 1.

In order to determine how closely these results matched listener performance, the accuracy rates of the Overall model were compared to the accuracy of perceptual judgments (shown in Table 5-7). The Overall acoustic model was better (in percent correct and d' scores) at classifying all samples from the training set into four categories than listeners. These results were apparent for all four categories and for each speaker. While the use of exclusion criteria improved the resulting listener accuracy, performance of the acoustic model was still better than listener perception for both the "Above Chance Sentences" and "Correct Category Sentences" analyses.

The $test_1$ set was also classified into four emotion categories using the k-means algorithm. Classification was first performed for all samples, samples by Speaker 1 only, samples by Speaker 2 only, samples expressed using Sentence 1 only, and samples expressed using Sentence 2 only according to the Overall $test_1$ set model and the Overall training set model. Results are shown in Table 5-13. The performance of the Overall training set model was better than Overall $test_1$ set model for all emotion categories. While the percent correct rates were comparable for Categories 1 and 4 (happy and sad), a comparison of the d' scores revealed higher false alarm rates and thus lower d' scores for the Overall $test_1$ set model across all emotion categories. The accuracy of the Overall $test_y$, model was consistently worse than listeners for all samples and for the individual speaker samples. In contrast, the Overall training set model was better than listeners at classifying three of four emotions in terms of d' scores (Category 3 had a slightly smaller d' of 2.63 compared to listeners at 2.85).

Consistent with the classification results for all samples, the Overall training model was generally better than the Overall $test_1$ set model at classifying samples from both speakers. However, differences in classification accuracy were apparent by speaker for the Overall training set model. This model was better able to classify the samples from Speaker 2 than Speaker 1 with the only exception of Category 4 (sad). In contrast, the Overall $test_a$ set model was better at classifying Categories 2 and 3 (content-confident and angry) for the Speaker 1 samples and Categories 1 and 4 (happy and sad) for the Speaker 2 samples. Neither of these patterns were representative of listener perception as listeners were better at recognizing the Speaker 1 samples from all emotion categories. Listeners were in fact better than the Overall training set model at identifying Categories 1, 2, and 3 from Speaker 1. However, the Overall training set model's accuracy for the Speaker 2 samples was much better than listeners across all emotion categories.

No clear difference in performance by sentence was apparent for the Overall training set model. Categories 1 and 3 (happy and angry) were easier to classify from the Sentence 2 samples, but Category 4 (sad) was the reversed case. On the other hand, the Sentence 2 samples were easier to classify for Categories 1, 3, and 4 according to the Overall $test_a$ set model. The Overall training set model matched the pattern of listener perception (shown in Table 5-8 for the $test_1$ set) for the two sentences better than the Overall $test_1$ set model. Category 3 was the only discrepancy in which Sentence 2 was better recognized by the Overall training set model, but Sentence 1 was slightly easier for listeners to recognize. In addition, classification accuracy was generally higher than listener perception. Since the differences in classification and perceptual accuracy between the two sentences were generally small and varied by category, it is likely that these are not due to a sentence effect. These differences may be random variability or a result of the slightly stronger speaker difference.

A final test was performed to evaluate whether any single speaker or sentence model was better than the Overall training set model at classifying the four emotion categories. Classification was performed using the two training set speaker models and the four $test_1$ set speaker and sentence models for all samples, samples by Speaker 1 only, samples by Speaker only, Sentence 1 samples, and Sentence 2 samples. Results are shown in Table 5-14. In general, the two training set speaker models were better at classification than the $test_1$ set models. These models performed similarly in classifying all samples. The Sentence 2 $test_1$ model was the only model that came close to outperforming any of the training set models. This model's classification accuracy was better than all training set models for Categories 1 and 2 (happy and content-confident). However, it was not better than the Overall training set model or listener perception for Categories 3 and 4 (angry and sad). Therefore, the model that performed best overall was the Overall training set model. This model will be used in further testing.

Example 3

Evaluating the Model

The purpose of this second experiment was to test the ability of the acoustic model to generalize to novel samples. This was achieved by testing the model's accuracy in classifying expressions from novel speakers. Two nonsense sentences used in previous experiments and one novel nonsense sentence were expressed in 11 emotional contexts by 10 additional speakers. These samples were described in an acoustic space using the models developed in Experiment 1. The novel tokens were classified into four emotion categories (happy, sad, angry, and confident) using two classification algorithms. Classification was limited to four emotion categories since these emotions were well-discriminated in SS. These category labels were the terms most frequently chosen as the modal emotion term by participants in the pile-sort task described in Chapter 2, except "sad" (the more commonly used term in the literature). These samples were also evaluated in a perceptual identification test, which served as the reference for evaluating classification accuracy. In both cases, accuracy was measured in d' scores. A high agreement between classification and listener accuracy would confirm the validity of the perceptual-acoustic model developed in Experiment 1.

A total of 21 individuals were recruited to participate in this study. Ten participants (5 male, 5 females) served as the "speakers." Their speech was used to develop the stimulus set. The remaining 11 participants were naïve listeners (1 male, 10 females) who participated in the listening test.

Ten participants expressed three nonsense sentences in 11 emotional contexts while being recorded. Two nonsense sentences were the same as those used in model development. The final sentence was a novel nonsense sentence ("The borelips are leeming at the waketowns"). Participants were instructed to express the sentences using each of the following emotions: happy, anxious, annoyed, confused, confident, content, angry, bored, exhausted, embarrassed, and sad. All recordings for each participant were obtained within a single session. These sentences were saved as 330 individual files (10 speakers×11 emotions×3 sentences) for use in the following perceptual task and model testing. This set will henceforth be referred to as the $test_2$ set.

The stimuli evaluated in the perceptual test included the 330 samples (10 speakers×11 emotions×3 sentences) from the $test_2$ set and the 44 samples from the training set (2 speakers×11 emotions×2 sentences). This resulted in a total of 374 samples.

A perceptual task was performed in order to develop a reference to gauge classification accuracy. Participants were asked to identify the emotion expressed by each speech sample using an 11-item, closed-set, identification task. In each trial, one sample was presented binaurally at a comfortable loudness level using a high-fidelity soundcard and headphones (Sennheiser HD280Pro). The 11 emotions were listed in the previous section. All stimuli were randomly presented 10 times, resulting in 3740 trials (374 samples×10 repetitions). Participants responded by selecting the appropriate button shown on the computer screen using a computer mouse. Judgments were made using software developed in MATLAB (version 7.1; Mathworks, Inc.). The experiment took between 6.5 and 8 hours of test time and was completed in 4 sessions. The number of times each sample was correctly and incorrectly identified was entered into a similarity matrix to determine the accuracy of classification and the confusions. Identification accuracy of emotion type was calculated in terms of percent correct and d'.

To assess how well the acoustic model represents listener perception, each sample was classified into one of four emotion categories. Classification was performed using two algorithms, the k-means and the k-nearest neighbor (kNN) algorithms. The ability of the acoustic model to predict the emotions of each sample was measured using percent correct and d-prime scores, These results were compared to listener accuracy of these samples to evaluate the performance of the acoustic model relative to human listeners.

The classification procedures for the k-means algorithm were described previously. Briefly, this algorithm classified a test sample as the emotion category closest to that sample. The proximity of the test sample to the emotion category was determined by computing a "center point" of each emotion category. The kNN algorithm classified a test sample as the emotion category belonging to the majority of its k nearest samples. The samples used as a comparison were the samples included in the development of the acoustic model (i.e., the "reference samples"). It was necessary to calculate the distance between the test sample and each reference sample to determine the nearest samples. The distances between all samples were computed using Equation 5-4. The k closest samples were analyzed further for k=1 and 3. For k=1, the emotion category of the test sample was selected as the category of the closest reference sample. For k=3, the category of the test sample was chosen as the emotion category represented by the majority of the three closest reference samples. Once again, accuracy in emotion category predictions was calculated as percent correct and d' scores.

Results

In Experiment 1, acoustic models of emotion perception were developed. The optimal model was determined to be the Overall training set model. The present experiment investigated the ability of the Overall training set model to acoustically represent the emotions from 10 unfamiliar speakers. This was evaluated using two classification algorithms. Samples from 11 emotions were classified into four emotion categories. The results were compared to listener perception and are described below.

Perceptual Test Results

All speech samples within the $test_2$ set were evaluated by listeners in an 11-item identification task. Accuracy was calculated by including confusions within the four emotion categories. As described in the previous experiment, accuracy in terms of percent correct scores and d' scores was computed using three procedures. First, the entire $test_2$ set was analyzed. The remaining two procedures involved exclusion criteria for removing samples from the analysis. The first of these eliminated samples were those perceived at chance level or less based on the percent correct identification of 11 emotions. Accordingly, 55 (16.5%) samples were discarded from this analysis. The second exclusion criterion involved dropping samples that were misclassified after the within-category confusions were calculated and summed across all listeners. This resulted in the removal of 88 (26.7%) samples, which included some but not all of the samples dropped using the first exclusion rule. Results are shown in Table 5-15.

When all sentences were included in the analysis, accuracy was at 46% for Category 1 (happy), 75% for Category 2 (content-confident), 40% for Category 3 (angry), and 67% for Category 4 (sad). After dropping the sentence perceived at chance level, all categories improved to 52%, 76%, 47%, and 73%, respectively. After the second exclusion criterion was implemented, all categories improved to 72%, 79%, 61%, and 79%, respectively. In general, Categories 2 and 4 were easier to recognize. However, the recognition accuracy of Category 1 was similar to the accuracy of Categories 2 and 4 after the second exclusion criteria were implemented. In addition, the mean recognition accuracy of female speakers' samples was greater than male speakers' samples (shown in FIG. 21). The most effective speakers in expressing all four emotion categories were female Speakers 3 and 4. No single sentence was better recognized on average across all speakers. These results served as a baseline reference for the comparison of model performance.

The necessary acoustic features were computed for the $test_2$ set samples according to each acoustic model. Most features were computed automatically in Matlab (v.7.0), although a number of features were automatically computed using hand measured vowels and consonants.

It was necessary to compute reliability on a subset of the hand measurements used in computing acoustic parameters of the test set to confirm that these measurements were replicable. In contrast to the training and $test_1$ sets, pause duration was not measured as part of the $test_2$ set, since it was not determined to be a necessary cue. Hence, reliability was calculated on the only hand measurements that were necessary for computation of acoustic parameters included in the model. This included vowel duration for the stressed vowel (Vowel 1) and unstressed vowel (Vowel 2). The same colleague who performed the reliability measurements for the training and $test_a$ sets ("Judge 2") was asked to perform these measurements on a subset of the stimuli, Recall that the $test_2$ set included 330 samples (11 emotions×10 speakers×3 sentences). Measurements were repeated for 20 percent of each speaker's samples or 7 sentences per speaker. This resulted in a total of 70 samples, which is slightly more than 20 percent of the total test set sample size. Measurements made by the author and Judge 2 were correlated using Pearson's Correlation Coefficient. Both vowel duration measures were highly correlated (0.97 and 0.92, respectively), suggesting that the hand measurements were reliable. Results are shown in Table 5-16.

To test the generalization capability of the Overall training set acoustic model, the $test_2$ set stimuli were classified into four emotion categories using the k-means and kNN algorithms. Classification accuracy was reported in percent correct and d-prime scores for all samples, each of the 10 speakers, and each of the three sentences. Results of the k-means classification are shown in Table 5-17, and the results of the kNN classification for k=1 and 3 are shown in Table 5-18. The Overall training set acoustic model was equivalent to listener performance for Category 3 (angry) when tested with the k-means algorithm for all samples. For the remaining emotion categories, all three algorithms showed lower accuracy for the acoustic model than listeners. However, the general trend in accuracy was mostly preserved. Category 3 (angry) was most accurately recognized and classified, followed by Categories 4, 1, and 2 (sad, happy, and content-confident), respectively. The k-means algorithm resulted in better classification accuracy than the kNN classifiers for Categories 3 and 4 (angry and sad), but the kNN (k=1) classifier had better classification accuracy for Categories 1 and 2 (happy and content-confident). However, classification accuracy for Categories 1 and 2 was much lower than listener accuracy. In essence, performance of the kNN classifier with k=1 was similar to the k-means classifier. However, the k-means classifier was more accurate relative to listener perception than the kNN classifier.

Classification accuracy was reported for the samples from each speaker as well. Samples from Speakers 3, 4, and 5 (all female speakers) were the most accurate to classify and for listeners to recognize. In fact, with the exception of Category 1 (happy), the mean k-means and kNN (k=1) d' scores for female speakers was much greater than the mean d' for male speakers. The male-female difference for Category 1 was trivial. Classification accuracy was best for Speaker 4. Performance using the k-means and kNN (k=1) classifiers was better than listener performance for two emotion categories, but worse for the other two. Still, classification accuracy was better than listener accuracy when computed for all samples. Similarly, k-means classification accuracy for Speakers 6 and 7 and kNN (k=1) classification accuracy for Speakers 1 and 7 were better than listener accuracy for Categories 1 and 3 (happy and angry), but less for Categories 2 and 4 (content-confident and sad). It can be concluded that the acoustic model worked relatively well in representing the emotions of the most effective speakers, but was not representative of listener results for the speakers that were not as effective.

An analysis by sentence was performed to determine whether the Overall training set acoustic model was better able to acoustically represent a specific sentence. Accuracy for all classifiers across emotion categories was least for Sentence 3, the novel sentence. This trend was representative of listener perception. However, the magnitude of the difference was more substantial for the classifiers than for listeners. Accuracy for Categories 3 and 4 (angry and sad) was better than the remaining categories for all sentences and classifiers. This was in agreement with the high accuracy for Categories 3 and 4 seen in the "all samples" classification results. Since no clear sentence advantage was seen between Sentences 1 and 2 and the low classification accuracy of Sentence 3 was supported by lower perceptual accuracy of this sentence, the results suggest that the acoustic model did not favor one sentence over the others.

A number of researchers have sought to determine the acoustic signature of emotions in speech by using the dimensional approach (Schroder et al., 2001; Davitz, 1964; Huttar, 1968; Tato et al., 2002). However, the dimensional approach has suffered from a number of limitations. First, researchers have not agreed on the number of dimensions that are necessary to describe emotions in SS. Techniques to determine the number of dimensions include correlations, regressions, and the semantic differential tasks, but these have resulted in a large range of dimensions. Second, reports of the acoustic cues that correlate to each dimension have been inconsistent. While much of the literature has agreed on the acoustic properties of the first dimension which is typically "activation" (speaking rate, high mean f0, high f0 variability, and high mean intensity), the remaining dimensions have much variability. Part of this variability may be a result of differences in the stimulus type investigated. Stimuli used in the literature have varied according to the utterance length, the amount of contextual information provided, and the language of the utterance. For instance, Juslin and Laukka (2005) investigated the acoustic correlates to four emotion dimensions using short Swedish phrases and found that the high end of the activation dimension was described by a high mean f0 and f0 max and a large f0 SD. Positive valence corresponded to low mean f0 and low f0 floor. The potency dimension was described by a large f0 SD and low f0 floor, and the emotion intensity dimension correlated with jitter in addition to the cues that corresponded with activation. On the other hand, Schroeder et al. (2001) investigated the acoustic correlates to two dimensions using spontaneous British English speech from TV and radio programs and found that the activation dimension correlated with a higher f0 mean and range, longer phrases, shorter pauses, larger and faster F0 rises and falls, increased intensity, and a flatter spectral slope. The valence dimension corresponded with longer pauses, faster f0 falls, increased intensity, and more prominent intensity maxima. Finally, the set of acoustic cues studied in many experiments may have been limited. For example, Liscombe et al. (2003) used a set of acoustic cues that did not include speaking rate or any dynamic f0 measures. Lee et al. (2002) used a set of acoustic cues that did not include any duration or voice quality measures. While some of these experiments found significant associations with the acoustic cues within their feature set and the perceptual dimensions, it is possible that other features better describe the dimensions.

Hence, two experiments were performed to develop and test an acoustic model of emotions in SS. While the general objectives of the experiments reported in this chapter were similar to a handful of studies (e.g., Juslin & Laukka, 2001; Yildirim et al., 2004; Liscombe et al., 2003), these experiments differed from the literature in the methods used to overcome some of the common limitations. The specific aim of the first experiment was to develop an acoustic model of emotions in SS based on discrimination judgments and without the use of a speaker's baseline. Since the reference for assessing emotion expressivity in SS is listener judgments, the acoustic model developed in the Experiment 1 was based on the discrimination data obtained in Chapter 2. This model was based on discrimination judgments, since a same-different discrimination task avoids requiring listeners to assign labels to emotion samples. While an identification task may be more representative of listener perception, this task assesses how well listeners can associate prosodic patterns (i.e. emotions in SS) with their corresponding labels instead of how different any two prosodic patterns are to listeners. Furthermore, judgments in an identification task may be subjectively influenced by each individual's definition of the emotion terms. A discrimination task may be better for model development, since this task attempts to determine subtle perceptual differences between items. Hence, a multidimensional perceptual model of emotions in SS was developed based on listener discrimination judgments of 19 emotions (reported in Chapter 3).

A variety of acoustic features were measured from the training set samples. These included cues related to fundamental frequency, intensity, duration, and voice quality (summarized in Table 5-1). This feature set was unique because none of the cues required normalization to the speaker characteristics. Most studies require a speaker normalization that is typically performed by computing the acoustic cues relative to each speaker's "neutral" emotion. The need for this normalization limits the applications of an acoustic model of emotion perception in SS because of the practicality of obtaining a neutral expression. Therefore, the present study sought to develop an acoustic model of emotions that did not require a speaker's baseline measures. The acoustic features were computed relative to other features or other segments within the sentence.

Once computed, these acoustic measures were used in a feature selection process based on stepwise regressions to select the most relevant acoustic cues to each dimension. However, preliminary results did not result in any acoustic correlates to the second dimension. This was considered as a possible outcome, since even listeners had difficulty discriminating all 19 emotions in SS. To remove the variability contributed to the perceptual model by the emotions that were difficult to perceive in SS, the perceptual model was redeveloped using a reduced set of emotions. These categories were identified based on the HCS results. In particular, the 11 clusters formed at a clustering level of 2.0 were selected, instead of the 19 emotions at a clustering level of 0.0. The results of the new feature selection for the training set samples (i.e., the Overall training set model) showed that srate (speaking rate), aratio2 (alpha ratio of the unstressed vowel), and pnorMIN (normalized pitch minimum) corresponded to Dimension 1, and normpnorMIN (normalized pitch minimum by speaking rate) and normattack (normalized attack time) were associated with Dimension 2. The pnorMIN and srate features were among those hypothesized to correspond to Dimension 1 because this dimension separated emotions according to articulation rate and the magnitude of f0 contour changes. Both of these measures have been reported in the literature as corresponding with Dimension 1 (Scherer & Oshinsky, 1977; Davitz, 1964), considering that pnorMIN was a method of measuring the range of f0. The inclusion of the aratio2 feature is unusual. Computations of voice quality are typically performed on stressed vowels, to obtain a longer and less variable sample. However, this variability may be important in emotion differentiation. The acoustic features predicted to correspond to Dimension 2 included some measure of the attack time of the intensity contour peaks, as hypothesized. The feature normattack included a normalized attack time to the duty cycle of the peak, thereby accounting for the changes in attack time due to the syllable duration. In addition, the normpnorMIN cue was significant, and represents a measure of range of f0 relative to the speaking rate. Since this dimension was not clearly "valence" or a separation of positive and negative emotions, it was not possible to truly compare results with the literature. Nevertheless, cues such as speaking rate (Scherer & Oshinsky, 1977) and f0 range or variability (Scherer & Oshinsky, 1977; Uldall, 1960) have been reported for the valence dimension.

To test the acoustic model, the emotion samples within the training set were acoustically represented in a 2D space according to the Overall training set model. But first, it was necessary to convert each speaker's samples to z-scores. This was required because the regression equations were based on the MDS coordinates, which results in arbitrary units. The samples were then classified into four emotion categories. These four categories were the four clusters determined to be perceivable in SS. Results of the k-means classification revealed near 100 percent accuracy across the four emotion categories. These results were better than listener judgments of the training set samples obtained using an identification task. Near-perfect performance was expected, since the Overall training set model was developed based on these samples. To test whether the acoustic model generalized to novel utterances of the same two speakers, this model was used to classify the samples within the $test_1$ set. Results showed that classification accuracy was less for the $test_1$ set samples compared to the training set samples. However, this pattern mimicked listener performance as well. Furthermore, classification accuracy of all samples greater than listener accuracy (Category 3 of the $test_1$ set was the only exception with a 0.22 difference in d' scores).

The feature selection process was performed multiple times using different perceptual models. The purpose of this procedure was to determine whether an acoustic model based on a single sentence or speaker was better able to represent perception. For both the training and $test_1$ sets, separate perceptual MDS models were developed for each speaker. In addition, perceptual MDS models were developed for each sentence for the $test_1$ set. Results showed that classification accuracy of both the training set and $test_1$ set samples was best for the Overall training set model. Since the training set was used for model development, it was expected that performance would be higher for this model than for the $test_1$ set models.

In addition, the Overall training set model provided approximately equal results in classifying the emotions for both sentences. However, accuracy for the individual speaker samples varied. The samples from Speaker 2 were easier to classify for the $test_1$ and training set samples. This contradicted listener performance, as listeners found the samples from Speaker 1 much easier to identify. In terms of the different speaker and sentence models, the Speaker 2 training set model was better than the Speaker 1 training set model at classifying the training set samples for three of the four emotion categories. This model was equivalent to the Speaker 2 $test_1$ set model but worse than the Sentence 2 $test_1$ set model at classifying the $test_1$ set samples. While the Sentence 2 $test_1$ set model performed similarly to the Overall training set model, the latter was better at classifying Categories 3 and 4 (angry and sad) while the former was better at classifying Categories 1 and 2 (happy and content-confident). The pattern exhibited by the Overall training set model was consistent with listener judgments and was therefore used in further model testing performed in Experiment 2.

While the objective of the first experiment was to develop an acoustic model of emotions in SS, the aim of the second experiment was to test the validity of the model by evaluating how well it was able to classify the emotions of novel speakers. Ten novel speakers expressed one novel and two previously used nonsense sentences in 11 emotions (i.e., the $test_2$ set). These samples were then acoustically represented using the Overall training set model. The kNN classification algorithm (for k=1 and 3) was used in addition to the k-means algorithm to evaluate model performance. Results showed that classification accuracy of all samples of the $test_1$ set was not as good as accuracy for the training and $test_2$ sets. These results occurred regardless of the classification algorithm, although the k-means algorithm performed better than both kNN methods. Listener identification accuracy was also much worse than the training and $test_1$ sets. This suggests that the low classification accuracy for the $test_2$ set may in part be due to reduced effectiveness of the speakers. The acoustic model was almost equal to listener accuracy for Category 3 (angry) using the k-means classifier (difference of 0.04). In fact, Category 3 (angry) was the easiest emotion to classify and recognize for all three sample sets. The next highest in classification and recognition accuracy for all sets was Category 4 (sad). The only exception was classification accuracy for the training set samples. Accuracy of Category 4 was less than Category 1; however, this discrepancy may have been due to the small sample size (one Category 4 sample was misclassified out of four samples).

The high perceptual accuracy for angry samples has been reported in the literature. For instance, Yildirim et al. (2004) found that angry was recognized with 82 percent accuracy out of four emotions (plus an "other" category). Petrushin (1999) found that angry was recognized with 72 percent accuracy out of five emotions. On the other hand, classification accuracy of angry has typically been equal to or less than perceptual accuracy. Yildirim et al. (2004) found that angry was classified with 54 percent accuracy out of four emotions using discriminant analysis. Toivanen et al. (2006) found that angry was classified with 25 percent accuracy compared to 38 percent recognition out of five emotions using kNN classification. Similarly, recognition accuracy of sad has typically been high. For example, Dallaert et al. (1996) found that sad was recognized with 80 percent accuracy out of four emotions. Petrushin (1999) found that sad was recognized with 68 percent accuracy out of five emotions. Classification accuracy of sad has also been high. Petrushin (1999) found that sad was classified with between 73-81 percent accuracy out of five emotions using multiple classification algorithms (kNN, neural networks, ensembles of neural network classifiers, and set of experts). Yildirim et al. (2004) found that sad was perceived with 61 percent accuracy but classified with 73 percent accuracy.

While Categories 1 and 2 (happy and content-confident) had lower recognition accuracy than Categories 3 and 4 (angry and sad) for the samples from all sets, classification accuracy for these categories for the $test_2$ set samples was much lower than listener accuracy. Reports of recognition accuracy of happy have been mixed, but classification accuracy has generally been high. For instance, Liscombe et al. (2003) found that happy samples were ranked highly as happy with 57 percent accuracy out of 10 emotions and classified with 80 percent accuracy out of 10 emotions using the RIPPER model was used with a binary classification procedure. Yildirim et al. (2004) found that happy was recognized with 56 percent accuracy out of four emotions (plus an "other" category) and classified with 61 percent accuracy out of four emotions using discriminant analysis. Based on the literature, classification accuracy of Category 1 (happy) was expected to be higher than reported. It was possible that samples from this category were confused with Category 2 (content-confident), since these categories were clustered together at a lower level than Category 1 (happy) with Categories 3 and 4 (angry and sad). Therefore, an analysis was performed to determine whether this low accuracy was due to an inability of the acoustic model to represent this category or whether these samples were confused with Category 2 (content-confident). When the samples classified as Category 2 were included as correct classification of Category 1 (happy) samples, accuracy increased to 75% correct or a d' of 1.6127. This accuracy was higher than listener accuracy. This suggested that the low classification accuracy of happy may be due to inadequate representations of these speakers improved Accuracy of the final category of content-confident has been mixed. Liscombe et al. (2003) found 75 percent perceptual and classification accuracy of confident (algorithm: RIPPER model with binary classification procedure) out of 10 emotions. Toivanen et al. (2006) found 50 percent recognition accuracy and 72 percent kNN classification accuracy of a "neutral" emotion out of five emotions. Petrushin (1999) found 66 percent recognition and 55-65 percent recognition of a "normal" emotion.

Classification results of the $test_2$ set were also reported by sentence and speaker. Both classification and recognition results showed similar performance for Sentences 1 and 2. This matched the sentence analysis of the training and $test_y$ sets. However, classification accuracy of Sentence 3 was much less than Sentences 1 and 2 for all emotion categories. While listener accuracy of Sentence 3 was also less than Sentences 1 and 2 for all emotion categories, the reduction in performance was greater for the classifiers. In other words, the Overall training set acoustic model was better able to represent the sentences used in model development. However, it was not clear whether the model is dependent on the sentence text, or the novel sentence was simply harder to express emotionally.

The analysis by speaker revealed clear differences in the classification of different speakers. Classification accuracy was highest for female Speakers 3 and 4, followed by male Speakers 6 and 7. For Speakers 4, 6, and 7, two of the four emotion categories were classified more accurately than listeners. The best k-means classification accuracy was observed for Speaker 4. Although classification accuracy for this speaker was better than listener accuracy for this speaker for Categories 3 and 4 (angry and sad), classification accuracy for all categories was greater than the listener accuracy computed over all samples of the $test_2$ set. These results were interesting in that the acoustic model was able to represent the samples of effective speakers relatively well, but it was poor at representing the emotional samples of speakers who were moderately effective. Large differences in speaker effectiveness have been reported in the literature (Banse & Scherer, 1996). Some reports have suggested that gender differences in expressive ability exist (Bonebright et al., 1996). However, no gender difference in accuracy was seen by emotion category for any of the three stimulus sets.

In summary, an acoustic model was developed based on discrimination judgments of emotional samples by two speakers. While 19 emotions were obtained and used in the perceptual test, only 11 emotions were used in model development. Inclusion of the remaining eight emotions seemed to add variability into the model, possibly due to their low discrimination accuracy in SS. Due to the potential for large speaker differences in expression (as confirmed by the results of this study), acted speech was used. However, only two speakers were tested in order to practically conduct a discrimination test on a large set of emotions. Further model development may benefit from the inclusion of additional speakers and fewer than 19 emotions. Nevertheless, the Overall training set acoustic model was developed based on a single sentence by two actors and outperformed other speaker and sentence models that included additional sentences by the same speakers. It is possible that these additional models were not able to accurately represent the samples because they were based on identification judgments instead of discrimination, but this was not tested in the present study.

While the performance of the Overall training set acoustic model was better than listeners for the training and $test_1$ sets, there were a couple of limitations of this model. First, certain features used in the model were computed on vowels that were segmented by hand offline. To truly automate this model, it is necessary to develop an algorithm to automatically isolate stressed and unstressed vowels from a speech sample. Second, it was necessary to normalize the samples from each speaker by converting them to z-scores. This normalization did not negate the purpose of this study—to develop an acoustic model based on the acoustic features that were not dependent on a speaker's baseline. However, it did hinder the overall goal, which was to develop a speaker independent method of predicting emotions in SS.

Finally, the results of the test of model generalization showed that the model was able to classify angry with high accuracy relative to listeners. This suggested that the acoustic cues used to differentiate angry from the remaining emotions, i.e. the acoustic cues to Dimension 2, are more robust than those previously used to describe this dimension in the literature. This is an important finding, since the ability to differentiate angry from other emotions is necessary in a number of applications. One limitation of this generalization test was the speaker background. It is possible that the use of persons mainly without acting training as speakers resulted in the low perceptual accuracy of all emotion categories. It is not clear whether classification accuracy of the remaining three emotion categories was lower than perceptual accuracy because of the difference in speaker training used in model development and testing, or because the model was simply not able to successfully represent samples expressed by less effective speakers. It is also important to keep in mind that two basic classification algorithms were used. The use of more complex algorithm such as support vector machines or neural networks may potentially improve upon the classification accuracy. Nevertheless, the results presented here suggest that an acoustic model based on perceptual judgments of nonsensical speech from two actors could sufficiently represent anger in SS when expressed by non-trained individuals.

The following are some specific embodiments of the subject invention:

Embodiment 1

A method for determining an emotion state of a speaker, comprising: providing an acoustic space having one or more dimensions, wherein each dimension of the one or more dimensions of the acoustic space corresponds to at least one baseline acoustic characteristic; receiving a subject utterance of speech by a speaker; measuring one or more acoustic characteristic of the subject utterance of speech; comparing each acoustic characteristic of the one or more acoustic characteristic of the subject utterance of speech to a corresponding one or more baseline acoustic characteristic; and determining an emotion state of the speaker based on the comparison, wherein the emotion state of the speaker comprises at least one magnitude along a corresponding at least one of the one or more dimensions within the acoustic space.

Embodiment 2

Embodiment 1, wherein each of the at least one baseline acoustic characteristic for each dimension of the one or more dimensions affects perception of the emotion state.

Embodiment 3

Embodiment 1, wherein the one or more dimensions is one dimension.

Embodiment 4

Embodiment 1, wherein the one or more dimensions is two or more dimensions.

Embodiment 5

Embodiment 1, wherein providing an acoustic space comprises analyzing training data to determine the at least one baseline acoustic characteristic for each of the one or more dimensions of the acoustic space.

Embodiment 6

Embodiment 5, wherein the acoustic space describes n emotions using n−1 dimensions, where n is an integer greater than 1.

Embodiment 7

Embodiment 6, further comprising reducing the n−1 dimensions to p dimensions, where $p<n-1$.

Embodiment 8

Embodiment 7, wherein a machine learning algorithm is used to reduce the n−1 dimensions to p dimensions.

Embodiment 9

Embodiment 7, wherein a pattern recognition algorithm is used to reduce the n−1 dimensions to p dimensions.

Embodiment 10

Embodiment 7, wherein multidimensional scaling is used to reduce the n−1 dimensions to p dimensions.

Embodiment 11

Embodiment 7, wherein linear regression is used to reduce the n−1 dimensions to p dimensions.

Embodiment 12

Embodiment 7, wherein a vector machine is used to reduce the n−1 dimensions to p dimensions.

Embodiment 13

Embodiment 7, wherein a neural network is used to reduce the n−1 dimensions to p dimensions.

Embodiment 14

Embodiment 2, wherein the training data comprises at least one training utterance of speech.

Embodiment 15

Embodiment 14, wherein one or more of the at least one training utterance of speech is spoken by the speaker.

Embodiment 16

Embodiment 14, wherein the subject utterance of speech comprises one or more of the at least one training utterance of speech.

Embodiment 17

Embodiment 16, wherein semantic and/or syntactic content of the one or more of the at least one training utterance of speech is determined by the speaker.

Embodiment 18

Embodiment 1, wherein each of the one or more acoustic characteristic of the subject utterance of speech comprises a suprasegmental property of the subject utterance of speech, and each of the at least one baseline acoustic characteristic comprises a corresponding suprasegmental property.

Embodiment 19

Embodiment 1, wherein each of the one or more acoustic characteristic of the subject utterance of speech is selected from the group consisting of: fundamental frequency, pitch, intensity, loudness, and speaking rate.

Embodiment 20

Embodiment 1, wherein each of the one or more acoustic characteristic of the subject utterance of speech is selected from the group consisting of: number of peaks in the pitch, intensity contour, loudness contour, pitch contour, fundamental frequency contour, attack of the intensity contour, attack of the loudness contour, attack of the pitch contour, attack of the fundamental frequency contour, fall the intensity contour, fall of the loudness contour, fall of the pitch contour, fall of the fundamental frequency contour, duty cycle of the peaks in the pitch, normalized minimum pitch, normalized maximum of pitch, cepstral peak prominence (CPP), and spectral slope.

Embodiment 21

Embodiment 1, wherein determining the emotion state of the speaker based on the comparison occurs within five minutes of receiving the subject utterance of speech by the speaker.

Embodiment 22

Embodiment 1, wherein determining the emotion state of the speaker based on the comparison occurs within one minute of receiving the subject utterance of speech by the speaker.

Embodiment 23

A method for determining an emotion state of a speaker, comprising: providing an acoustic space having one or more dimensions, wherein each dimension of the one or more dimensions of the acoustic space corresponds to at least one baseline acoustic characteristic; receiving a training utterance of speech by the speaker; analyzing the training utterance of speech; modifying the acoustic space based on the analysis of the training reference of speech to produce a modified acoustic space having one or more modified dimensions, wherein each modified dimension of the one or more modified dimensions of the modified acoustic space corresponds to at least one modified baseline acoustic characteristic; receiving a subject utterance of speech by a speaker; measuring one or more one acoustic characteristic of the subject utterance of speech; comparing each acoustic characteristic of the one or more acoustic characteristics of the subject utterance of speech to a corresponding one or more one baseline acoustic characteristic; and determining an emotion state of the speaker based on the comparison.

Embodiment 24

Embodiment 23, wherein semantic and/or syntactic content of the training utterance of speech is determined by the speaker.

Embodiment 25

Embodiment 23, wherein the subject utterance of speech comprises the training utterance of speech.

Embodiment 26

Embodiment 25, wherein determining the emotion state of the speaker based on the comparison occurs within one day of receiving the subject utterance of speech by the speaker.

Embodiment 27

Embodiment 25, wherein determining the emotion state of the speaker based on the comparison occurs within one minute of receiving the subject utterance of speech by the speaker.

Embodiment 28

Embodiment 23, wherein each of the one or more acoustic characteristic of the subject utterance of speech comprises a suprasegmental property of the subject utterance of speech, and each of the at least one modified at least one baseline acoustic characteristic comprises a corresponding suprasegmental property.

Embodiment 29

Embodiment 23, wherein each of the one or more acoustic characteristic of the subject utterance of speech is selected from the group consisting of: fundamental frequency, pitch, intensity, loudness, and speaking rate.

Embodiment 30

Embodiment 23, wherein each of the one or more acoustic characteristic of the subject utterance of speech is selected from the group consisting of: number of peaks in the pitch, intensity contour, loudness contour, pitch contour, fundamental frequency contour, attack of the intensity contour, attack of the loudness contour, attack of the pitch contour, attack of the fundamental frequency contour, fall the intensity contour, fall of the loudness contour, fall of the pitch contour, fall of the fundamental frequency contour, duty cycle of the peaks in the pitch, normalized minimum pitch, normalized maximum of pitch, cepstral peak prominence (CPP), and spectral slope.

Embodiment 31

Embodiment 23, wherein determining the emotion state of speaker based on the comparison comprises determining one or more emotion of the speaker based on the comparison.

Embodiment 32

Embodiment 23, wherein the emotion state of the speaker comprises a category of emotion and an intensity of the category of emotion.

Embodiment 33

Embodiment 23, wherein the emotion state of the speaker comprises at least one magnitude along a corresponding at least one dimension within the modified acoustic space.

Embodiment 34

A method of creating a perceptual space, comprising: obtaining listener judgments of differences in perception in at least two emotions from one or more speech utterances; measuring d' values between each of the at least two creations, and each of the remain at least two emotions, wherein the d' values represent perceptual distances between emotions; applying a multidimensional scaling analysis to the measured d' values; and creating a n−1 dimensional perceptual space.

Embodiment 35

Embodiment 34, further comprising: reducing the n−1 dimensional perceptual space to a p dimensional perceptual space, where p<n−1.

Embodiment 36

Embodiment 34, further comprising: creating an acoustic space from the n−1 dimensional perceptual space.

TABLE 5-9

Raw acoustic measurements for the $test_1$ set.

| | | | mean cpp | pp | vcr | srate | srtrend | gtrend | normn pks | mpkrise |
|---|---|---|---|---|---|---|---|---|---|---|
| Spk1 | angr | s1 | 13.70 | 0.166 | 0.678 | 2.303 | −0.064 | −0.003 | 0.400 | 214.915 |
| Spk1 | angr | s2 | 13.52 | 0.281 | 0.980 | 2.249 | 0.018 | −0.045 | 0.100 | 771.503 |
| Spk1 | anno | s1 | 12.91 | 0.000 | 0.690 | 3.538 | 0.095 | −0.045 | 0.222 | 404.744 |
| Spk1 | anno | s2 | 13.78 | 0.076 | 0.989 | 2.721 | −0.009 | −0.058 | 0.111 | 165.405 |
| Spk1 | anxi | s1 | 12.50 | 0.072 | 0.710 | 4.030 | −0.036 | −0.044 | 0.333 | 183.278 |

TABLE 5-9-continued

Raw acoustic measurements for the $test_1$ set.

| | | | | | | | | | | |
|---|---|---|---|---|---|---|---|---|---|---|
| Spk1 | anxi | s2 | 13.03 | 0.064 | 1.118 | 3.587 | 0.179 | −0.038 | 0.333 | 185.626 |
| Spk1 | bore | s1 | 16.16 | 0.061 | 1.053 | 2.481 | 0.028 | −0.028 | 0.111 | 58.801 |
| Spk1 | bore | s2 | 15.02 | 0.150 | 1.144 | 1.902 | 0.042 | −0.027 | 0.111 | 131.659 |
| Spk1 | coll | s1 | 13.44 | 0.032 | 0.778 | 3.151 | −0.030 | −0.080 | 0.333 | 428.533 |
| Spk1 | cofi | s2 | 13.91 | 0.000 | 1.170 | 3.255 | 0.150 | −0.057 | 0.100 | 135.325 |
| Spk1 | cofu | s1 | 12.95 | 0.218 | 0.756 | 2.423 | 0.028 | −0.022 | 0.100 | 46.949 |
| Spk1 | cofu | s2 | 13.31 | 0.121 | 1.233 | 2.867 | −0.027 | 0.045 | 0.111 | 148.614 |
| Spk1 | cote | s1 | 13.73 | 0.000 | 0.727 | 4.209 | 0.000 | −0.020 | 0.111 | 245.031 |
| Spk1 | cote | s2 | 13.33 | 0.000 | 1.216 | 3.896 | 0.286 | −0.064 | 0.111 | 366.683 |
| Spk1 | emba | s1 | 13.62 | 0.199 | 0.675 | 2.212 | −0.097 | −0.049 | 0.222 | 143.666 |
| Spk1 | emba | s2 | 15.11 | 0.094 | 1.046 | 3.015 | 0.103 | −0.043 | 0.111 | 84.515 |
| Spk1 | exha | s1 | 14.36 | 0.027 | 0.556 | 2.466 | −0.060 | −0.027 | 0.222 | 366.554 |
| Spk1 | exha | s2 | 15.19 | 0.046 | 1.208 | 2.573 | 0.039 | −0.029 | 0.111 | 103.206 |
| Spk1 | happ | s1 | 13.04 | 0.000 | 0.770 | 3.624 | −0.083 | −0.046 | 0.222 | 159.580 |
| Spk1 | happ | s2 | 12.97 | 0.000 | 1.398 | 3.570 | 0.274 | −0.036 | 0.222 | 315.480 |
| Spk1 | sadd | s1 | 14.13 | 0.076 | 0.897 | 2.523 | −0.014 | −0.008 | 0.333 | 132.500 |
| Spk1 | sadd | s2 | 13.78 | 0.117 | 1.414 | 2.344 | 0.082 | −0.043 | 0.500 | 199.908 |
| Spk2 | angr | s1 | 13.04 | 0.000 | 0.610 | 4.177 | 0.179 | −0.046 | 0.222 | 92.303 |
| Spk2 | angr | s2 | 14.20 | 0.000 | 1.439 | 3.481 | −0.060 | −0.036 | 0.111 | 77.147 |
| Spk2 | anno | s1 | 13.85 | 0.000 | 0.777 | 3.780 | −0.036 | −0.073 | 0.222 | 248.902 |
| Spk2 | anno | s2 | 14.57 | 0.000 | 1.283 | 3.414 | −0.100 | −0.032 | 0.111 | 82.188 |
| Spk2 | anxi | s1 | 13.43 | 0.000 | 0.874 | 4.307 | 0.000 | −0.059 | 0.333 | 250.884 |
| Spk2 | anxi | s2 | 14.69 | 0.000 | 1.083 | 3.703 | 0.000 | −0.013 | 0.222 | 47.667 |
| Spk2 | bore | s1 | 16.16 | 0.000 | 0.955 | 3.211 | −0.117 | −0.027 | 0.222 | 195.008 |
| Spk2 | bore | s2 | 16.51 | 0.000 | 1.466 | 3.044 | −0.109 | −0.017 | 0.111 | 40.981 |
| Spk2 | cofi | s1 | 13.64 | 0.000 | 0.883 | 3.408 | −0.050 | −0.017 | 0.333 | 207.956 |
| Spk2 | cofi | s2 | 15.42 | 0.000 | 1.337 | 3.466 | −0.133 | −0.048 | 0.111 | 99.627 |
| Spk2 | cofu | s1 | 12.77 | 0.000 | 0.608 | 4.075 | −0.107 | −0.036 | 0.222 | 96.972 |
| Spk2 | cofu | s2 | 13.44 | 0.000 | 1.249 | 3.774 | −0.048 | −0.032 | 0.111 | 161.657 |
| Spk2 | cote | s1 | 14.33 | 0.000 | 0.850 | 3.736 | 0.000 | −0.028 | 0.111 | 169.782 |
| Spk2 | cote | s2 | 15.37 | 0.000 | 1.060 | 3.406 | 0.033 | −0.047 | 0.111 | 126.633 |
| Spk2 | emba | s1 | 15.28 | 0.000 | 0.792 | 3.616 | 0.000 | −0.030 | 0.222 | 57.012 |
| Spk2 | emba | s2 | 14.41 | 0.000 | 1.043 | 3.333 | −0.100 | −0.011 | 0.222 | 77.453 |
| Spk2 | exha | s1 | 13.41 | 0.000 | 0.682 | 3.896 | −0.036 | −0.041 | 0.222 | 40.080 |
| Spk2 | exha | s2 | 14.07 | 0.018 | 1.114 | 3.155 | −0.127 | −0.035 | 0.222 | 66.827 |
| Spk2 | happ | s1 | 13.49 | 0.000 | 0.802 | 3.862 | 0.179 | 0.023 | 0.222 | 104.097 |
| Spk2 | happ | s2 | 13.94 | 0.000 | 1.390 | 3.904 | 0.036 | 0.025 | 0.111 | 302.083 |
| Spk2 | sadd | s1 | 13.92 | 0.000 | 0.629 | 3.747 | −0.179 | −0.020 | 0.333 | 139.151 |
| Spk2 | sadd | s2 | 14.87 | 0.000 | 1.308 | 3.568 | 0.060 | −0.001 | 0.222 | 84.732 |

| | | | mpkfall | iNmin | iNmax | pnor MAX | pnor MIN | normpn ormin | aratio | aratio2 |
|---|---|---|---|---|---|---|---|---|---|---|
| Spk1 | angr | s1 | 207.129 | 28.136 | 24.090 | 71.884 | 90.193 | 39.167 | 6731.0 | 6312.2 |
| Spk1 | angr | s2 | 865.588 | 32.947 | 28.109 | 179.687 | 63.916 | 28.416 | 6664.7 | 5783.4 |
| Spk1 | anno | s1 | 176.754 | 23.630 | 15.059 | 174.806 | 88.933 | 25.138 | 6364.4 | 5545.3 |
| Spk1 | anno | s2 | 132.324 | 27.892 | 21.197 | 165.080 | 93.889 | 34.508 | 5744.3 | 5196.5 |
| Spk1 | anxi | s1 | 125.729 | 21.532 | 17.133 | 95.438 | 98.775 | 24.511 | 6290.5 | 5281.6 |
| Spk1 | anxi | s2 | 186.512 | 30.755 | 19.555 | 122.143 | 121.313 | 33.821 | 5838.0 | 5873.8 |
| Spk1 | bore | s1 | 246.799 | 24.758 | 15.416 | 77.916 | 60.103 | 24.224 | 5551.3 | 5017.0 |
| Spk1 | bore | s2 | 180.003 | 25.919 | 19.605 | 82.308 | 55.058 | 28.941 | 5849.2 | 4724.4 |
| Spk1 | cofi | s1 | 117.831 | 24.189 | 17.472 | 103.910 | 140.693 | 44.649 | 6756.9 | 6015.2 |
| Spk1 | cofi | s2 | 235.039 | 28.292 | 22.839 | 159.589 | 109.150 | 33.529 | 6433.6 | 5972.4 |
| Spk1 | cofu | s1 | 128.675 | 31.911 | 23.789 | 119.357 | 121.818 | 50.285 | 6292.9 | 5624.2 |
| Spk1 | cofu | s2 | 212.533 | 29.387 | 20.247 | 136.253 | 129.120 | 45.034 | 5958.0 | 5558.3 |
| Spk1 | cote | s1 | 168.102 | 17.196 | 12.430 | 111.122 | 96.220 | 22.860 | 6222.8 | 5565.2 |
| Spk1 | cote | s2 | 462.862 | 21.520 | 13.381 | 217.786 | 114.237 | 29.325 | 5586.6 | 4696.1 |
| Spk1 | emba | s1 | 86.908 | 25.558 | 22.175 | 88.616 | 84.257 | 38.095 | 6344.6 | 5304.4 |
| Spk1 | emba | s2 | 58.453 | 30.162 | 16.368 | 82.139 | 69.333 | 22.999 | 5906.2 | 5102.7 |
| Spk1 | exha | s1 | 192.757 | 23.543 | 17.073 | 69.524 | 57.356 | 23.260 | 6241.1 | 6022.4 |
| Spk1 | exha | s2 | 203.743 | 42.675 | 21.390 | 121.466 | 67.151 | 26.095 | 5790.1 | 5352.3 |
| Spk1 | happ | s1 | 96.888 | 23.536 | 17.723 | 90.856 | 129.985 | 35.872 | 6607.3 | 5974.6 |
| Spk1 | happ | s2 | 342.248 | 26.022 | 16.219 | 216.943 | 165.450 | 46.344 | 6463.8 | 5818.5 |
| Spk1 | sadd | s1 | 262.730 | 28.102 | 17.526 | 85.083 | 90.508 | 35.875 | 6245.2 | 5413.4 |
| Spk1 | sadd | s2 | 307.593 | 30.016 | 20.702 | 89.018 | 90.760 | 38.718 | 5157.9 | 5275.9 |
| Spk2 | angr | s1 | 68.815 | 26.775 | 19.489 | 58.520 | 59.734 | 14.302 | 6551.8 | 5999.6 |
| Spk2 | angr | s2 | 41.673 | 17.365 | 16.801 | 66.911 | 51.985 | 14.932 | 5994.5 | 6011.5 |
| Spk2 | anno | s1 | 183.671 | 21.891 | 18.724 | 104.277 | 60.465 | 15.998 | 6260.6 | 5347.1 |
| Spk2 | anno | s2 | 30.564 | 17.599 | 12.401 | 66.889 | 54.537 | 15.976 | 5657.2 | 5716.4 |
| Spk2 | anxi | s1 | 109.484 | 24.012 | 14.717 | 86.149 | 87.309 | 20.273 | 5847.9 | 5454.6 |
| Spk2 | anxi | s2 | 95.384 | 25.190 | 13.376 | 45.493 | 64.645 | 17.457 | 5867.9 | 4988.5 |
| Spk2 | bore | s1 | 40.699 | 25.227 | 14.542 | 60.329 | 47.330 | 14.742 | 5974.1 | 5614.9 |
| Spk2 | bore | s2 | 99.100 | 25.231 | 12.451 | 64.318 | 47.097 | 15.474 | 5949.7 | 5188.2 |
| Spk2 | cofi | s1 | 176.276 | 21.955 | 17.579 | 108.227 | 60.122 | 17.640 | 5995.3 | 5400.3 |
| Spk2 | cofi | s2 | 192.685 | 22.661 | 11.849 | 121.331 | 65.270 | 18.834 | 6169.6 | 5496.4 |
| Spk2 | cofu | s1 | 74.038 | 20.895 | 16.920 | 119.406 | 59.695 | 14.650 | 5733.6 | 5228.7 |
| Spk2 | cofu | s2 | 195.890 | 26.852 | 11.788 | 124.485 | 53.543 | 14.187 | 5601.0 | 5459.7 |
| Spk2 | cote | s1 | 101.869 | 23.240 | 14.470 | 78.687 | 54.629 | 14.624 | 5693.7 | 5422.0 |

TABLE 5-9-continued

Raw acoustic measurements for the test$_1$ set.

| | | | | | | | | | | |
|---|---|---|---|---|---|---|---|---|---|---|
| Spk2 | cote | s2 | 81.211 | 23.436 | 10.752 | 104.754 | 69.143 | 20.299 | 5600.8 | 5462.5 |
| Spk2 | emba | s1 | 33.307 | 20.447 | 13.885 | 38.865 | 45.818 | 12.670 | 5632.9 | 4903.6 |
| Spk2 | emba | s2 | 42.167 | 17.886 | 11.438 | 37.551 | 53.239 | 15.974 | 5828.6 | 5505.4 |
| Spk2 | exha | s1 | 61.693 | 24.087 | 13.801 | 39.357 | 48.368 | 12.415 | 5713.9 | 4971.0 |
| Spk2 | exha | s2 | 95.455 | 25.011 | 12.656 | 57.072 | 40.652 | 12.885 | 5615.4 | 5120.3 |
| Spk2 | happ | s1 | 143.556 | 24.276 | 16.312 | 87.301 | 82.088 | 21.253 | 5968.1 | 5930.5 |
| Spk2 | happ | s2 | 258.144 | 18.007 | 12.740 | 104.999 | 48.080 | 12.317 | 5560.7 | 5417.3 |
| Spk2 | sadd | s1 | 102.523 | 19.467 | 14.126 | 41.608 | 66.367 | 17.711 | 4973.0 | 5098.1 |
| Spk2 | sadd | s2 | 65.154 | 27.825 | 13.987 | 35.114 | 53.916 | 15.109 | 5364.9 | 5159.1 |

| | | | maratio | maratio2 | m_LTAS | m_LTAS2 | attack | nattack | duty cyc | norm attack |
|---|---|---|---|---|---|---|---|---|---|---|
| Spk1 | angr | s1 | −6.851 | −10.949 | −0.00176 | −0.00808 | 2.196 | 13.631 | 0.497 | 4.416 |
| Spk1 | angr | s2 | −7.908 | −13.747 | −0.00405 | −0.00542 | 1.738 | 8.361 | 0.393 | 4.424 |
| Spk1 | anno | s1 | −5.440 | −15.254 | −0.00456 | −0.00639 | 0.834 | 5.157 | 0.445 | 1.873 |
| Spk1 | anno | s2 | −8.806 | −11.325 | −0.00562 | −0.00341 | 0.770 | 4.177 | 0.411 | 1.874 |
| Spk1 | anxi | s1 | −4.036 | −14.879 | −0.00266 | −0.00520 | 0.500 | 3.166 | 0.518 | 0.965 |
| Spk1 | anxi | s2 | −11.919 | −10.436 | −0.00590 | −0.00350 | 0.917 | 4.633 | 0.439 | 2.090 |
| Spk1 | bore | s1 | −10.049 | −18.532 | −0.00413 | −0.00930 | 0.352 | 1.312 | 0.315 | 1.115 |
| Spk1 | bore | s2 | −12.296 | −19.295 | −0.00350 | −0.00749 | 0.285 | 0.982 | 0.371 | 0.769 |
| Spk1 | cofi | s1 | −5.385 | −8.340 | −0.00412 | −0.00615 | 1.644 | 8.841 | 0.385 | 4.271 |
| Spk1 | cofi | s2 | −6.110 | −12.368 | −0.00352 | −0.00652 | 1.948 | 12.365 | 0.297 | 6.551 |
| Spk1 | cofu | s1 | −8.804 | −12.183 | −0.00638 | −0.00873 | 1.372 | 9.335 | 0.426 | 3.221 |
| Spk1 | cofu | s2 | −10.361 | −13.466 | −0.00544 | −0.00778 | 1.052 | 5.199 | 0.424 | 2.485 |
| Spk1 | cote | s1 | −6.237 | −13.222 | −0.00280 | −0.00681 | 0.541 | 3.732 | 0.479 | 1.131 |
| Spk1 | cote | s2 | −14.323 | −19.727 | −0.00829 | −0.00560 | 0.423 | 1.897 | 0.337 | 1.252 |
| Spk1 | emba | s1 | −4.781 | −15.465 | −0.00435 | −0.00853 | 0.873 | 4.477 | 0.395 | 2.209 |
| Spk1 | emba | s2 | −10.106 | −12.822 | −0.00820 | −0.00650 | 0.616 | 2.636 | 0.359 | 1.715 |
| Spk1 | exha | s1 | −4.103 | −10.541 | −0.00136 | −0.00535 | 0.570 | 2.850 | 0.457 | 1.248 |
| Spk1 | exha | s2 | −9.383 | −14.134 | −0.00582 | −0.00924 | 0.813 | 2.465 | 0.314 | 2.587 |
| Spk1 | happ | s1 | −5.663 | −9.295 | −0.00403 | −0.00556 | 1.474 | 7.669 | 0.511 | 2.884 |
| Spk1 | happ | s2 | −6.722 | −11.579 | −0.00296 | −0.00555 | 1.251 | 9.458 | 0.571 | 2.193 |
| Spk1 | sadd | s1 | −3.385 | −10.358 | −0.00255 | −0.00512 | 0.543 | 1.912 | 0.389 | 1.395 |
| Spk1 | sadd | s2 | −12.578 | −10.739 | −0.00662 | −0.00517 | 0.680 | 2.710 | 0.392 | 1.733 |
| Spk2 | angr | s1 | −9.905 | −16.042 | −0.00590 | −0.00512 | 1.965 | 13.854 | 0.454 | 4.333 |
| Spk2 | angr | s2 | −16.010 | −10.931 | −0.00568 | −0.00781 | 1.498 | 6.836 | 0.274 | 5.457 |
| Spk2 | anno | s1 | −7.975 | −20.075 | −0.00459 | −0.00851 | 0.936 | 6.642 | 0.410 | 2.285 |
| Spk2 | anno | s2 | −14.461 | −15.179 | −0.00776 | −0.00637 | 0.750 | 3.477 | 0.379 | 1.979 |
| Spk2 | anxi | s1 | −11.411 | −17.115 | −0.00774 | −0.00667 | 1.091 | 6.670 | 0.389 | 2.805 |
| Spk2 | anxi | s2 | −13.166 | −16.948 | −0.00808 | −0.00589 | 0.894 | 4.892 | 0.386 | 2.317 |
| Spk2 | bore | s1 | −14.381 | −19.130 | −0.00820 | −0.00707 | 0.553 | 3.375 | 0.513 | 1.077 |
| Spk2 | bore | s2 | −15.393 | −21.515 | −0.00670 | −0.00701 | 0.541 | 1.798 | 0.352 | 1.539 |
| Spk2 | cofi | s1 | −11.963 | −19.133 | −0.00679 | −0.00596 | 1.057 | 6.437 | 0.449 | 2.353 |
| Spk2 | cofi | s2 | −11.755 | −15.347 | −0.00546 | −0.00473 | 0.784 | 3.981 | 0.374 | 2.099 |
| Spk2 | cofu | s1 | −14.212 | −17.855 | −0.00587 | −0.00499 | 0.673 | 4.121 | 0.373 | 1.802 |
| Spk2 | cofu | s2 | −19.791 | −17.775 | −0.01070 | −0.00623 | 0.377 | 1.679 | 0.357 | 1.055 |
| Spk2 | cote | s1 | −16.088 | −19.046 | −0.00882 | −0.00776 | 0.625 | 3.928 | 0.522 | 1.196 |
| Spk2 | cote | s2 | −17.512 | −17.155 | −0.00663 | −0.00767 | 0.577 | 2.603 | 0.311 | 1.853 |
| Spk2 | emba | s1 | −16.699 | −22.315 | −0.00648 | −0.00739 | 0.567 | 3.540 | 0.402 | 1.410 |
| Spk2 | emba | s2 | −16.768 | −19.330 | −0.00535 | −0.00704 | 0.416 | 1.668 | 0.403 | 1.034 |
| Spk2 | exha | s1 | −14.785 | −21.255 | −0.00784 | −0.00705 | 0.502 | 3.051 | 0.474 | 1.061 |
| Spk2 | exha | s2 | −18.859 | −19.389 | −0.00853 | −0.00830 | 0.384 | 1.687 | 0.421 | 0.914 |
| Spk2 | happ | s1 | −11.462 | −13.383 | −0.00781 | −0.00624 | 1.130 | 6.623 | 0.324 | 3.490 |
| Spk2 | happ | s2 | −17.944 | −17.064 | −0.00794 | −0.00612 | 0.674 | 3.337 | 0.347 | 1.942 |
| Spk2 | sadd | s1 | −12.349 | −18.556 | −0.00819 | −0.00719 | 0.465 | 3.193 | 0.476 | 0.977 |
| Spk2 | sadd | s2 | −21.077 | −18.903 | −0.00725 | −0.00656 | 0.393 | 1.632 | 0.448 | 0.876 |

TABLE 5-11

Regression equations for multiple perceptual models using the training and test$_1$ sets.

| | | | Regression Equation |
|---|---|---|---|
| TRAINING | Overall | D1 | −0.002 * aratio2 − 0.768 * srate − 0.026 * pnorMIN + 13.87 |
| | | D2 | −0.887 * normattack + 0.132 * normpnorMIN − 1.421 |
| | Spk1 | D1 | −0.001 * aratio + 0.983 * srate + 0.256 * Nattack + 4.828 * normnpks + 2.298 |
| | | D2 | −2.066 * attack + 0.031 * pnorMIN + 0.097 * iNmax − 2.832 |
| | Spk2 | D1 | −2.025 * VCR − 0.006 * mpkfall − 0.071 * pnorMIN + 6.943 |
| | | D2 | −0.662 * normattack + 0.049 * pnorMIN − 0.008 * mpkrise − 0.369 |
| | Overall | D1 | −0.238 * iNmax − 1.523 * srate − 0.02 * pnorMAX + 14.961 * dutycyc + 4.83 |
| | | D2 | −1.584 * srate + 0.013 * mpkrise − 12.185 * srtrend − 12.185 |
| | Spk1 | D1 | 0.265 * iNmax − 7.097 * dutycyc + 0.028 * pnorMAX + 0.807 * MeanCPP − 16.651 |
| | | D2 | 0.036 * normpnorMIN + 7.477 * PP − 524.541 * m_LTAS + 0.159 * maratio2 − 2.061 |

TABLE 5-11-continued

Regression equations for multiple perceptual models using the training and $test_1$ sets.

| | | | Regression Equation |
|---|---|---|---|
| | Spk2 | D1 | 0.249 * iNmax + 14.257 * dutycyc − 0.011 * pnorMAX − 0.071 * pnorMIN − 6.687 |
| | | D2 | −0.464 * iNmax + 0.014 * MeanCPP + 7.06 * normnpks + 7.594 * srtrend − 2.614 * srate − 14.805 |
| | Sent1 | D1 | 0.178 * iNmin − 1.677 * srate + 0.025 * pnorMAX − 0.028 * pnorMIN + 1.446 |
| | | D2 | −0.003 * aratio − 3.289 * VCR − 0.007 * mpkfall + 0.008 * pnorMAX + 22.475 |
| $TEST_1$ | Sent2 | D1 | 4.802 * srtrend − 0.044 * pnorMIN − 0.013 * pnorMAX + 4.721 |
| | | D2 | −7.038 * srtrend + 0.017 * pnorMAX − 1.47 * srate + 0.201* normattack + 2.542 |
| | Spk1, | D1 | −0.336 * maratio + 0.008 * mpkrise + 0.206 * iNmin − 0.122 * maratio2 − 10.306 |
| | Sent1 | D2 | −0.006 * mpkrise − 15.768 * dutycyc − 0.879 * MeanCPP − 0.013 * pnorMIN + 21.423 |
| | Spk1, | D1 | −6.68 * normnpks + 0.221 * iNmax − 0.002 * aratio + 270.486 * m_LTAS + 10.171 |
| | Sent2 | D2 | −28.454 * gtrend + 0.504 * maratio2 − 0.038 * pnorMIN − 0.193 * iNmin − 736.463 * mLTAS2 −0.992 * MeanCPP + 24.581 |
| | Spk2, | D1 | −0.034 * pnorMAX − 8336 * srtrend + 0.002 * aratio − 2.086 * VCR − 5.438 |
| | Sent1 | D2 | −0.334 * maratio − 0.184 * iNmin + 0.925 * srate + 0.008 * pnorMAX − 4.197 |
| | Spk2, | D1 | −0.304 * maratio2 − 591.928 * m_LTAS2 + 0.139 * normpnorMIN − 11.395 |
| | Sent2 | D2 | 298.412 * m_LTAS + 7.784 * VCR − 0.007 * mpkfall + 156.11 * PP + 0.091 * pnorMIN − 0.002 * aratio − 1.884 |

TABLE 5-12

Classification accuracy for the full training set ("All Sentences") and a reduced set based on an exclusion criterion ("Correct Category Sentences").

| | | | Percent Correct | | | | d-prime | | | |
|---|---|---|---|---|---|---|---|---|---|---|
| | | | H | C | A | S | H | C | A | S |
| All | Overall | Spk1 samples | 1.00 | 0.75 | 1.00 | 0.75 | 3.80 | 1.74 | 5.15 | 3.25 |
| Sentences | Model | Spk2 samples | 1.00 | 1.00 | 1.00 | 1.00 | 5.15 | 5.15 | 5.15 | 5.15 |
| | | All samples | 1.00 | 0.88 | 1.00 | 0.88 | 4.17 | 2.62 | 5.15 | 3.73 |
| | Speaker 1 | Spk1 samples | 1.00 | 1.00 | 1.00 | 1.00 | 5.15 | 5.15 | 5.15 | 5.15 |
| | Model | Spk2 samples | 0.50 | 0.50 | 1.00 | 0.50 | 1.22 | 0.57 | 5.15 | 0.57 |
| | | All samples | 0.75 | 0.75 | 1.00 | 0.75 | 2.27 | 1.74 | 5.15 | 1.74 |
| | Speaker 2 | Spk1 samples | 1.00 | 1.00 | 1.00 | 0.50 | 5.15 | 3.64 | 3.86 | 2.58 |
| | Model | Spk2 samples | 1.00 | 0.75 | 1.00 | 1.00 | 3.80 | 3.25 | 5.15 | 5.15 |
| | | All samples | 1.00 | 0.88 | 1.00 | 0.75 | 4.17 | 2.62 | 4.22 | 3.25 |
| Correct | Overall | Spk1 samples | 1.00 | 0.33 | 1.00 | 1.00 | 3.64 | 2.15 | 3.73 | 5.15 |
| Category | Model | Spk2 samples | 1.00 | 1.00 | 1.00 | 1.00 | 5.15 | 5.15 | 5.15 | 5.15 |
| Sentences | | All samples | 1.00 | 0.67 | 1.00 | 1.00 | 4.04 | 3.01 | 4.11 | 5.15 |
| | Speaker 1 | Spk1 samples | 1.00 | 1.00 | 1.00 | 1.00 | 5.15 | 5.15 | 5.15 | 5.15 |
| | Model | Spk2 samples | 0.50 | 0.33 | 1.00 | 0.33 | 1.07 | 0.00 | 5.15 | 0.00 |
| | | All samples | 0.75 | 0.67 | 1.00 | 0.67 | 2.14 | 1.40 | 5.15 | 1.40 |
| | Speaker 2 | Spk1 samples | 0.50 | 0.67 | 1.00 | 0.33 | 2.58 | 0.86 | 3.25 | 2.15 |
| | Model | Spk2 samples | 1.00 | 1.00 | 1.00 | 1.00 | 5.15 | 5.15 | 5.15 | 5.15 |
| | | All samples | 0.75 | 0.83 | 1.00 | 0.67 | 3.25 | 1.93 | 3.73 | 3.01 |

Classification is reported for all samples, samples by Speaker 1 only, and samples by Speaker 2 only based on three acoustic models.
"H" = Category 1 or Happy, "C" = Category 2 or Content-Confident, "A" = Category 3 or angry, and "S" = Category 4 or Sad; "Spk" = Speaker Number; "Sent" = Sentence Number

TABLE 5-13

Classification accuracy for the $test_1$ set using the Overall training acoustic model and the Overall $test_1$ acoustic model.

| | | Percent Correct | | | | d-prime | | | |
|---|---|---|---|---|---|---|---|---|---|
| | | H | C | A | S | H | C | A | S |
| Overall | Spk1 samples | 0.75 | 0.63 | 0.50 | 0.88 | 2.27 | 1.11 | 1.64 | 2.62 |
| Training | Spk2 samples | 0.50 | 1.00 | 1.00 | 0.75 | 2.58 | 3.37 | 5.15 | 2.14 |
| Model | Sent1 samples | 0.75 | 0.88 | 0.50 | 0.75 | 2.27 | 1.72 | 2.58 | 3.25 |
| | Sent2 samples | 0.50 | 0.75 | 1.00 | 0.88 | 2.58 | 1.74 | 4.22 | 2.22 |
| | All samples | 0.63 | 0.81 | 0.75 | 0.81 | 2.23 | 1.68 | 2.63 | 2.35 |
| Overall | Spk1 samples | 0.50 | 0.38 | 0.50 | 0.75 | 0.76 | 1.15 | 1.64 | 1.24 |
| $Test_1$ | Spk2 samples | 0.50 | 0.25 | 0.00 | 0.88 | 1.22 | 0.39 | −1.90 | 2.22 |
| Model | Sent1 samples | 0.25 | 0.25 | 0.00 | 0.88 | 0.29 | 0.79 | −1.54 | 1.52 |
| | Sent2 samples | 0.75 | 0.38 | 0.50 | 0.75 | 1.64 | 0.75 | 1.04 | 2.14 |
| | All samples | 0.50 | 0.31 | 0.25 | 0.81 | 0.97 | 0.75 | 0.36 | 1.68 |

"H" = Category 1 or Happy, "C" = Category 2 or Content-Confident, "A" = Category 3 or angry, and "S" = Category 4 or Sad; "Spk" = Speaker Number; "Sent" = Sentence Number

TABLE 5-14

Classification accuracy of the $test_1$ set by two training and four $test_1$ models.

| | | | Percent Correct | | | | d-prime | | | |
|---|---|---|---|---|---|---|---|---|---|---|
| | | | H | C | A | S | H | C | A | S |
| Training Set Models | Speaker 1 Model | Spk1 samples | 0.75 | 0.63 | 0.50 | 0.88 | 1.90 | 1.78 | 1.64 | 2.22 |
| | | Spk2 samples | 0.25 | 0.38 | 1.00 | 0.50 | 0.55 | −0.14 | 5.15 | 0.57 |
| | | Sent1 samples | 0.50 | 0.88 | 1.00 | 0.63 | 1.22 | 1.72 | 5.15 | 2.89 |
| | | Sent2 samples | 0.50 | 0.13 | 0.50 | 0.75 | 1.22 | −0.36 | 1.64 | 0.85 |
| | | All samples | 0.50 | 0.50 | 0.75 | 0.69 | 1.22 | 0.67 | 2.63 | 1.28 |
| | Speaker 2 Model | Spk1 samples | 0.50 | 0.50 | 0.50 | 0.75 | 1.22 | 0.57 | 2.58 | 1.47 |
| | | Spk2 samples | 0.50 | 0.50 | 1.00 | 0.75 | 1.22 | 0.79 | 4.22 | 1.74 |
| | | Sent1 samples | 0.50 | 0.63 | 0.50 | 0.88 | 2.58 | 1.11 | 2.58 | 1.72 |
| | | Sent2 samples | 0.50 | 0.38 | 1.00 | 0.63 | 0.76 | 0.25 | 4.22 | 1.78 |
| | | All samples | 0.50 | 0.50 | 0.75 | 0.75 | 1.22 | 0.67 | 2.63 | 1.60 |
| | Speaker 1 Model | Spk1 samples | 0.50 | 0.13 | 0.50 | 0.25 | 0.76 | −0.58 | 0.67 | 0.12 |
| | | Spk2 samples | 0.00 | 0.25 | 0.50 | 0.00 | −2.29 | −0.11 | 0.39 | −1.11 |
| | | Sent1 samples | 0.50 | 0.13 | 0.00 | 0.13 | 0.14 | −0.36 | −1.73 | −0.36 |
| | | Sent2 samples | 0.00 | 0.25 | 1.00 | 0.13 | −1.61 | −0.31 | 2.83 | 0.31 |
| | | All samples | 0.25 | 0.19 | 0.50 | 0.13 | −0.17 | −0.32 | 0.52 | −0.08 |
| $Test_1$ Set Models | Speaker 2 Model | Spk1 samples | 0.25 | 0.75 | 0.50 | 0.88 | 0.55 | 1.47 | 1.64 | 2.62 |
| | | Spk2 samples | 0.75 | 0.13 | 1.00 | 0.88 | 1.64 | −0.08 | 3.61 | 2.62 |
| | | Sent1 samples | 0.50 | 0.38 | 0.50 | 0.88 | 1.59 | 0.75 | 0.84 | 2.22 |
| | | Sent2 samples | 0.50 | 0.50 | 1.00 | 0.88 | 0.76 | 0.79 | 5.15 | 3.73 |
| | | All samples | 0.50 | 0.44 | 0.75 | 0.88 | 1.09 | 0.76 | 1.96 | 2.62 |
| | Sentence 1 Model | Spk1 samples | 0.50 | 0.38 | 1.00 | 0.38 | 1.22 | 0.05 | 3.61 | 0.75 |
| | | Spk2 samples | 0.25 | 0.38 | 1.00 | 0.38 | 0.92 | 0.25 | 3.10 | 0.75 |
| | | Sent1 samples | 0.75 | 0.13 | 1.00 | 0.63 | 1.90 | −0.36 | 3.61 | 1.11 |
| | | Sent2 samples | 0.00 | 0.63 | 1.00 | 0.13 | −0.98 | 0.50 | 3.10 | 0.31 |
| | | All samples | 0.38 | 0.38 | 1.00 | 0.38 | 1.06 | 0.15 | 3.33 | 0.75 |
| | Sentence 2 Model | Spk1 samples | 1.00 | 0.63 | 1.00 | 0.88 | 3.54 | 2.89 | 4.22 | 3.73 |
| | | Spk2 samples | 0.75 | 0.88 | 0.50 | 0.50 | 3.25 | 2.62 | 1.04 | 0.79 |
| | | Sent1 samples | 1.00 | 0.63 | 0.50 | 0.63 | 3.80 | 1.78 | 1.28 | 1.39 |
| | | Sent2 samples | 0.75 | 0.88 | 1.00 | 0.75 | 2.27 | 3.73 | 3.86 | 2.14 |
| | | All samples | 0.88 | 0.75 | 0.75 | 0.69 | 2.53 | 2.48 | 1.96 | 1.73 |

"H" = Category 1 or Happy, "C" = Category 2 or Content-Confident, "A" = Category 3 or angry, and "S" = Category 4 or Sad; "Spk" = Speaker Number; "Sent" = Sentence Number.

TABLE 5-15

Perceptual accuracy for the $test_2$ set based on all sentences and two exclusionary criteria.

| | | Percent Correct | | | | d-prime | | | |
|---|---|---|---|---|---|---|---|---|---|
| | | H | C | A | S | H | C | A | S |
| All Sentences | TF1 | 0.49 | 0.61 | 0.26 | 0.79 | 1.34 | 0.75 | 1.80 | 1.79 |
| | TF2 | 0.52 | 0.86 | 0.49 | 0.55 | 1.63 | 1.29 | 2.41 | 1.80 |
| | TF3 | 0.82 | 0.78 | 0.74 | 0.78 | 2.31 | 1.98 | 3.16 | 1.98 |
| | TF4 | 0.86 | 0.73 | 0.70 | 0.92 | 2.36 | 1.91 | 2.63 | 3.19 |
| | TF5 | 0.42 | 0.84 | 0.20 | 0.80 | 1.49 | 1.47 | 1.65 | 2.06 |
| | TM6 | 0.12 | 0.83 | 0.35 | 0.48 | 0.25 | 0.91 | 1.64 | 1.31 |
| | TM7 | 0.22 | 0.64 | 0.44 | 0.71 | 0.92 | 0.57 | 1.71 | 1.60 |
| | TM8 | 0.42 | 0.72 | 0.48 | 0.38 | 1.16 | 0.71 | 1.52 | 0.96 |
| | TM9 | 0.29 | 0.83 | 0.30 | 0.56 | 1.23 | 0.95 | 1.77 | 1.48 |
| | TM10 | 0.39 | 0.62 | 0.04 | 0.70 | 1.05 | 0.63 | 0.95 | 1.34 |
| | Sent1 | 0.48 | 0.72 | 0.41 | 0.73 | 1.48 | 1.09 | 1.92 | 1.69 |
| | Sent2 | 0.42 | 0.79 | 0.42 | 0.65 | 1.31 | 1.12 | 1.89 | 1.76 |
| | Sent3 | 0.47 | 0.73 | 0.37 | 0.62 | 1.28 | 0.92 | 1.80 | 1.55 |
| | TF1, Sent1 | 0.48 | 0.51 | 0.49 | 0.85 | 1.48 | 0.78 | 2.24 | 1.70 |
| | TF1, Sent2 | 0.31 | 0.75 | 0.22 | 0.73 | 1.30 | 0.86 | 1.58 | 1.78 |
| | TF1, Sent3 | 0.68 | 0.56 | 0.08 | 0.78 | 1.47 | 0.70 | 1.52 | 2.05 |
| | TF2, Sent1 | 0.63 | 0.82 | 0.55 | 0.66 | 2.05 | 1.34 | 2.44 | 1.95 |
| | TF2, Sent2 | 0.54 | 0.90 | 0.55 | 0.53 | 1.68 | 1.53 | 2.58 | 1.83 |
| | TF2, Sent3 | 0.39 | 0.86 | 0.37 | 0.45 | 1.20 | 1.03 | 2.22 | 1.66 |
| | TF3, Sent1 | 0.62 | 0.80 | 0.76 | 0.85 | 1.85 | 2.06 | 3.16 | 2.12 |
| | TF3, Sent2 | 0.95 | 0.84 | 0.61 | 0.81 | 3.28 | 2.12 | 2.82 | 2.31 |
| | TF3, Sent3 | 0.90 | 0.70 | 0.84 | 0.67 | 2.36 | 1.81 | 3.59 | 1.61 |
| | TF4, Sent1 | 0.83 | 0.75 | 0.67 | 0.95 | 2.21 | 2.08 | 2.85 | 3.33 |
| | TF4, Sent2 | 0.89 | 0.75 | 0.79 | 0.88 | 2.48 | 1.93 | 3.04 | 3.24 |
| | TF4, Sent3 | 0.86 | 0.69 | 0.65 | 0.92 | 2.41 | 1.73 | 2.20 | 3.16 |
| | TF5, Sent1 | 0.36 | 0.79 | 0.09 | 0.77 | 1.52 | 1.11 | 1.57 | 1.80 |
| | TF5, Sent2 | 0.33 | 0.83 | 0.39 | 0.83 | 1.11 | 1.57 | 1.88 | 2.27 |
| | TF5, Sent3 | 0.56 | 0.89 | 0.12 | 0.79 | 1.86 | 1.78 | 1.72 | 2.14 |
| | TM6, Sent1 | 0.20 | 0.85 | 0.13 | 0.56 | 0.57 | 1.05 | 1.04 | 1.51 |
| | TM6, Sent2 | 0.11 | 0.80 | 0.59 | 0.50 | 0.25 | 0.91 | 2.30 | 1.19 |

TABLE 5-15-continued

Perceptual accuracy for the $test_2$ set based on all sentences and two exclusionary criteria.

| | | Percent Correct | | | | d-prime | | | |
|---|---|---|---|---|---|---|---|---|---|
| | | H | C | A | S | H | C | A | S |
| | TM6, Sent3 | 0.05 | 0.84 | 0.33 | 0.40 | −0.23 | 0.79 | 1.43 | 1.26 |
| | TM7, Sent1 | 0.27 | 0.69 | 0.47 | 0.72 | 1.08 | 0.77 | 1.73 | 1.71 |
| | TM7, Sent2 | 0.19 | 0.74 | 0.27 | 0.71 | 1.02 | 0.77 | 1.33 | 1.73 |
| | TM7, Sent3 | 0.20 | 0.50 | 0.58 | 0.71 | 0.70 | 0.21 | 2.06 | 1.39 |
| | TM8, Sent1 | 0.53 | 0.65 | 0.67 | 0.42 | 1.42 | 0.65 | 2.04 | 0.93 |
| | TM8, Sent2 | 0.34 | 0.73 | 0.45 | 0.36 | 0.94 | 0.66 | 1.29 | 0.99 |
| | TM8, Sent3 | 0.40 | 0.79 | 0.33 | 0.37 | 1.11 | 0.86 | 1.27 | 0.98 |
| | TM9, Sent1 | 0.47 | 0.81 | 0.29 | 0.70 | 1.86 | 1.27 | 1.78 | 1.62 |
| | TM9, Sent2 | 0.20 | 0.84 | 0.28 | 0.50 | 1.05 | 0.77 | 1.66 | 1.45 |
| | TM9, Sent3 | 0.20 | 0.84 | 0.34 | 0.48 | 0.74 | 0.83 | 1.87 | 1.46 |
| | TM10, Sent1 | 0.38 | 0.58 | 0.00 | 0.78 | 1.14 | 0.64 | -inf | 1.46 |
| | TM10, Sent2 | 0.36 | 0.69 | 0.05 | 0.69 | 0.75 | 0.79 | Inf | 1.68 |
| | TM10, Sent3 | 0.44 | 0.59 | 0.05 | 0.61 | 1.31 | 0.47 | 1.31 | 0.98 |
| | ALL | 0.46 | 0.75 | 0.40 | 0.67 | 1.36 | 1.04 | 1.87 | 1.65 |
| Above Chance Sentences | TF1 | 0.59 | 0.63 | 0.35 | 0.79 | 1.70 | 0.99 | 2.02 | 1.77 |
| | TF2 | 0.52 | 0.86 | 0.49 | 0.62 | 1.59 | 1.38 | 2.43 | 1.98 |
| | TF3 | 0.82 | 0.78 | 0.74 | 0.78 | 2.34 | 1.97 | 3.15 | 1.99 |
| | TF4 | 0.86 | 0.77 | 0.70 | 0.94 | 2.52 | 2.08 | 2.60 | 3.30 |
| | TF5 | 0.50 | 0.81 | 0.25 | 0.83 | 1.67 | 1.54 | 1.78 | 2.10 |
| | TM6 | 0.23 | 0.83 | 0.35 | 0.57 | 0.91 | 1.10 | 1.50 | 1.51 |
| | TM7 | 0.25 | 0.64 | 0.44 | 0.75 | 0.99 | 0.63 | 1.68 | 1.74 |
| | TM8 | 0.43 | 0.72 | 0.48 | 0.45 | 1.20 | 0.81 | 1.44 | 1.18 |
| | TM9 | 0.34 | 0.83 | 0.30 | 0.69 | 1.43 | 1.05 | 1.88 | 1.83 |
| | TM10 | 0.39 | 0.66 | N/A | 0.75 | 1.29 | 0.85 | N/A | 1.51 |
| | Sent1 | 0.57 | 0.73 | 0.50 | 0.77 | 1.72 | 1.29 | 2.12 | 1.86 |
| | Sent2 | 0.46 | 0.80 | 0.46 | 0.72 | 1.60 | 1.25 | 1.94 | 1.94 |
| | Sent3 | 0.54 | 0.75 | 0.44 | 0.70 | 1.52 | 1.14 | 1.94 | 1.80 |
| | TF1, Sent1 | 0.55 | 0.49 | 0.49 | 0.85 | 1.67 | 0.83 | 2.18 | 1.73 |
| | TF1, Sent2 | 0.45 | 0.75 | 0.22 | 0.73 | 1.64 | 0.99 | 1.58 | 1.75 |
| | TF1, Sent3 | 0.76 | 0.62 | N/A | 0.78 | 1.90 | 1.18 | N/A | 1.94 |
| | TF2, Sent1 | 0.63 | 0.82 | 0.55 | 0.82 | 1.99 | 1.57 | 2.48 | 2.46 |
| | TF2, Sent2 | 0.54 | 0.90 | 0.55 | 0.54 | 1.62 | 1.57 | 2.54 | 1.85 |
| | TF2, Sent3 | 0.39 | 0.86 | 0.37 | 0.48 | 1.19 | 1.07 | 2.32 | 1.76 |
| | TF3, Sent1 | 0.62 | 0.80 | 0.76 | 0.85 | 1.85 | 2.06 | 3.16 | 2.12 |
| | TF3, Sent2 | 0.95 | 0.84 | 0.61 | 0.84 | 3.54 | 2.07 | 2.79 | 2.43 |
| | TF3, Sent3 | 0.90 | 0.70 | 0.84 | 0.67 | 2.36 | 1.81 | 3.59 | 1.61 |
| | TF4, Sent1 | 0.83 | 0.69 | 0.67 | 0.95 | 2.19 | 1.93 | 2.90 | 3.28 |
| | TF4, Sent2 | 0.89 | 0.96 | 0.79 | 0.89 | 3.59 | 3.03 | 3.02 | 3.28 |
| | TF4, Sent3 | 0.86 | 0.69 | 0.65 | 0.96 | 2.36 | 1.78 | 2.16 | 3.47 |
| | TF5, Sent1 | 0.71 | 0.79 | N/A | 0.77 | 2.39 | 1.66 | N/A | 1.73 |
| | TF5, Sent2 | 0.33 | 0.78 | 0.39 | 0.83 | 1.06 | 1.38 | 1.84 | 2.19 |
| | TF5, Sent3 | 0.56 | 0.85 | 0.12 | 0.89 | 1.89 | 1.68 | 1.65 | 2.47 |
| | TM6, Sent1 | 0.25 | 0.85 | 0.13 | 0.56 | 0.77 | 1.19 | 1.05 | 1.45 |
| | TM6, Sent2 | 0.21 | 0.80 | 0.59 | 0.64 | 1.25 | 0.94 | 2.08 | 1.58 |
| | TM6, Sent3 | N/A | 0.84 | 0.33 | 0.56 | N/A | 1.17 | 1.15 | 1.64 |
| | TM7, Sent1 | 0.47 | 0.69 | 0.47 | 0.92 | 1.52 | 1.10 | 1.58 | 2.66 |
| | TM7, Sent2 | 0.19 | 0.74 | 0.27 | 0.71 | 1.02 | 0.77 | 1.33 | 1.73 |
| | TM7, Sent3 | 0.20 | 0.50 | 0.58 | 0.71 | 0.70 | 0.21 | 2.06 | 1.39 |
| | TM8, Sent1 | 0.66 | 0.65 | 0.67 | 0.52 | 1.83 | 0.83 | 1.88 | 1.30 |
| | TM8, Sent2 | 0.34 | 0.73 | 0.45 | 0.44 | 0.93 | 0.80 | 1.24 | 1.21 |
| | TM8, Sent3 | 0.40 | 0.79 | 0.33 | 0.41 | 1.15 | 0.92 | 1.22 | 1.09 |
| | TM9, Sent1 | 0.47 | 0.81 | 0.29 | 0.68 | 1.81 | 1.21 | 1.81 | 1.56 |
| | TM9, Sent2 | 0.20 | 0.84 | 0.28 | 0.71 | 1.13 | 0.82 | 1.78 | 2.00 |
| | TM9, Sent3 | 0.36 | 0.84 | 0.34 | 0.70 | 1.34 | 1.09 | 2.06 | 2.07 |
| | TM10, Sent1 | 0.38 | 0.58 | N/A | 0.74 | 1.35 | 0.71 | N/A | 1.19 |
| | TM10, Sent2 | 0.36 | 0.68 | N/A | 0.85 | 1.04 | 0.84 | N/A | 2.04 |
| | TM10, Sent3 | 0.44 | 0.76 | N/A | 0.68 | 1.52 | 1.08 | N/A | 1.47 |
| | ALL | 0.52 | 0.76 | 0.47 | 0.73 | 2.27 | 1.68 | 2.33 | 2.12 |
| Correct Category Sentences | TF1 | 0.58 | 0.73 | 0.49 | 0.79 | 2.06 | 1.36 | 2.39 | 1.73 |
| | TF2 | 0.60 | 0.86 | 0.55 | 0.66 | 1.83 | 1.53 | 2.59 | 2.06 |
| | TF3 | 0.92 | 0.78 | 0.74 | 0.83 | 2.92 | 2.03 | 3.13 | 2.24 |
| | TF4 | 0.86 | 0.89 | 0.70 | 0.92 | 3.20 | 2.56 | 2.59 | 3.14 |
| | TF5 | 0.71 | 0.84 | N/A | 0.82 | 2.35 | 1.99 | N/A | 2.16 |
| | TM6 | N/A | 0.83 | 0.59 | 0.64 | N/A | 1.47 | 2.17 | 1.58 |
| | TM7 | N/A | 0.68 | 0.53 | 0.91 | N/A | 1.60 | 1.77 | 2.43 |
| | TM8 | 0.55 | 0.72 | 0.50 | 0.62 | 1.60 | 1.01 | 1.37 | 1.74 |
| | TM9 | 0.75 | 0.83 | N/A | 0.71 | 2.58 | 1.56 | N/A | 1.81 |
| | TM10 | 0.65 | 0.76 | N/A | 0.83 | 1.83 | 1.71 | N/A | 2.13 |
| | Sent1 | 0.66 | 0.77 | 0.60 | 0.85 | 2.11 | 1.70 | 2.34 | 2.22 |
| | Sent2 | 0.72 | 0.81 | 0.64 | 0.75 | 2.32 | 1.65 | 2.36 | 2.06 |
| | Sent3 | 0.77 | 0.79 | 0.60 | 0.79 | 2.40 | 1.68 | 2.31 | 2.15 |
| | TF1, Sent1 | 0.48 | 0.64 | 0.49 | 0.85 | 1.99 | 1.10 | 2.15 | 1.89 |
| | TF1, Sent2 | N/A | 0.75 | N/A | 0.73 | N/A | 1.37 | N/A | 1.52 |

TABLE 5-15-continued

Perceptual accuracy for the $test_2$ set based on all sentences and two exclusionary criteria.

| | Percent Correct | | | | d-prime | | | |
|---|---|---|---|---|---|---|---|---|
| | H | C | A | S | H | C | A | S |
| TF1, Sent3 | 0.68 | 0.77 | N/A | 0.78 | 2.31 | 1.56 | N/A | 1.87 |
| TF2, Sent1 | 0.63 | 0.82 | 0.55 | 0.82 | 1.99 | 1.57 | 2.48 | 2.46 |
| TF2, Sent2 | 0.54 | 0.90 | 0.55 | 0.53 | 1.68 | 1.53 | 2.58 | 1.83 |
| TF2, Sent3 | 0.67 | 0.86 | N/A | 0.68 | 1.90 | 1.63 | N/A | 2.18 |
| TF3, Sent1 | 0.91 | 0.80 | 0.76 | 0.85 | 2.87 | 2.16 | 3.12 | 2.39 |
| TF3, Sent2 | 0.95 | 0.84 | 0.61 | 0.81 | 3.28 | 2.12 | 2.82 | 2.31 |
| TF3, Sent3 | 0.90 | 0.70 | 0.84 | 0.81 | 2.65 | 1.89 | 3.55 | 2.06 |
| TF4, Sent1 | 0.83 | 0.92 | 0.67 | 0.95 | 3.01 | 2.81 | 2.81 | 3.27 |
| TF4, Sent2 | 0.89 | 0.96 | 0.79 | 0.88 | 3.59 | 2.99 | 3.03 | 3.20 |
| TF4, Sent3 | 0.86 | 0.81 | 0.65 | 0.92 | 3.10 | 2.11 | 2.16 | 3.11 |
| TF5, Sent1 | 0.71 | 0.79 | N/A | 0.85 | 2.36 | 1.93 | N/A | 2.04 |
| TF5, Sent2 | 0.50 | 0.83 | N/A | 0.83 | 1.71 | 1.88 | N/A | 2.31 |
| TF5, Sent3 | 0.91 | 0.89 | N/A | 0.79 | 3.26 | 2.22 | N/A | 2.24 |
| TM6, Sent1 | N/A | 0.85 | N/A | 0.66 | N/A | 1.93 | N/A | 1.56 |
| TM6, Sent2 | N/A | 0.80 | 0.59 | 0.62 | N/A | 1.19 | 2.15 | 1.50 |
| TM6, Sent3 | N/A | 0.84 | N/A | 0.63 | N/A | 1.39 | N/A | 1.70 |
| TM7, Sent1 | N/A | 0.69 | 0.47 | 0.93 | N/A | 1.53 | 1.58 | 2.60 |
| TM7, Sent2 | N/A | 0.74 | N/A | 0.90 | N/A | 2.08 | N/A | 2.28 |
| TM7, Sent3 | N/A | 0.58 | 0.58 | 0.91 | N/A | 1.25 | 1.84 | 2.43 |
| TM8, Sent1 | 0.53 | 0.65 | 0.67 | 0.65 | 1.60 | 0.89 | 1.88 | 1.51 |
| TM8, Sent2 | 0.51 | 0.73 | N/A | 0.66 | 1.58 | 1.05 | N/A | 2.09 |
| TM8, Sent3 | 0.64 | 0.79 | 0.33 | 0.55 | 1.69 | 1.09 | 1.12 | 1.86 |
| TM9, Sent1 | 0.75 | 0.81 | N/A | 0.80 | 2.70 | 1.70 | N/A | 2.03 |
| TM9, Sent2 | N/A | 0.84 | N/A | 0.64 | N/A | 1.39 | N/A | 1.53 |
| TM9, Sent3 | N/A | 0.84 | N/A | 0.70 | N/A | 1.52 | N/A | 1.92 |
| TM10, Sent1 | N/A | 0.73 | N/A | 0.92 | N/A | 2.11 | N/A | 2.50 |
| TM10, Sent2 | N/A | 0.80 | N/A | 0.80 | N/A | 1.86 | N/A | 2.73 |
| TM10, Sent3 | 0.65 | 0.74 | N/A | 0.75 | 2.05 | 1.41 | N/A | 1.66 |
| ALL | 0.72 | 0.79 | 0.61 | 0.79 | 1.36 | 1.04 | 1.87 | 1.65 |

"H" = Category 1 or Happy, "C" = Category 2 or Content-Confident, "A" = Category 3 or angry, and "S" = Category 4 or Sad; "TF" = Female Talker Number; "TM" = Male Talker Number "Sent" = Sentence Number; "N/A" = Scores not available; these samples were dropped.

TABLE 5-16

Reliability analysis of manual acoustic measurements (stressed and unstressed vowel durations) for test set (e.g. Talker1__angr__s1 is the first angry sentence by Talker1).

| | Vowel 1 (s) | | Vowel 2 (s) | |
|---|---|---|---|---|
| | A | J | A | J |
| Talker1__angr__s1 | 0.08 | 0.09 | 0.03 | 0.04 |
| Talker1__anxi__s1 | 0.05 | 0.06 | 0.03 | 0.06 |
| Talker1__cofi__s1 | 0.07 | 0.08 | 0.05 | 0.06 |
| Talker1__cofu__s3 | 0.20 | 0.20 | 0.14 | 0.16 |
| Talker1__cote__s3 | 0.15 | 0.15 | 0.06 | 0.06 |
| Talker1__emba__s3 | 0.21 | 0.20 | 0.12 | 0.13 |
| Talker1__exha__s3 | 0.19 | 0.20 | 0.11 | 0.10 |
| Talker2__anno__s1 | 0.07 | 0.08 | 0.05 | 0.05 |
| Talker2__bore__s2 | 0.07 | 0.08 | 0.04 | 0.06 |
| Talker2__cofi__s3 | 0.12 | 0.12 | 0.06 | 0.06 |
| Talker2__cofu__s2 | 0.09 | 0.11 | 0.08 | 0.07 |
| Talker2__cofu__s3 | 0.20 | 0.20 | 0.26 | 0.24 |
| Talker2__emba__s2 | 0.11 | 0.12 | 0.09 | 0.07 |
| Talker2__exha__s2 | 0.10 | 0.12 | 0.06 | 0.06 |
| Talker3__anno__s2 | 0.12 | 0.14 | 0.07 | 0.08 |
| Talker3__anxi__s3 | 0.12 | 0.14 | 0.06 | 0.06 |
| Talker3__cofi__s3 | 0.12 | 0.13 | 0.06 | 0.05 |
| Talker3__exha__s2 | 0.14 | 0.17 | 0.08 | 0.07 |
| Talker3__happ__s2 | 0.12 | 0.12 | 0.09 | 0.08 |
| Talker3__sadd__s1 | 0.11 | 0.09 | 0.07 | 0.09 |
| Talker3__sadd__s3 | 0.19 | 0.19 | 0.07 | 0.07 |
| Talker4__angr__s1 | 0.08 | 0.09 | 0.05 | 0.05 |
| Talker4__angr__s3 | 0.16 | 0.16 | 0.09 | 0.09 |
| Talker4__anxi__s3 | 0.10 | 0.11 | 0.06 | 0.07 |
| Talker4__bore__s1 | 0.09 | 0.09 | 0.06 | 0.07 |
| Talker4__cofi__s1 | 0.07 | 0.07 | 0.04 | 0.05 |
| Talker4__cofu__s2 | 0.12 | 0.13 | 0.07 | 0.07 |
| Talker4__exha__s2 | 0.10 | 0.12 | 0.11 | 0.10 |

TABLE 5-16-continued

Reliability analysis of manual acoustic measurements (stressed and unstressed vowel durations) for test set (e.g. Talker1__angr__s1 is the first angry sentence by Talker1).

| | Vowel 1 (s) | | Vowel 2 (s) | |
|---|---|---|---|---|
| | A | J | A | J |
| Talker5__angr__s2 | 0.15 | 0.18 | 0.05 | 0.08 |
| Talker5__bore__s1 | 0.08 | 0.10 | 0.13 | 0.13 |
| Talker5__cofi__s3 | 0.22 | 0.23 | 0.13 | 0.12 |
| Talker5__cofu__s1 | 0.10 | 0.11 | 0.06 | 0.07 |
| Talker5__cofu__s3 | 0.23 | 0.24 | 0.11 | 0.12 |
| Talker5__cote__s2 | 0.14 | 0.15 | 0.06 | 0.06 |
| Talker5__emba__s3 | 0.17 | 0.18 | 0.07 | 0.08 |
| Talker6__anno__s1 | 0.05 | 0.08 | 0.05 | 0.07 |
| Talker6__anxi__s3 | 0.12 | 0.12 | 0.03 | 0.03 |
| Talker6__cofi__s3 | 0.11 | 0.11 | 0.11 | 0.08 |
| Talker6__cofu__s3 | 0.16 | 0.16 | 0.08 | 0.10 |
| Talker6__cote__s2 | 0.08 | 0.09 | 0.05 | 0.03 |
| Talker6__emba__s1 | 0.06 | 0.07 | 0.04 | 0.04 |
| Talker6__sadd__s2 | 0.09 | 0.09 | 0.05 | 0.05 |
| Talker7__angr__s2 | 0.09 | 0.11 | 0.04 | 0.04 |
| Talker7__anno__s2 | 0.09 | 0.09 | 0.07 | 0.06 |
| Talker7__bore__s2 | 0.07 | 0.08 | 0.04 | 0.03 |
| Talker7__cofu__s1 | 0.06 | 0.07 | 0.04 | 0.07 |
| Talker7__emba__s2 | 0.08 | 0.10 | 0.04 | 0.06 |
| Talker7__happ__s3 | 0.09 | 0.10 | 0.05 | 0.06 |
| Talker7__sadd__s2 | 0.11 | 0.11 | 0.06 | 0.05 |
| Talker8__angr__s2 | 0.09 | 0.12 | 0.03 | 0.06 |
| Talker8__anno__s2 | 0.09 | 0.09 | 0.04 | 0.05 |
| Talker8__anxi__s2 | 0.08 | 0.11 | 0.04 | 0.06 |
| Talker8__cofi__s2 | 0.10 | 0.12 | 0.06 | 0.06 |
| Talker8__cofu__s2 | 0.13 | 0.11 | 0.07 | 0.07 |
| Talker8__emba__s1 | 0.09 | 0.09 | 0.04 | 0.05 |
| Talker8__happ__s1 | 0.06 | 0.09 | 0.05 | 0.06 |

TABLE 5-16-continued

Reliability analysis of manual acoustic measurements (stressed and unstressed vowel durations) for test set (e.g. Talker1__angr__s1 is the first angry sentence by Talker1).

| | Vowel 1 (s) | | Vowel 2 (s) | |
|---|---|---|---|---|
| | A | J | A | J |
| Talker9__bore__s1 | 0.06 | 0.07 | 0.05 | 0.09 |
| Talker9__cofu__s1 | 0.04 | 0.06 | 0.04 | 0.07 |
| Talker9__cote__s2 | 0.08 | 0.10 | 0.07 | 0.07 |
| Talker9__emba__s3 | 0.09 | 0.11 | 0.04 | 0.06 |
| Talker9__happ__s1 | 0.06 | 0.07 | 0.06 | 0.05 |
| Talker9__sadd__s1 | 0.06 | 0.07 | 0.06 | 0.07 |
| Talker9__sadd__s3 | 0.14 | 0.15 | 0.03 | 0.04 |
| Talker10__angr__s1 | 0.06 | 0.09 | 0.04 | 0.06 |
| Talker10__angr__s3 | 0.11 | 0.12 | 0.03 | 0.06 |
| Talker10__anno__s2 | 0.10 | 0.13 | 0.05 | 0.08 |
| Talker10__cofi__s1 | 0.06 | 0.07 | 0.04 | 0.06 |
| Talker10__cote__s2 | 0.12 | 0.13 | 0.08 | 0.08 |
| Talker10__exha__s2 | 0.11 | 0.12 | 0.04 | 0.06 |
| Talker10__happ__s3 | 0.10 | 0.10 | 0.06 | 0.06 |
| Pearson's Correlation Coefficient | 0.971 | | 0.919 | |

TABLE 5-17

Classification accuracy of the Overall training model for the test$_2$ set samples using the k-means algorithm.

| | | Percent Correct | | | | d-prime | | | |
|---|---|---|---|---|---|---|---|---|---|
| | | H | C | A | S | H | C | A | S |
| k-means algorithm | TF1 samples | 0.17 | 0.42 | 0.67 | 0.50 | −0.32 | 0.09 | 2.26 | 1.07 |
| | TF2 samples | 0.00 | 0.33 | 0.33 | 0.83 | −1.93 | 0.14 | 1.40 | 1.84 |
| | TF3 samples | 0.50 | 0.58 | 1.00 | 0.58 | 1.45 | 1.09 | 5.15 | 0.64 |
| | TF4 samples | 0.67 | 0.75 | 0.67 | 0.92 | 1.48 | 1.74 | 3.01 | 3.96 |
| | TF5 samples | 0.17 | 0.75 | 0.33 | 0.67 | 0.08 | 1.11 | 1.07 | 2.10 |
| | TM6 samples | 0.33 | 0.17 | 1.00 | 0.50 | 0.79 | −0.54 | 4.08 | 0.30 |
| | TM7 samples | 0.50 | 0.42 | 0.67 | 0.58 | 1.22 | 0.36 | 1.93 | 0.92 |
| | TM8 samples | 0.00 | 0.50 | 0.00 | 0.50 | −1.93 | 0.18 | −0.74 | 0.88 |
| | TM9 samples | 0.33 | 0.50 | 0.33 | 0.33 | 0.47 | 0.30 | 0.85 | 0.45 |
| | TM10 samples | 0.33 | 0.33 | 0.33 | 0.75 | 0.47 | 0.14 | 2.15 | 1.24 |
| | Sent1 samples | 0.25 | 0.48 | 0.80 | 0.75 | 0.55 | 0.59 | 2.72 | 1.37 |
| | Sent2 samples | 0.35 | 0.50 | 0.50 | 0.68 | 0.54 | 0.70 | 1.75 | 1.30 |
| | Sent3 samples | 0.30 | 0.45 | 0.30 | 0.43 | 0.20 | 0.09 | 1.12 | 0.82 |
| | All samples | 0.30 | 0.48 | 0.53 | 0.62 | 0.41 | 0.45 | 1.83 | 1.14 |

"H" = Category 1 or Happy, "C" = Category 2 or Content-Confident, "A" = Category 3 or angry, and "S" = Category 4 or Sad; "TF" = Female Talker number; "TM" = Male Talker number; "Sent" = Sentence number.

TABLE 5-18

Classification accuracy of the Overall training model for the test$_2$ set samples using the kNN algorithm for two values of k.

| | | Percent Correct | | | | d-prime | | | |
|---|---|---|---|---|---|---|---|---|---|
| | | H | C | A | S | H | C | A | S |
| kNN algorithm with k = 1 | TF1 samples | 0.33 | 0.58 | 0.67 | 0.58 | 0.33 | 0.78 | 3.01 | 1.28 |
| | TF2 samples | 0.17 | 0.58 | 0.01 | 0.58 | −0.20 | 0.27 | 0.00 | 1.52 |
| | TF3 samples | 0.67 | 0.58 | 0.67 | 0.67 | 1.88 | 1.09 | 3.01 | 1.00 |
| | TF4 samples | 0.83 | 0.75 | 0.67 | 0.92 | 2.41 | 1.74 | 3.01 | 3.05 |
| | TF5 samples | 0.17 | 0.67 | 0.33 | 0.50 | −0.20 | 0.86 | 1.07 | 1.31 |
| | TM6 samples | 0.17 | 0.33 | 0.67 | 0.42 | −0.07 | 0.00 | 1.93 | 0.22 |
| | TM7 samples | 0.67 | 0.42 | 0.67 | 0.50 | 1.48 | 0.36 | 1.93 | 0.88 |
| | TM8 samples | 0.17 | 0.50 | 0.01 | 0.42 | −0.20 | 0.30 | −0.74 | 0.36 |
| | TM9 samples | 0.17 | 0.50 | 0.01 | 0.42 | −0.07 | 0.06 | −1.07 | 0.67 |
| | TM10 samples | 0.33 | 0.33 | 0.33 | 0.67 | 0.33 | 0.14 | 2.15 | 1.00 |
| | Sent1 samples | 0.40 | 0.53 | 0.60 | 0.75 | 0.91 | 0.81 | 2.58 | 1.37 |
| | Sent2 samples | 0.35 | 0.60 | 0.40 | 0.63 | 0.50 | 0.86 | 1.63 | 1.32 |
| | Sent3 samples | 0.35 | 0.45 | 0.20 | 0.33 | 0.38 | −0.02 | 0.80 | 0.44 |
| | All samples | 0.37 | 0.53 | 0.40 | 0.57 | 0.58 | 0.53 | 1.63 | 1.03 |
| kNN algorithm with k = 3 | TF1 samples | 0.17 | 0.55 | 0.33 | 0.55 | 0.03 | −0.01 | 2.15 | 1.40 |
| | TF2 samples | 0.01 | 0.45 | 0.01 | 0.82 | −1.87 | 0.14 | 0.00 | 1.94 |
| | TF3 samples | 0.67 | 0.73 | 1.00 | 0.58 | 2.18 | 1.28 | 5.15 | 1.02 |
| | TF4 samples | 0.50 | 0.80 | 0.01 | 0.92 | 1.41 | 1.41 | 0.00 | 3.00 |
| | TF5 samples | 0.01 | 0.91 | 0.33 | 0.42 | −1.38 | 1.21 | 2.15 | 1.41 |
| | TM6 samples | 0.01 | 0.25 | 0.50 | 0.42 | −1.15 | −1.06 | 1.83 | 0.17 |
| | TM7 samples | 0.50 | 0.58 | 0.33 | 0.40 | 1.41 | 0.14 | 2.15 | 0.62 |
| | TM8 samples | 0.17 | 0.40 | 0.01 | 0.42 | −0.26 | −0.19 | 0.00 | 0.42 |

TABLE 5-18-continued

Classification accuracy of the Overall training model for the $test_2$ set samples using the kNN algorithm for two values of k.

| | Percent Correct | | | | d-prime | | | |
|---|---|---|---|---|---|---|---|---|
| | H | C | A | S | H | C | A | S |
| TM9 samples | 0.17 | 0.58 | 0.01 | 0.33 | 0.08 | 0.03 | −0.74 | 0.45 |
| TM10 samples | 0.17 | 0.55 | 0.33 | 0.42 | 0.23 | −0.07 | 2.15 | 0.63 |
| Sent1 samples | 0.37 | 0.56 | 0.44 | 0.62 | 0.97 | 0.35 | 2.44 | 1.18 |
| Sent2 samples | 0.15 | 0.61 | 0.11 | 0.62 | 0.26 | 0.32 | 1.36 | 1.15 |
| Sent3 samples | 0.20 | 0.56 | 0.20 | 0.35 | 0.03 | 0.05 | 1.21 | 0.67 |
| All samples | 0.24 | 0.58 | 0.25 | 0.53 | 0.41 | 0.24 | 1.78 | 0.99 |

"H" = Category 1 or Happy, "C" = Category 2 or Content-Confident, "A" = Category 3 or angry, and "S" = Category 4 or Sad; "TF" = Female Talker number; "TM" = Male Talker number; "Sent" = Sentence number.

The present disclosure contemplates the use of a machine in the form of a computer system within which a set of instructions, when executed, may cause the machine to perform any one or more of the methodologies discussed above. In some embodiments, the machine can operate as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine can comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure can include broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system can include a processor (e.g., a central processing unit (CPU), a graphics processing unit (GPU, or both), a main memory and a static memory, which communicate with each other via a bus. The computer system can further include a video display unit (e.g., a liquid crystal display or LCD, a flat panel, a solid state display, or a cathode ray tube or CRT). The computer system can include an input device (e.g., a keyboard), a cursor control device (e.g., a mouse), a mass storage medium, a signal generation device (e.g., a speaker or remote control) and a network interface device.

The mass storage medium can include a computer-readable storage medium on which is stored one or more sets of instructions (e.g., software) embodying any one or more of the methodologies or functions described herein, including those methods illustrated above. The computer-readable storage medium can be an electromechanical medium such as a common disk drive, or a mass storage medium with no moving parts such as Flash or like non-volatile memories. The instructions can also reside, completely or at least partially, within the main memory, the static memory, and/or within the processor during execution thereof by the computer system. The main memory and the processor also may constitute computer-readable storage media. In an embodiment, non-transitory media are used.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on one or more computer processors. Furthermore, software implementations can include, but not limited to, distributed processing or component/object distributed processing, parallel processing, or virtual machine processing can also be constructed to implement the methods described herein.

The present disclosure also contemplates a machine readable medium containing instructions, or that which receives and executes instructions from a propagated signal so that a device connected to a network environment can send or receive voice, video or data, and to communicate over the network using the instructions. The instructions can further be transmitted or received over a network via the network interface device. While the computer-readable storage medium is described in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a computer-readable storage medium or a distribution medium, as listed herein and including art-recognized equivalents and successor media, in which the software implementations herein are stored. In an embodiment, non-transitory media are used.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Aspects of the invention can be described in the general context of computer-executable instructions, such as program modules, being executed by a computer. Generally, program modules include routines, programs, objects, components, data structures, etc., that perform particular tasks or implement particular abstract data types. Such program modules can be implemented with hardware components, software components, or a combination thereof. Moreover, those skilled in the art will appreciate that the invention can be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

The invention can be practiced in distributed-computing environments where tasks are performed by remote-processing devices that are linked through a communications network or other communication medium. In a distributed-computing environment, program modules can be located in both local and remote computer-storage media including memory storage devices. The computer-useable instructions form an interface to allow a computer to react according to a source of input. The instructions cooperate with other code segments or modules to initiate a variety of tasks in response to data received in conjunction with the source of the received data.

The present invention can be practiced in a network environment such as a communications network. Such networks are widely used to connect various types of network elements, such as routers, servers, gateways, and so forth. Further, the invention can be practiced in a multi-network environment having various, connected public and/or private networks. Communication between network elements can be wireless or wireline (wired). As will be appreciated by those skilled in the art, communication networks can take several different forms and can use several different communication protocols.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A method for determining an emotion state of a speaker, comprising:

providing an acoustic space having one or more dimensions, wherein each dimension of the one or more dimensions of the acoustic space corresponds to at least one baseline acoustic characteristic;

receiving a subject utterance of speech by a speaker;

measuring, via one or more processors, one or more acoustic characteristics of the subject utterance of speech;

comparing, via the one or more processors, each acoustic characteristic of the one or more acoustic characteristics of the subject utterance of speech to a corresponding one or more baseline acoustic characteristic; and determining, via the one or more processors, an emotion state of the speaker based on the comparison, wherein determining the emotion state of the speaker based on the comparison occurs within one day of receiving the subject utterance of speech by the speaker.

2. The method according to claim 1, wherein providing an acoustic space comprises analyzing training data to determine the at least one baseline acoustic characteristic for each of the one or more dimensions of the acoustic space.

3. The method according to claim 1, wherein determining the emotion state of speaker based on the comparison comprises determining one or more emotions of the speaker based on the comparison.

4. The method according to claim 1, wherein the emotion state of the speaker comprises a category of emotion and an intensity of the category of emotion.

5. The method according to claim 1, wherein the emotion state of the speaker comprises at least one magnitude along a corresponding at least one of the one or more dimensions within the space.

6. The method according to claim 1, wherein each of the at least one baseline acoustic characteristic for each dimension of the one or more dimensions affects perception of the emotion state.

7. The method according to claim 2, wherein the training data comprises at least one training utterance of speech.

8. The method according to claim 7, wherein the at least one training utterance of speech comprises at least two training utterances of speech.

9. The method according to claim 7, wherein one or more of the at least one training utterance of speech is spoken by the speaker.

10. The method according to claim 7, wherein one or more of the at least one training utterance of speech is spoken by an additional speaker.

11. The method according to claim 7, wherein the subject utterance of speech comprises one or more of the at least one training utterance of speech.

12. The method according to claim 11, wherein semantic and/or syntactic content of the one or more of the at least one training utterance of speech is determined by the speaker.

13. The method according to claim 1, wherein the subject utterance of speech comprises a 2 to 10 second segment of speech.

14. The method according to claim 1, further comprising selecting a segment of speech from the subject utterance of speech, wherein measuring the one or more acoustic characteristics of the subject utterance of speech comprises measuring one or more acoustic characteristic of the segment of speech.

15. The method according to claim 14, wherein the segment of speech from the subject utterance of speech is a 2 to 10 second segment of speech from the subject utterance of speech.

16. The method according to claim 15, wherein the segment of speech from the subject utterance of speech is a 3 to 5 second segment of speech from the subject utterance of speech.

17. The method according to claim 14, further comprising:

selecting an additional segment of speech from the subject utterance of speech;

measuring one or more additional acoustic characteristics of the additional segment of speech, wherein each one or more additional acoustic characteristic of the additional segment of speech corresponds to a corresponding one or more baseline acoustic characteristic;

comparing each one or more additional acoustic characteristic of the additional segment of speech to the corresponding one or more baseline acoustic characteristic; and determining an additional emotion state of the speaker based on the comparison.

18. The method according to claim 17, wherein the segment of speech from the subject utterance of speech and the additional segment of speech from the subject utterance of speech are of different lengths.

19. The method according to claim 1, wherein at least one of the one or more acoustic characteristic of the subject utterance of speech comprises a suprasegmental property of the subject utterance of speech, and corresponding at least one of the one or more baseline acoustic characteristic comprises a corresponding suprasegmental property.

20. The method according to claim 1, wherein each of the one or more acoustic characteristic of the subject utterance of speech is selected from the group consisting of: fundamental frequency, pitch, intensity, loudness, and speaking rate.

21. The method according to claim 1, wherein each of the one or more acoustic characteristic of the subject utterance of speech is selected from the group consisting of: number of peaks in the pitch, intensity contour, loudness contour, pitch contour, fundamental frequency contour, attack of the intensity contour, attack of the loudness contour, attack of the pitch contour, attack of the fundamental frequency contour, fall of the intensity contour, fall of the loudness contour, fall of the pitch contour, fall of the fundamental frequency contour, duty cycle of the peaks in the pitch, normalized minimum pitch, normalized maximum of pitch, cepstral peak prominence (CPP), and spectral slope.

22. The method according to claim 1, wherein determining the emotion state of the speaker based on the comparison occurs within one minute of receiving the subject utterance of speech by the speaker.

23. The method according to claim 1, wherein determining the emotion state of the speaker based on the comparison occurs within 30 seconds of receiving the subject utterance of speech by the speaker.

24. The method according to claim 1, wherein determining the emotion state of the speaker based on the comparison occurs within 15 seconds of receiving the subject utterance of speech by the speaker.

25. The method according to claim 1, wherein determining the emotion state of the speaker based on the comparison occurs within 10 seconds of receiving the subject utterance of speech by the speaker.

26. The method according to claim 1, wherein determining the emotion state of the speaker based on the comparison occurs within 5 seconds of receiving the subject utterance of speech by the speaker.

27. A method for determining an emotion state of a speaker, comprising:

providing an acoustic space having one or more dimensions, wherein each dimension of the one or more dimensions of the acoustic space corresponds to at least one baseline acoustic characteristic;

receiving a subject utterance of speech by a speaker;

measuring, via one or more processors, one or more acoustic characteristic of the subject utterance of speech;

comparing, via the one or more processors, each acoustic characteristic of the one or more acoustic characteristic of the subject utterance of speech to a corresponding one or more baseline acoustic characteristic; and determining, via the one or more processors, an emotion state of the speaker based on the comparison, wherein the emotion state of the speaker comprises at least one magnitude along a corresponding at least one of the one or more dimensions within the acoustic space.

28. The method according to claim 27, wherein each of the at least one baseline acoustic characteristic for each dimension of the one or more dimensions affects perception of the emotion state.

29. The method according to claim 27, wherein the one or more dimensions is one dimension.

30. The method according to claim 27, wherein the one or more dimensions is two or more dimensions.

31. The method according to claim 27, wherein providing an acoustic space comprises analyzing training data to determine the at least one baseline acoustic characteristic for each of the one or more dimensions of the acoustic space.

32. The method according to claim 31, wherein the acoustic space describes n emotions using $n-1$ dimensions, where n is an integer greater than 1.

33. The method according to claim 32, further comprising reducing the $n-1$ dimensions to p dimensions, where $p<n-1$.

34. The method according to claim 33, wherein a machine learning algorithm is used to reduce the $n-1$ dimensions to p dimensions.

35. The method according to claim 33, wherein a pattern recognition algorithm is used to reduce the $n-1$ dimensions to p dimensions.

36. The method according to claim 33, wherein multidimensional scaling is used to reduce the $n-1$ dimensions to p dimensions.

37. The method according to claim 33, wherein linear regression is used to reduce the $n-1$ dimensions to p dimensions.

38. The method according to claim 33, wherein a vector machine is used to reduce the $n-1$ dimensions to p dimensions.

39. The method according to claim 33, wherein a neural network is used to reduce the $n-1$ dimensions to p dimensions.

40. The method according to claim 28, wherein the training data comprises at least one training utterance of speech.

41. The method according to claim 40, wherein one or more of the at least one training utterance of speech is spoken by the speaker.

42. The method according to claim 40, wherein the subject utterance of speech comprises one or more of the at least one training utterance of speech.

43. The method according to claim 42, wherein semantic and/or syntactic content of the one or more of the at least one training utterance of speech is determined by the speaker.

44. The method according to claim 27, wherein each of the one or more acoustic characteristic of the subject utterance of speech comprises a suprasegmental property of the subject utterance of speech, and each of the at least one baseline acoustic characteristic comprises a corresponding suprasegmental property.

45. The method according to claim 27, wherein each of the one or more acoustic characteristic of the subject utterance of speech is selected from the group consisting of: fundamental frequency, pitch, intensity, loudness, and speaking rate.

46. The method according to claim 27, wherein each of the one or more acoustic characteristic of the subject utterance of speech is selected from the group consisting of: number of peaks in the pitch, intensity contour, loudness contour, pitch contour, fundamental frequency contour, attack of the intensity contour, attack of the loudness contour, attack of the pitch contour, attack of the fundamental frequency contour, fall of the intensity contour, fall of the loudness contour, fall of the pitch contour, fall of the fundamental frequency contour, duty cycle of the peaks in the pitch, normalized minimum pitch, normalized maximum of pitch, cepstral peak prominence (CPP), and spectral slope.

47. The method according to claim 27, wherein determining the emotion state of the speaker based on the comparison occurs within five minutes of receiving the subject utterance of speech by the speaker.

48. The method according to claim 27, wherein determining the emotion state of the speaker based on the comparison occurs within one minute of receiving the subject utterance of speech by the speaker.

49. A method for determining an emotion state of a speaker, comprising:

- providing an acoustic space having one or more dimensions, wherein each dimension of the one or more dimensions of the acoustic space corresponds to at least one baseline acoustic characteristic;
- receiving a training utterance of speech by the speaker;
- analyzing the training utterance of speech;
- modifying the acoustic space based on the analysis of the training reference of speech to produce a modified acoustic space having one or more modified dimensions, wherein each modified dimension of the one or more modified dimensions of the modified acoustic space corresponds to at least one modified baseline acoustic characteristic;
- receiving a subject utterance of speech by a speaker;
- measuring one or more acoustic characteristic of the subject utterance of speech;
- comparing each acoustic characteristic of the one or more acoustic characteristics of the subject utterance of speech to a corresponding one or more baseline acoustic characteristic; and
- determining an emotion state of the speaker based on the comparison.

50. The method according to claim 49, wherein semantic and/or syntactic content of the training utterance of speech is determined by the speaker.

51. The method according to claim 49, wherein the subject utterance of speech comprises the training utterance of speech.

52. The method according to claim 51, wherein determining the emotion state of the speaker based on the comparison occurs within one day of receiving the subject utterance of speech by the speaker.

53. The method according to claim 51, wherein determining the emotion state of the speaker based on the comparison occurs within one minute of receiving the subject utterance of speech by the speaker.

54. The method according to claim 49, wherein each of the one or more acoustic characteristic of the subject utterance of speech comprises a suprasegmental property of the subject utterance of speech, and each of the at least one modified at least one baseline acoustic characteristic comprises a corresponding suprasegmental property.

55. The method according to claim 49, wherein each of the one or more acoustic characteristic of the subject utterance of speech is selected from the group consisting of: fundamental frequency, pitch, intensity, loudness, and speaking rate.

56. The method according to claim 49, wherein each of the one or more acoustic characteristic of the subject utterance of speech is selected from the group consisting of: number of peaks in the pitch, intensity contour, loudness contour, pitch contour, fundamental frequency contour, attack of the intensity contour, attack of the loudness contour, attack of the pitch contour, attack of the fundamental frequency contour, fall of the intensity contour, fall of the loudness contour, fall of the pitch contour, fall of the fundamental frequency contour, duty cycle of the peaks in the pitch, normalized minimum pitch, normalized maximum of pitch, cepstral peak prominence (CPP), and spectral slope.

57. The method according to claim 49, wherein determining the emotion state of speaker based on the comparison comprises determining one or more emotion of the speaker based on the comparison.

58. The method according to claim 49, wherein the emotion state of the speaker comprises a category of emotion and an intensity of the category of emotion.

59. The method according to claim 49, wherein the emotion state of the speaker comprises at least one magnitude along a corresponding at least one dimension within the modified acoustic space.

* * * * *

UNITED STATES PATENT AND TRADEMARK OFFICE

CERTIFICATE OF CORRECTION

PATENT NO. : 8,788,270 B2
APPLICATION NO. : 13/377801
DATED : July 22, 2014
INVENTOR(S) : Sona Patel and Rahul Shrivastav It is certified that error appears in the above-identified patent and that said Letters Patent is hereby corrected as shown below:

In the Specification

Column 9,
Line 16, "Alternatively. BF1" should read --Alternatively, BF1--.

Column 15,
Line 9, "malc" should read --male--.
Line 14, "actual f)." should read --actual f0.--.

Column 18,
Line 4, "content," should read --content.--.

Column 22,
Line 67, "Overall $test_a$" should read --Overall $test_1$--.

Column 23,
Line 16, "Overall $test_a$" should read --Overall $test_1$--.

Column 26,
Line 7, "$test_a$ sets" should read --$test_1$ sets--.
Line 8, "and $test_2$ sets." should read --and $test_1$ sets.--.

Column 30,
Line 11, "$test_1$ set was" should read --$test_2$ set was--.
Line 12, "actual f)." should read --actual *f0*.--.

Column 31,
Lines 28-29, "and $test_y$ sets." should read --and $test_1$ sets.--.

Signed and Sealed this
Second Day of December, 2014

Michelle K. Lee
*Deputy Director of the United States Patent and Trademark Office*

Column 37,
Line 7, “coll” should read --cofi--.